(12) United States Patent
Zaloom

(10) Patent No.: US 9,596,914 B2
(45) Date of Patent: Mar. 21, 2017

(54) TABLET TRANSFORMER

(71) Applicant: Joseph A. Zaloom, Arlington, VA (US)

(72) Inventor: Joseph A. Zaloom, Arlington, VA (US)

(*) Notice: Subject to any disclaimer, the term of this patent is extended or adjusted under 35 U.S.C. 154(b) by 426 days.

(21) Appl. No.: 14/255,711

(22) Filed: Apr. 17, 2014

(65) Prior Publication Data

US 2014/0347814 A1 Nov. 27, 2014

Related U.S. Application Data

(60) Provisional application No. 61/813,893, filed on Apr. 19, 2013, provisional application No. 61/878,491, filed on Sep. 16, 2013.

(51) Int. Cl.
| | | |
|---|---|---|
| A45C 11/00 | (2006.01) | |
| G06F 1/16 | (2006.01) | |
| A45C 13/36 | (2006.01) | |
| G06F 3/02 | (2006.01) | |

(52) U.S. Cl.
CPC .............. *A45C 11/00* (2013.01); *A45C 13/36* (2013.01); *G06F 1/16* (2013.01); *G06F 1/166* (2013.01); *G06F 1/1626* (2013.01); *G06F 1/1669* (2013.01); *G06F 1/1679* (2013.01); *G06F 3/0208* (2013.01); *A45C 2011/003* (2013.01); *A45C 2200/15* (2013.01); *G06F 2200/1633* (2013.01); *G06F 2200/1634* (2013.01)

(58) Field of Classification Search
CPC ...... G06F 1/166; G06F 1/1679; G06F 3/0208; G06F 2200/1633; G06F 2200/1634
See application file for complete search history.

(56) References Cited

U.S. PATENT DOCUMENTS

| | | |
|---|---|---|
| 1,166,702 A | 1/1916 | Mardon et al. |
| 2,101,500 A | 12/1937 | Jagus |
| 3,744,085 A | 7/1973 | Griego |
| 4,436,271 A | 3/1984 | Manso |
| 5,020,763 A | 6/1991 | Hegarty |
| 5,058,848 A | 10/1991 | Ferraro |
| 5,060,904 A | 10/1991 | Hegarty |
| 5,074,164 A | 12/1991 | Sheu |
| 5,100,098 A | 3/1992 | Hawkins |
| 5,168,601 A | 12/1992 | Liu |
| 5,933,996 A * | 8/1999 | Chang ............... A47G 1/143 248/456 |
| 6,367,760 B1 | 4/2002 | Pagano |
| 6,983,514 B2 | 1/2006 | Lu et al. |
| 7,083,155 B1 | 8/2006 | Smartt |
| 7,188,818 B2 | 3/2007 | Chang |
| 7,546,996 B2 | 6/2009 | Somji |
| 7,568,915 B1 | 8/2009 | Lavoie |
| 7,581,290 B2 | 9/2009 | Chang |

(Continued)

OTHER PUBLICATIONS

"Computer Components & Imaging Supplies", Crimson Imaging Supplies, Mar. 15, 2013, two pages.

(Continued)

*Primary Examiner* — Zachary M Pape
*Assistant Examiner* — Douglas Burtner
(74) *Attorney, Agent, or Firm* — Nixon & Vanderhye P.C.

(57) ABSTRACT

Mechanisms for the integration of the form and function of a drafting and note-taking tablet, a laptop computer, and a desktop computer with added enhancements for drop protection, portability, functionality, and ergonomics.

6 Claims, 66 Drawing Sheets

(56) References Cited

U.S. PATENT DOCUMENTS

| | | |
|---|---|---|
| 7,591,604 B2 | 9/2009 | Roberts |
| 7,611,117 B1 | 11/2009 | Lang, Jr. |
| 7,712,719 B2 | 5/2010 | Derry et al. |
| 7,770,862 B2 | 8/2010 | Chen |
| 7,836,623 B2 | 11/2010 | Wang et al. |
| 8,038,116 B2 | 10/2011 | Lee et al. |
| 8,118,274 B2 | 2/2012 | McClure et al. |
| D672,783 S | 12/2012 | Robinson |
| 8,382,059 B2 | 2/2013 | LeGette et al. |
| 8,387,930 B2 | 3/2013 | Drew et al. |
| 8,833,716 B2 | 9/2014 | Funk et al. |
| 9,506,281 B1* | 11/2016 | Zaloom ............... E05D 11/1028 |
| 2003/0038567 A1* | 2/2003 | Doan .................... G06F 1/1616 312/223.2 |
| 2004/0007649 A1 | 1/2004 | Vettraino |
| 2005/0122671 A1* | 6/2005 | Homer ................. G06F 1/1618 361/679.27 |
| 2005/0155183 A1 | 7/2005 | Lu et al. |
| 2006/0084585 A1 | 4/2006 | Lin |
| 2006/0137491 A1 | 6/2006 | Chen |
| 2006/0175484 A1 | 8/2006 | Wood, III et al. |
| 2006/0197861 A1* | 9/2006 | Won ...................... G06F 1/1618 348/333.06 |
| 2008/0156836 A1 | 7/2008 | Wadsworth et al. |
| 2008/0174943 A1* | 7/2008 | Hirasawa .............. G06F 1/1616 361/679.27 |
| 2008/0314941 A1* | 12/2008 | Knych ...................... A45F 5/02 224/191 |
| 2009/0167691 A1* | 7/2009 | Wang .................... G06F 1/1616 345/168 |
| 2009/0183341 A1* | 7/2009 | Chuan .................. G06F 1/1601 16/358 |
| 2010/0250789 A1* | 9/2010 | Collopy ................ G06F 1/1616 710/13 |
| 2011/0075332 A1* | 3/2011 | Chen ..................... E05B 65/006 361/679.01 |
| 2011/0094058 A1 | 4/2011 | Van Gennep |
| 2011/0102752 A1* | 5/2011 | Chen ...................... F16M 11/10 353/119 |
| 2011/0157804 A1* | 6/2011 | Chen ..................... G06F 1/1616 361/679.14 |
| 2011/0228457 A1* | 9/2011 | Moon .................... G06F 1/1626 361/679.01 |
| 2012/0074272 A1 | 3/2012 | Hull |
| 2012/0111881 A1 | 5/2012 | Gaddis, II et al. |
| 2012/0126088 A1 | 5/2012 | Whittaker et al. |
| 2012/0326003 A1 | 12/2012 | Solow et al. |
| 2013/0080670 A1* | 3/2013 | Medica ................. G06F 1/1626 710/110 |
| 2013/0092805 A1 | 4/2013 | Funk et al. |
| 2013/0092811 A1 | 4/2013 | Funk et al. |
| 2013/0100601 A1* | 4/2013 | Griffin .................. G06F 1/1616 361/679.27 |
| 2013/0172055 A1* | 7/2013 | Han ...................... G06F 1/1626 455/566 |
| 2013/0233984 A1 | 9/2013 | Huang |
| 2013/0256478 A1 | 10/2013 | Reda et al. |
| 2013/0277520 A1 | 10/2013 | Funk et al. |
| 2014/0016799 A1* | 1/2014 | Kumar ..................... H04R 1/04 381/122 |
| 2014/0036430 A1* | 2/2014 | Wroblewski .......... G06F 1/1626 361/679.4 |
| 2014/0054426 A1 | 2/2014 | Burns |
| 2014/0063750 A1 | 3/2014 | Mau et al. |
| 2014/0104782 A1* | 4/2014 | Lin .......................... H05K 7/02 361/679.44 |
| 2014/0116230 A1 | 5/2014 | Nakata et al. |
| 2014/0146458 A1* | 5/2014 | Zhao ....................... G06F 1/16 361/679.07 |
| 2014/0153188 A1* | 6/2014 | Huang .................. G06F 1/1626 361/679.58 |
| 2014/0259532 A1 | 9/2014 | Millard et al. |
| 2014/0328020 A1 | 11/2014 | Galant |
| 2014/0346311 A1 | 11/2014 | Derman |
| 2014/0347812 A1* | 11/2014 | Lee ....................... G06F 1/1679 361/679.55 |
| 2015/0138713 A1* | 5/2015 | Onda .................... G06F 1/1679 361/679.27 |
| 2015/0293562 A1* | 10/2015 | Nakamura ............ G06F 1/1616 361/679.27 |

OTHER PUBLICATIONS

"Ipad/Tablet Holding Products—Galaxy Tab Stand, Ipad Leg Strap, Nook Holder @ Hand e Holder", www.handholder.com, Mar. 15, 2013, four pages.

"HandyShell for iPad, iPad Cases & Covers/SpeckProducts", Mar. 15, 2013, two pages.

Detachable Metal Stand for iPad, Cell Phone, Smartphone, Tablet Accessories/iKross, Mar. 15, 2013, two pages.

"Life-Phorm All-in-One Positioning Device for iPad 3, iPad 4, Tablets, Smartphones and Cameras (000LIF)", Amazon.com: Life-Phorm All-in-One Positioning Device for iPad 3, iPad 4, Tablets, Smartphones and Cameras (000LIF): Computers & Accessories, Apr. 18, 2013, four pages.

"Stabile Coil PRO—Flexible Gooseneck Coil Based Pivoting iPad Stand—iPad 4g, 3g, iPad 2 and 1g", Stabile Coil PRO Flexible Gooseneck Coil Pivoting iPad 4g, 3g, iPad 2 and iPad Stand Holder, Apr. 18, 2013, four pages.

"Buzz / ZeroChromaZeroChroma", Mar. 15, 2013, twelve pages.

* cited by examiner

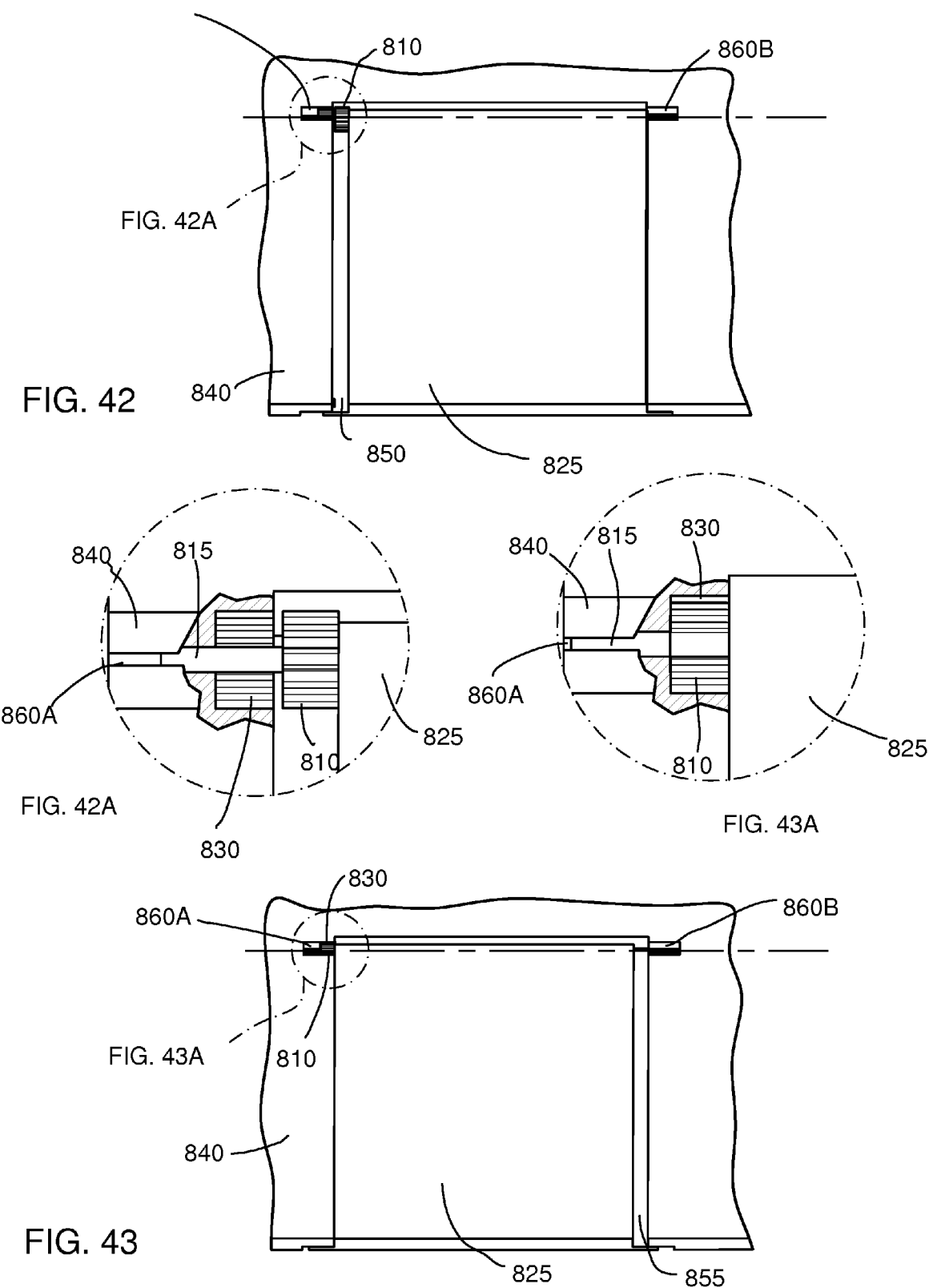

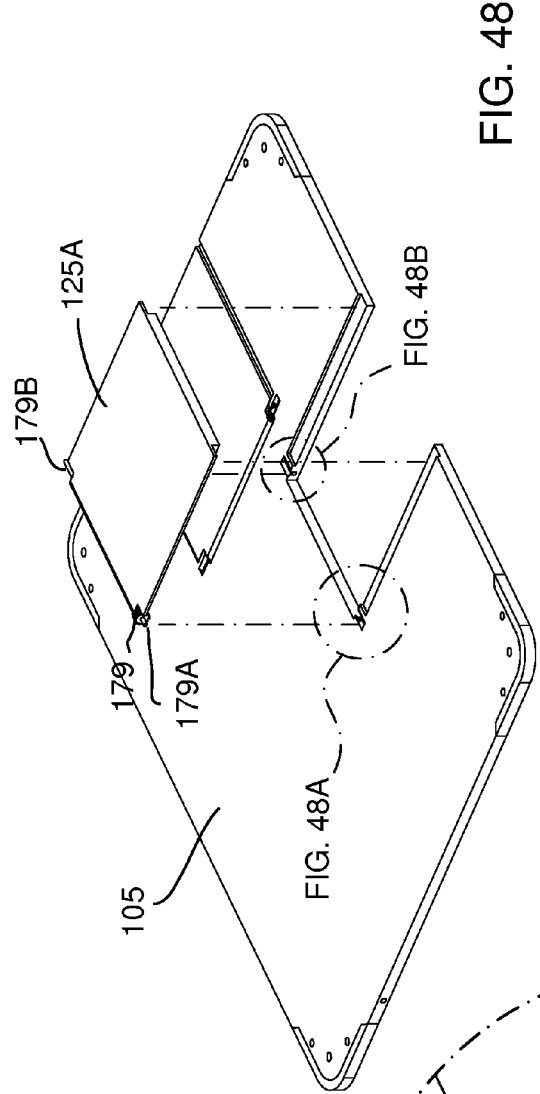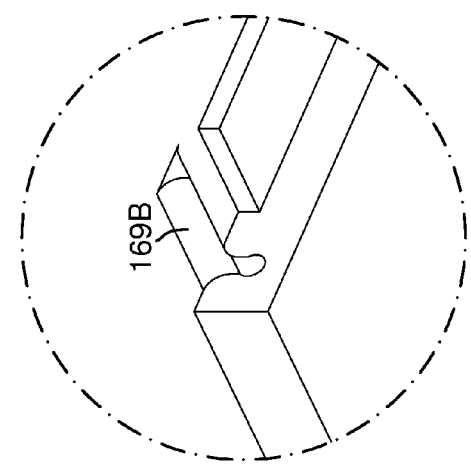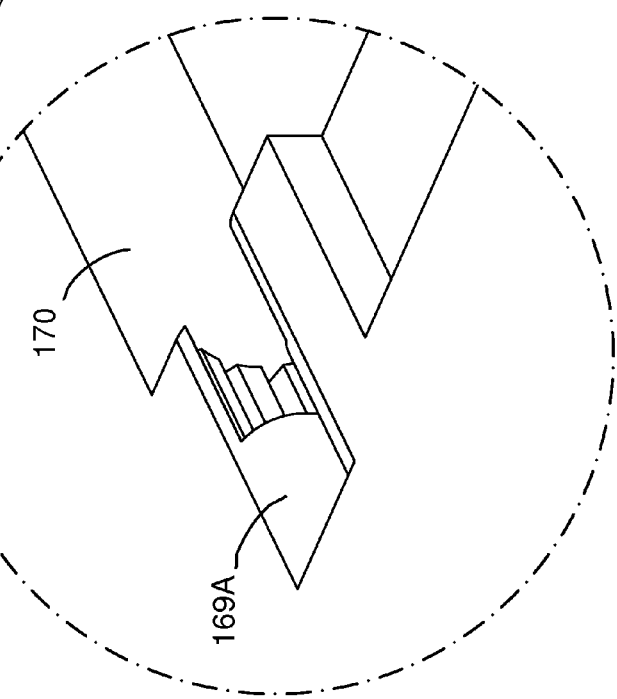

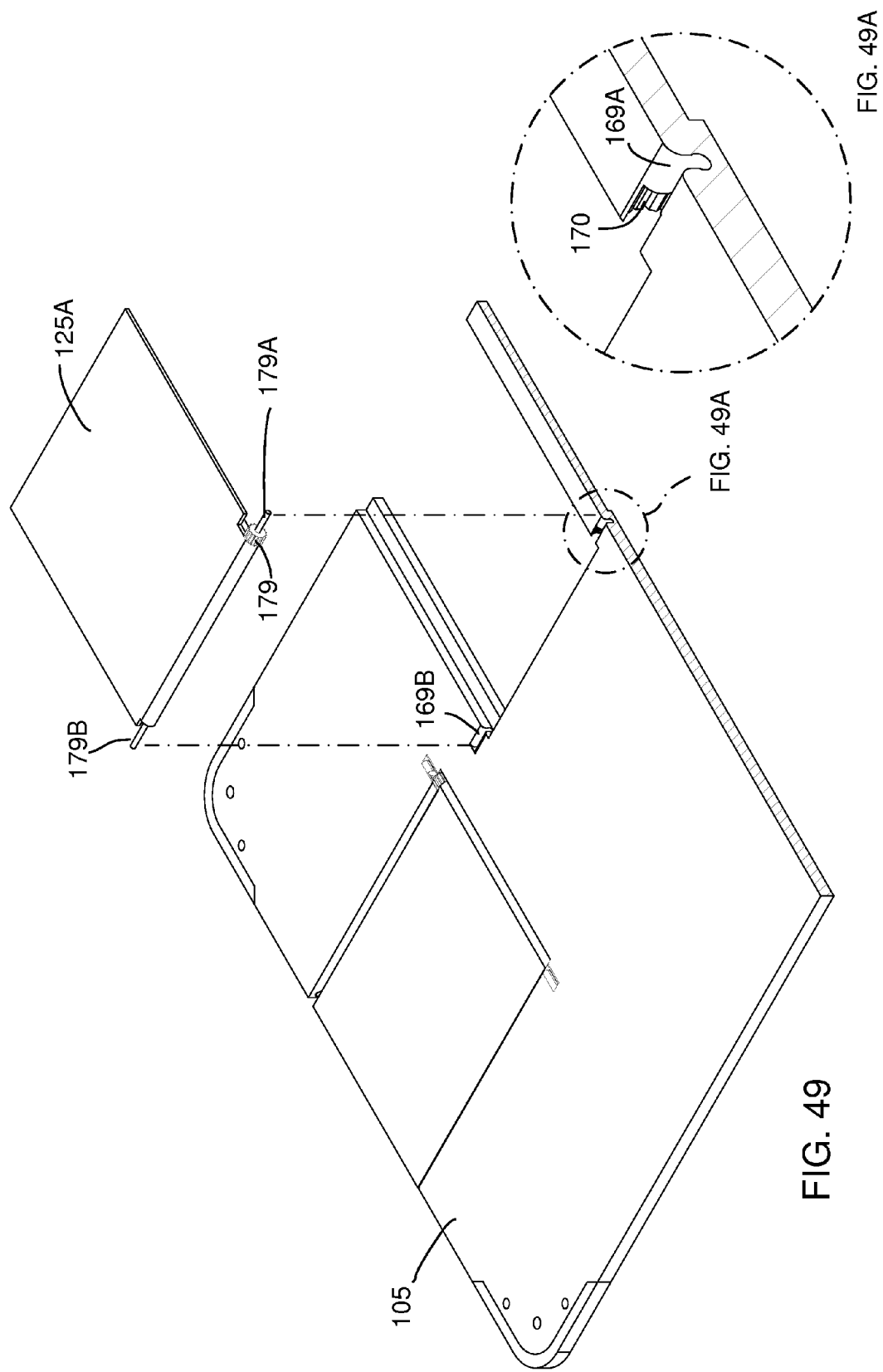

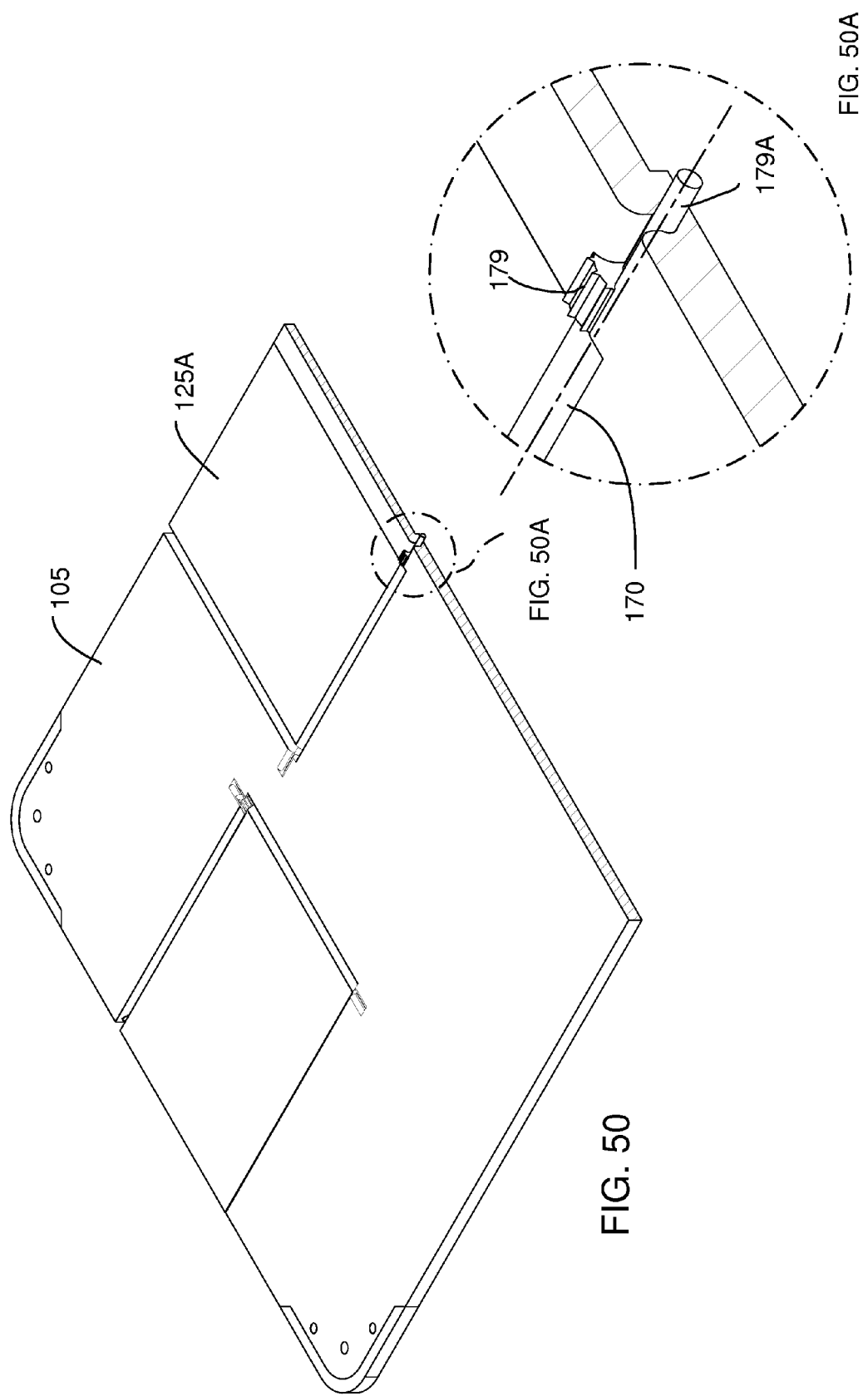

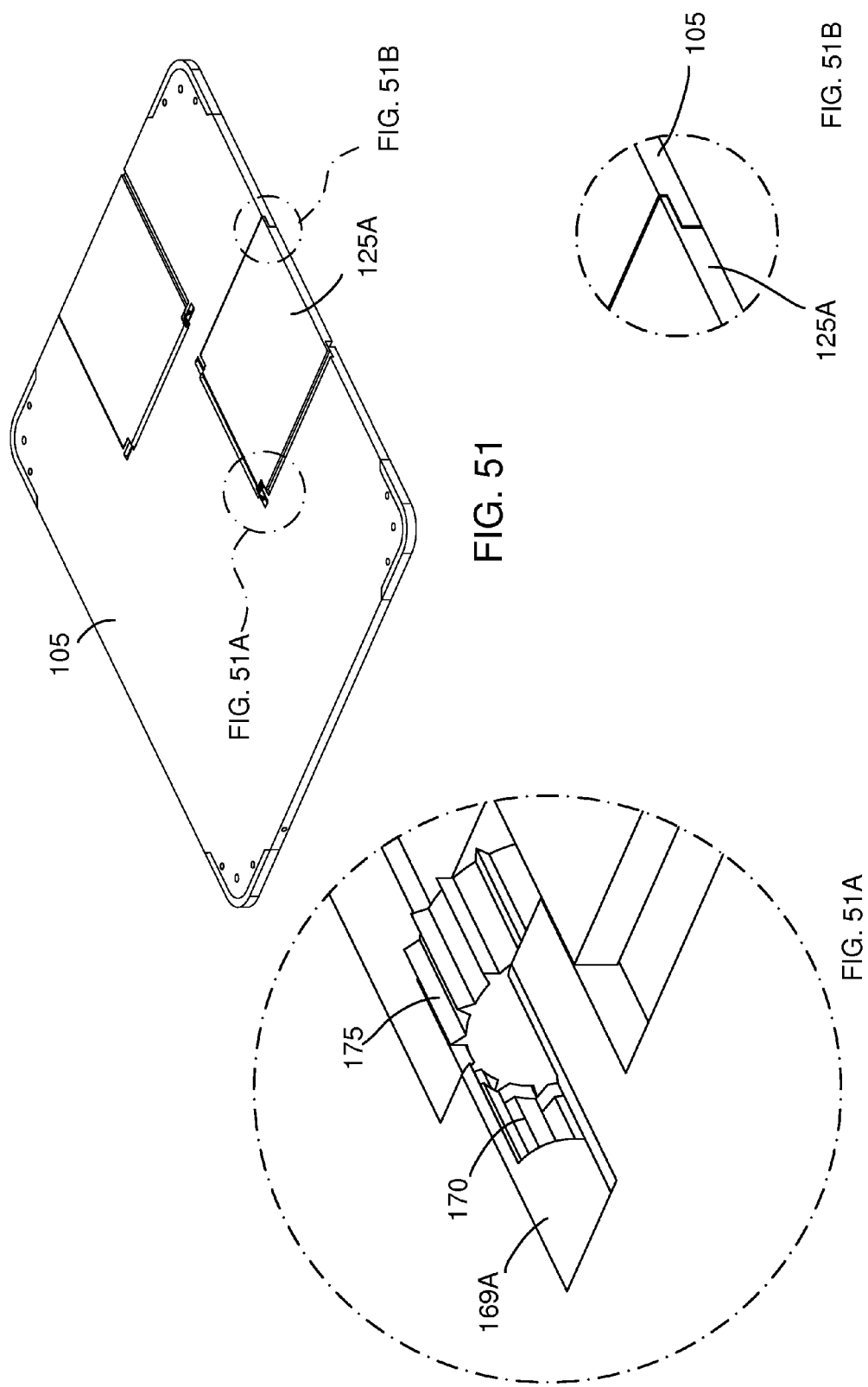

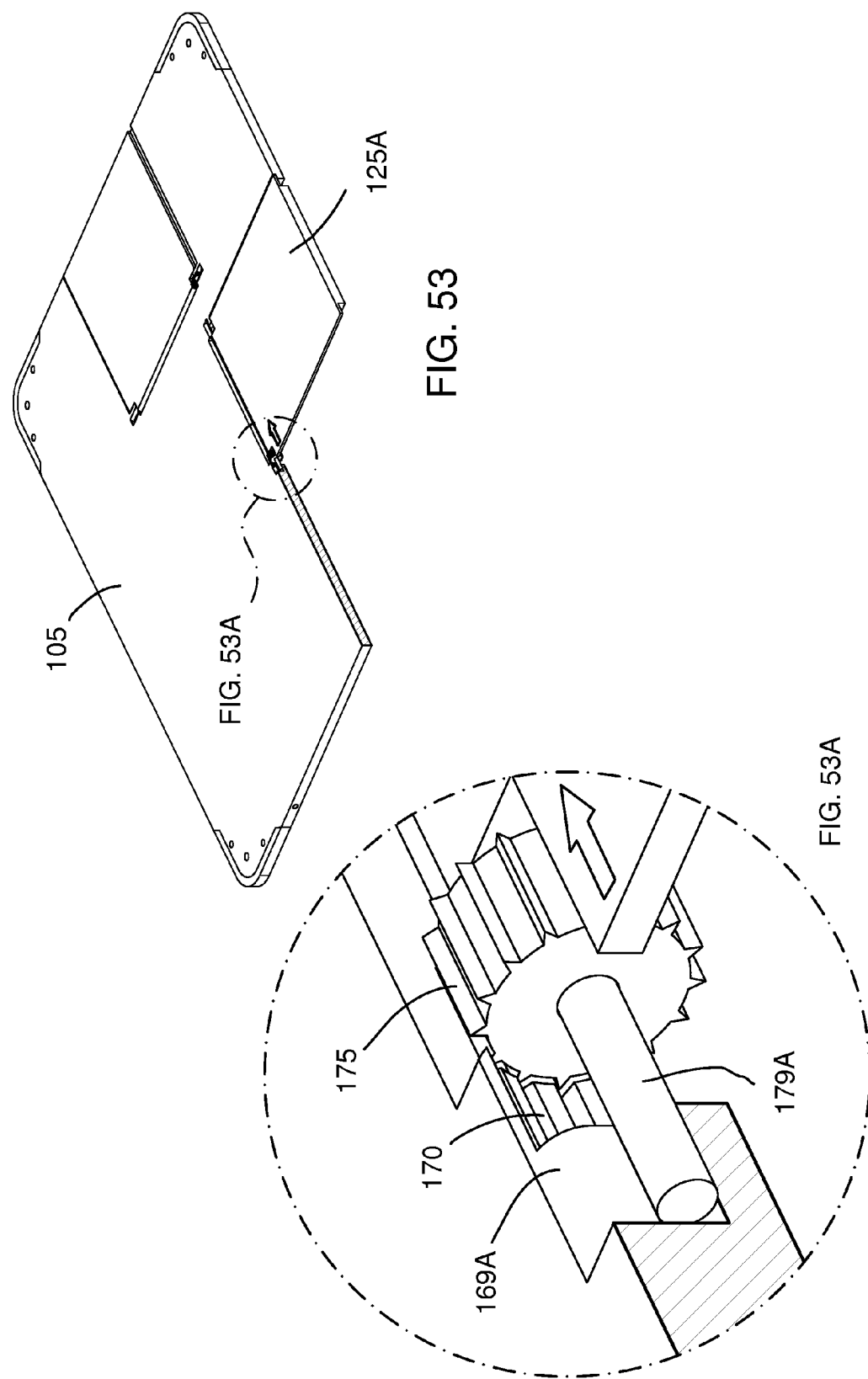

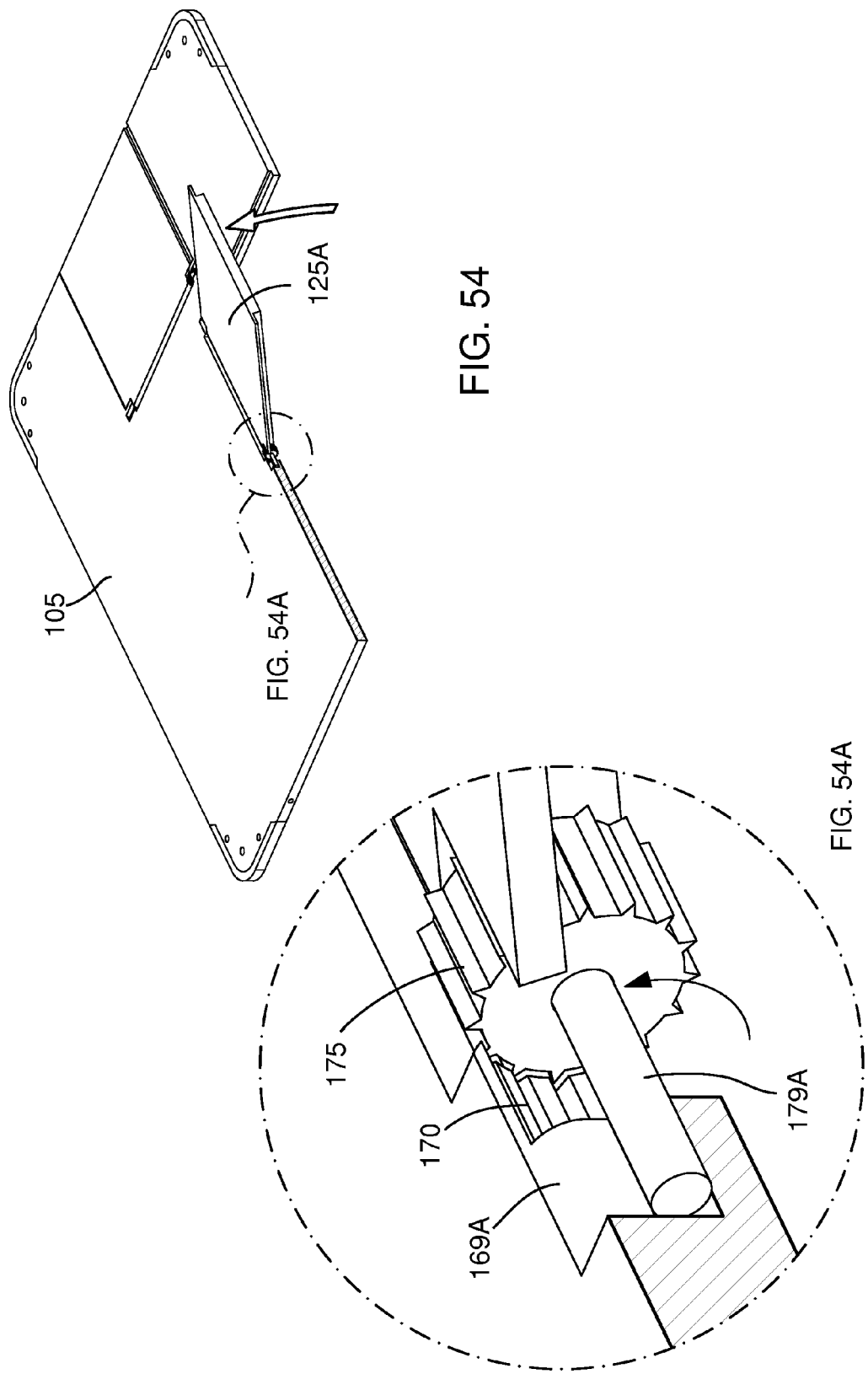

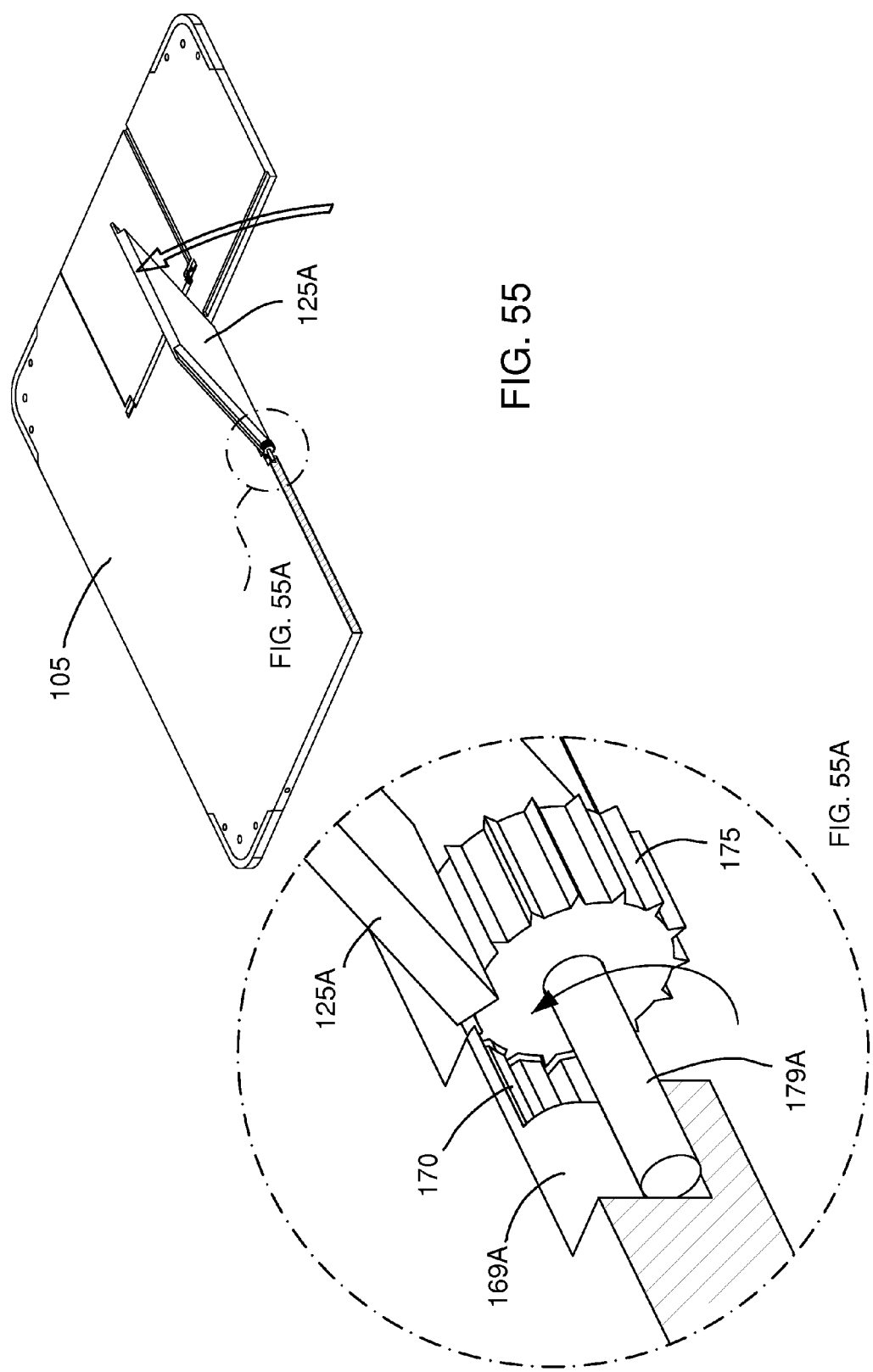

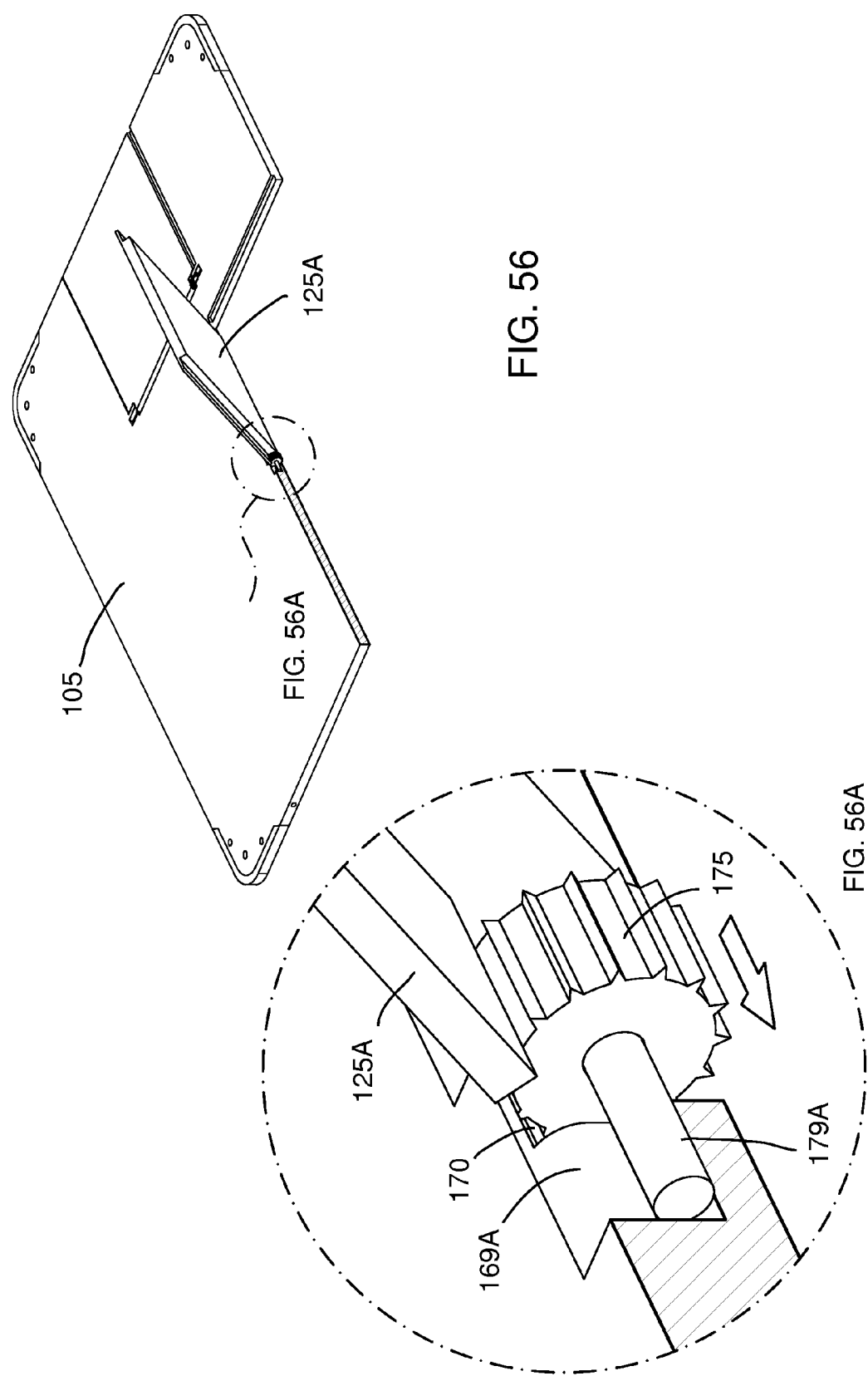

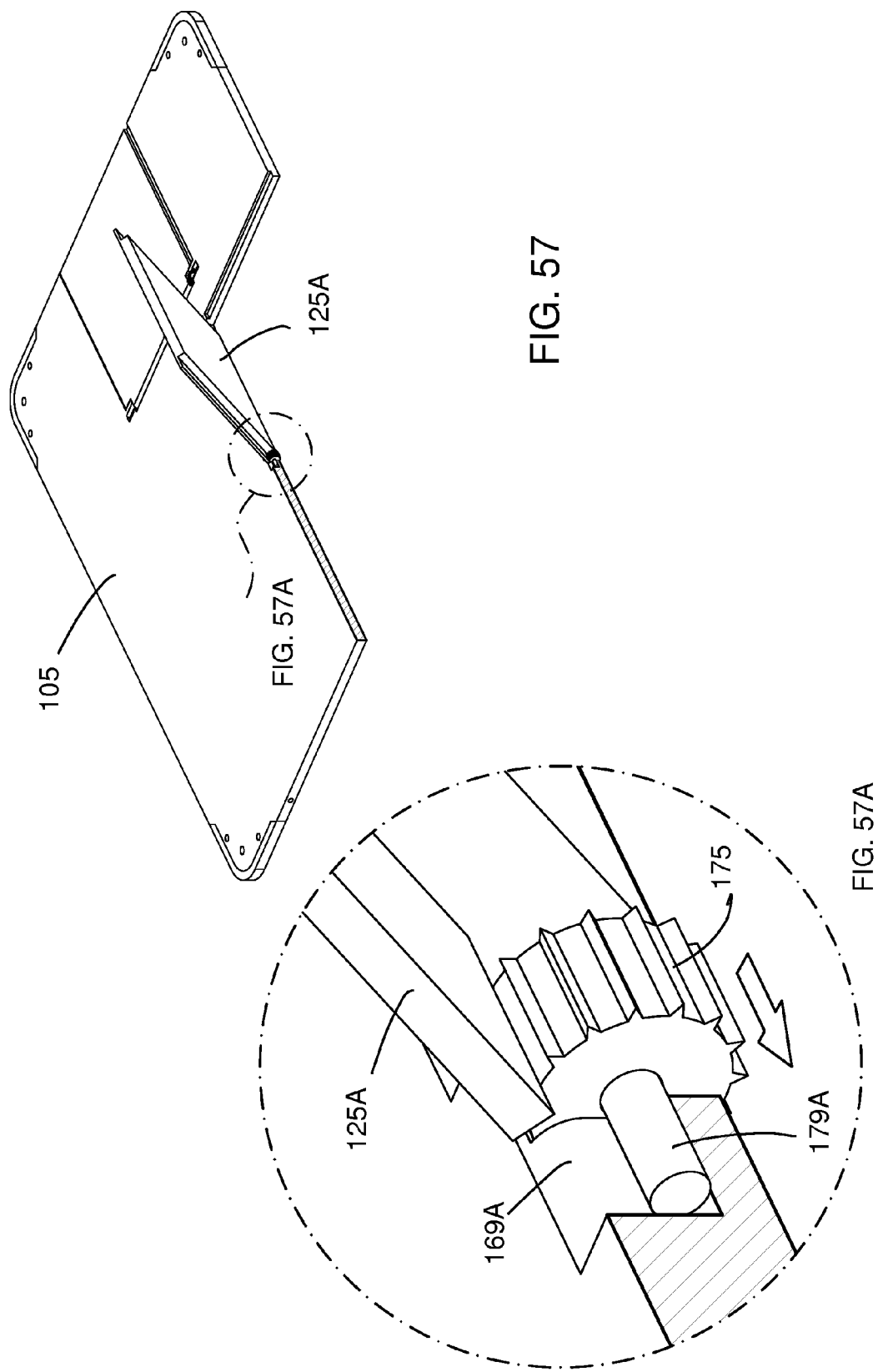

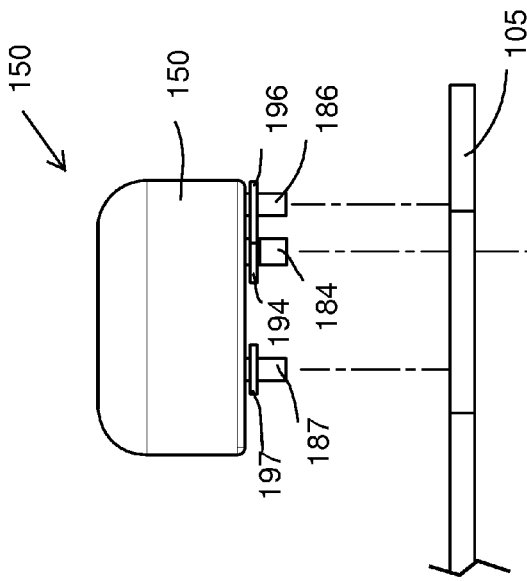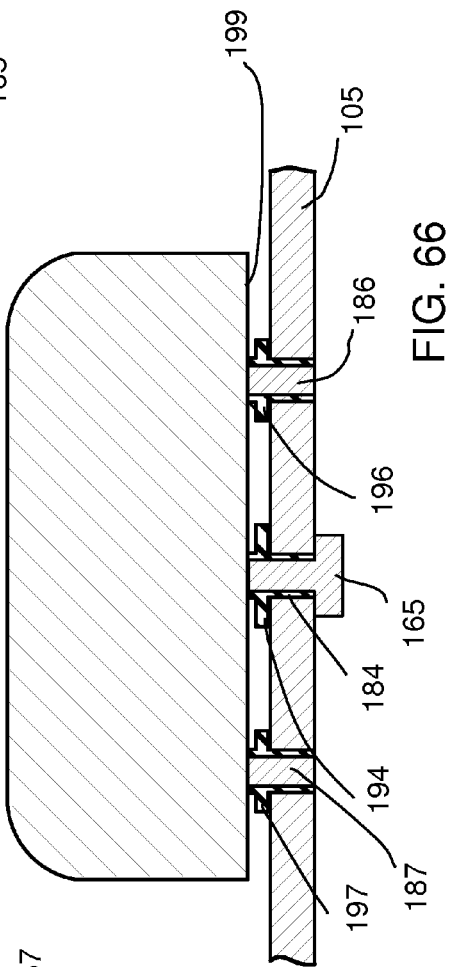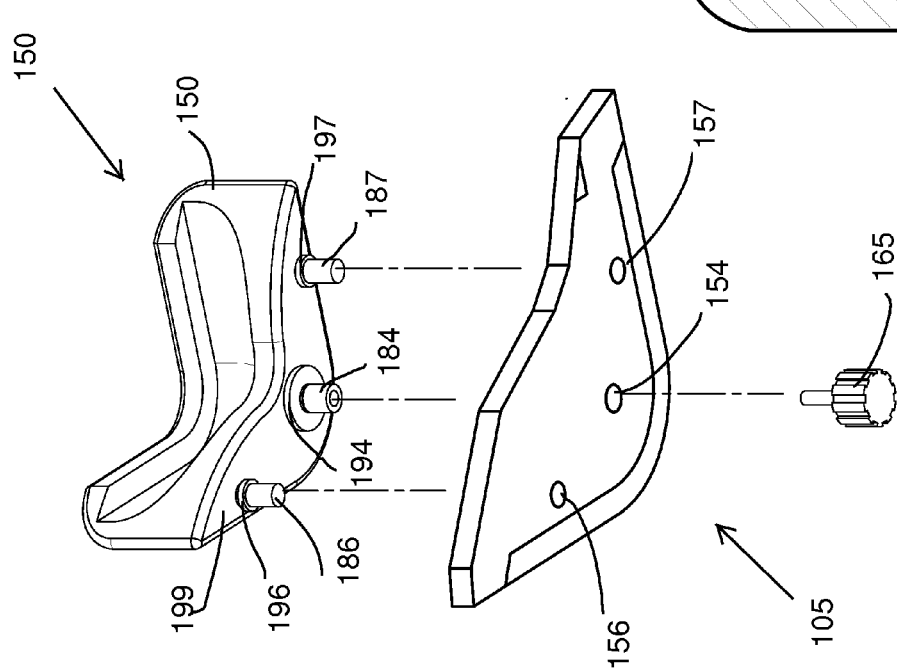

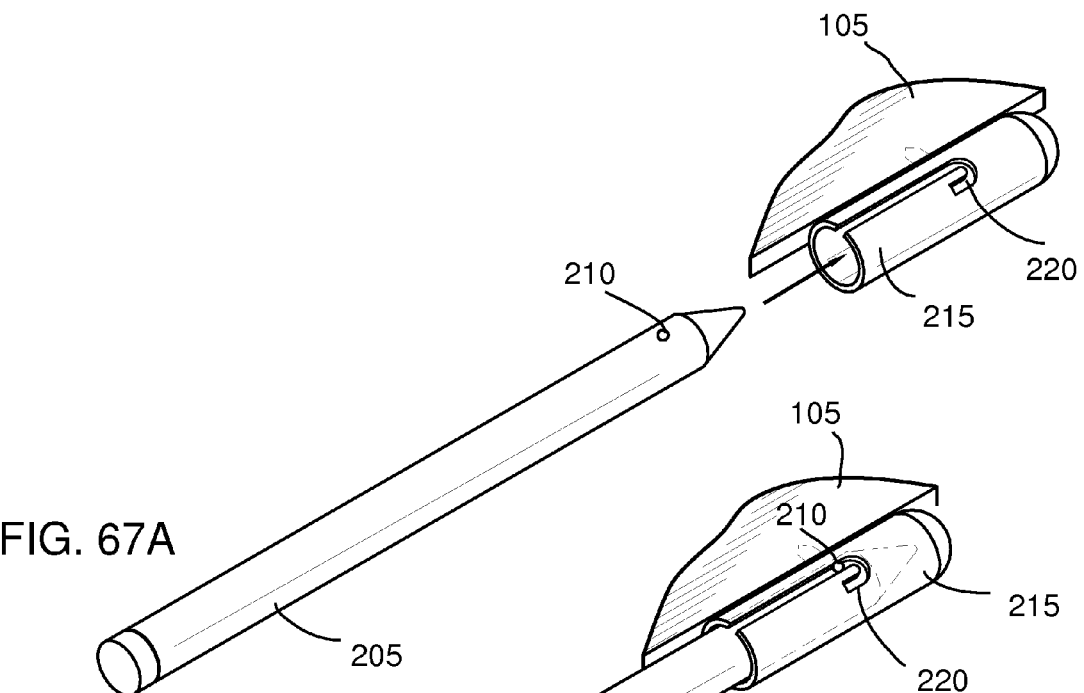
FIG. 67A
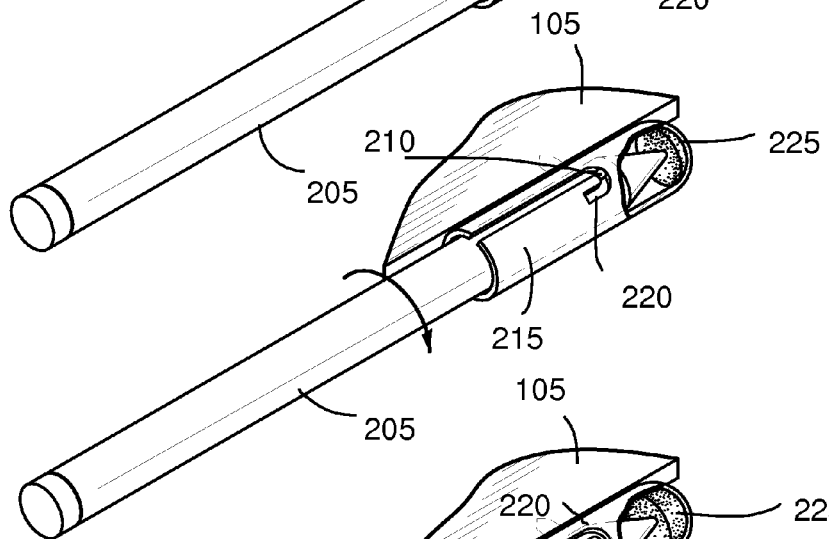
FIG. 67B
FIG. 67C
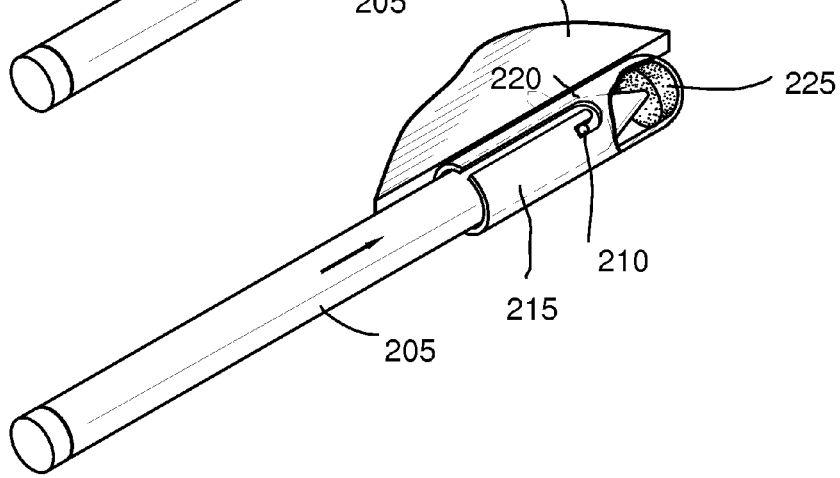
FIG. 67D

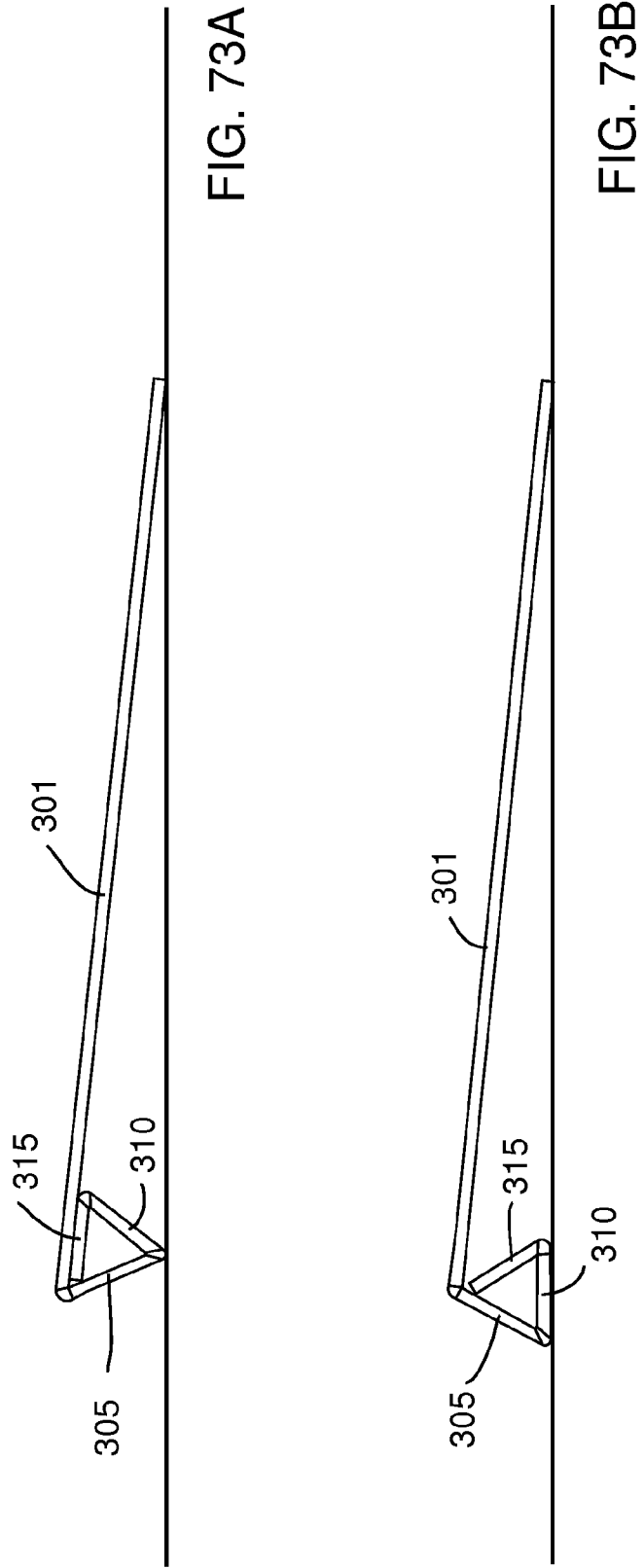

TABLET TRANSFORMER

CROSS-REFERENCES TO RELATED APPLICATIONS

This application claims the benefit U.S. Provisional Patent Application No. 61/813,893, filed Apr. 19, 2013, and U.S. Provisional Patent Application No. 61/878,491, filed Sep. 16, 2013, both of which applications are incorporated by reference in their entirety.

BACKGROUND OF THE INVENTION

The invention relates to integrated mechanical devices for the efficient positioning and use of tablet computers for optimal user input and viewing experience. More particularly, the example non-limiting technology herein relates to devices that are particularly suited for taking notes, drawing, typing, and viewing on tablet computers to make such devices vastly more usable, enjoyable, and crash resistant.

Since the introduction of the Apple iPad™ in April 2010, the number of computing devices known as computer tablets, or "tablets" has vastly increased. These devices typically consist of a touch screen that fronts a highly sophisticated, versatile, thin, and lightweight computer.

In some computing environments, for example, the display/tablet may have to be positioned to various angles and orientations with respect to the base (a resting surface) in order to eliminate glare or to enter data via a virtual, on-screen, keyboard.

Moreover, with the advent of the Samsung Galaxy Note 10.1™ tablet in early 2012 and the Microsoft Surface Pro™ tablet in early 2013—both of which incorporate a stylus—the display may not only need to be positioned to various angles and orientations with respect to the base, but it may also need to support the load and the pressure of a human hand pressing a stylus against the display surface of the tablet at multiple viewing and writing angles, both for ergonomic reasons and to eliminate distracting reflections or glare. In addition, the introduction of wireless keyboards that work seamlessly with tablet devices make it advantageous in certain computing environments not only to have a keyboard that can easily attach and detach from an accompanying tablet, but also to have that keyboard adjust in height so that a user's fingers do not overstretch when reaching the upper-rung characters of the keyboard.

Lastly, as camera lens attachments that can vastly enhance the capabilities of the built-in camera lenses of tablets and mobile phones are starting to appear on the market, a quick-release protective housing for tablets and mobile phones may vastly facilitate the mounting and un-mounting of such fitted lens attachments.

An analysis of a multitude of offerings from several manufacturers of tablets and tablet accessories revealed that the great majority of current tablet stands, folios, and covers provide either fixed or limited adjustability; typically resulting in either one or two display angles—and practically none currently offers a tablet stand, folio, or cover that is designed to withstand a sustainable load pressure of at least 1 lbs (one pound) and above at display angles ranging from about 5 degrees to about 15 degrees (with respect to a resting surface or base) which may be applied by users when using a stylus to draw or to write. A company that currently offers a display stand or a tablet accessory with more than two display angles is ZeroChroma, LLC (http://www.zerochroma.com) through their "Theater-Stand" smart cover for the iPhone™, iPad™, and iPod Touch™ (see US patent application numbers US Published Patent Applications 2010/0072334; 2011/0031287 and 2013/0134291) as well as through their new "Vario" stands for iPhones™ and iPads™. While the ZeroChroma, LLC designs provide multiple viewing angles that can effectively eliminate glare and provide an ergonomic viewing experience, they only provide for a single load bearing viewing angle that can support hand-writing with a stylus without potentially sliding the display during hand-writing. The ZeroChroma™ single load-bearing angle for the iPad 3™ and iPad 4™ is about 25 degree angle with respect to a resting surface or base and about 20 degree angle for the iPad Mini™—both angles well above the comfort zone for hand-writing and drawing for most people, which ranges, for most people, from about 5 degrees to about 15 degrees with respect to a resting surface or base.

In addition, even among the limited current crop of electronic tablet manufacturers that imbed a pen holster in their tablets, such as Samsung, HP, and NVIDIA, no electronic manufacturer currently provides the ability to attach and detach pen holsters for pens of various widths and sizes based on user preferences and application requirements—the need for which is demonstrated by the availability of the Samsung "S-Pen" holder kit—which is nothing more than a hollow enclosure that enables users to insert an electronic stylus into the shape of a traditional ink pen to give them more comfort and control when using their imbedded electronic stylus. Such holder kit, if used, would defeat the purpose of embedding a pen holster into Samsung's tablets.

Also, while several tablet manufacturers such as Sony and Microsoft provide a magnetically attached keyboard to their electronic tablets, analysis indicates that none currently provide a height adjustable keyboard with their offerings.

Finally, as camera lens attachments that can vastly enhance the capabilities of the built-in camera lenses of tablets and mobile phones are appearing on the market, a quick release mounting plate with bumper-style edge protection and a removable, but connected, top section for quick tablet insertion and retrieval would enable the quick mounting of camera lens attachments without the need to remove the tablet or mobile phone from its protective cover. In fact, when mounted on a mounting plate with built-in retractable supporting elements that can withstand pressure of 1 lb. and above at angular positions between about 5-degree angle and 45-degree angle, that is equipped with bumper-style edge protection, a pen attachment, and a magnetically attached wireless keyboard, a tablet device can easily transform into a drafting and note-taking tablet as well as to an enhanced-function laptop computer.

Therefore, a need exists for integrated, quick-release, tablet enclosures and mechanical devices that can transform the form and function of most electronic tablet devices to assume the roles of a drafting and note-taking tablet, a laptop computer, and a desktop computer, with added enhancements for drop protection, portability, functionality, and ergonomics.

BRIEF SUMMARY OF THE INVENTION

The inventions that have been conceived and are disclosed are integrated mechanical devices for the quick and efficient positioning and use of tablet computers for optimal user input and viewing experience enabling tablet computers to assume the form and function of a drafting and note-taking tablet, a laptop computer, and a desktop computer, with added enhancements for drop protection, portability, functionality, and ergonomics.

The invention may be embodied to include one or more of:

1. A slim, low profile, tablet holder for computer tablets which consists of a mounting plate with four contoured rubber bumpers on each corner of the mounting plate. The mounting plate consisting of a front surface, a rear surface, and a side wall extending between the front surface and the rear surface and includes at least one cavity and a retaining channel or pin used to retain a supporting element. The supporting element is movable between a retracted position and at least two extended positions relative to the body. The supporting element being disposed in the flush position within the body in its retracted position and extending from the body to provide orientation and support in its extended positions. The mounting plate is supplemented with four molded rubber brackets in close proximity to the contoured rubber bumpers for cradling tablet devices while leaving most of the side control areas of the devices as well as their entire frontal area unobstructed.

2. In another embodiment, the mounting plate is further augmented with a detachable electronic pen holder for holding an electronic stylus.

3. In another embodiment, the mounting plate is further augmented with a height adjustable detachable wireless magnetic keyboard.

4. In yet another embodiment, the mounting plate is split into two sections with bumper-style edge protection for quick tablet insertion and retrieval.

An invention has been conceived and is disclosed herein for an adjustable tablet support assembly comprising: a support panel seated in a slot or recess of a back panel of a tablet or tablet support plate, wherein the support panel has a width dimension narrower than a width of the slot; a hinge assembly connecting the support panel to the back panel, the hinge assembly including: at least one shaft extending from a first edge of the support panel and the at least one shaft extends at least the width of the slot; a disc with teeth; an aperture configured to receive the disc, wherein the aperture includes teeth configured to intermesh with the teeth of the disc while the disc is seated in the aperture, the disc and aperture are aligned with an axis of the at least one shaft; wherein the aperture or disc is fixed to the at least one shaft and the other of the disc or aperture is fixed to the support panel, and wherein a difference between the width of the support panel and the width of the slot is at least a thickness of the disc.

The support panel may slide along the plane of the back panel to insert and remove the disc from the aperture. The support panel may pivot about the at least one shaft from a first position parallel to the back panel to a second position at which the support panel forms an angle between five to sixty degrees with respect to the back panel. The seating of the disc in the aperture may lock the angular position of the support panel with respect to the back plate. The support panel may include a first edge aligned with an edge of the back panel, wherein the first edge is opposite to a second edge of the support panel aligned with the at least one shaft. The first edge of the support panel may be parallel to the at least one shaft. The at least one shaft is a single shaft extending the width of the slot and having an end opposite to the aperture which seats in a bearing slot in the back panel. The back panel may included a back plate mounted to a tablet computing device having a display screen on a panel opposite to the back plate. The disc with teeth may be one of a group consisting of a spur gear, ratchet wheel, a shaft end shaped as a hex (or Allen) wrench, a disc with pins or ridges (effectively teeth) extending from a front face of the disc, or other similar locking mechanisms.

An invention has been conceived and is disclosed here of a tablet holder comprising: a back panel including a first surface configured to face a back of a tablet display device and a second surface, opposite to the first surface including an attachment mechanism; a support panel seated in a slot or recess of the back panel, wherein the support panel has a width dimension narrower than a width of the slot; a hinge assembly connecting the support panel to the back panel, the hinge assembly including: at least one shaft extending from a first edge of the support panel and the at least one shaft extends at least the width of the slot; a disc with teeth extending around at least a portion of the circumference of the disc; an aperture configured to receive the disc, wherein the aperture includes teeth configured to intermesh with the teeth of the disc while the disc is seated in the aperture, the disc and aperture are aligned with an axis of the at least one shaft; wherein the aperture or disc is fixed to the at least one shaft and the other of the disc or aperture is fixed to the support panel, and wherein a difference between the width of the support panel and the width of the slot is at least a thickness of the disc.

The support panel may slide along the plane of the back surface to insert and remove the disc from the aperture, and pivot about the at least one shaft from a first position parallel to the back surface to a second position at which the support panel forms an angle between five to eighteen degrees with respect to the back panel.

A method has been conceived to support a tablet display or computing device on a generally horizontal surface wherein a support panel is pivotably attached to a back panel associated with the tablet display or computing device, the method comprising: moving a support panel seated in a slot or recess of the back panel, wherein the support panel has a width dimension narrower than a width of the slot and the movement moves the support panel in a first direction laterally in the slot to a pivot position; disengaging a locking key from a locking receptacle by the movement of the support panel, wherein the locking key and locking receptacle are aligned along an axis; while the support panel is in the pivot position, pivoting the support panel about the axis to form an angle between the support panel and the back surface in a range of five to sixty degrees; after pivoting the support panel and while the support panel is at the angle, moving the support panel in a second direction, opposite to the first direction, to engage the locking key with the locking receptacle, wherein the support panel is locked at the angle with respect to the back panel while the locking key is engaged with the locking receptacle, and while the support panel is locked at the angle, positioning an edge of the tablet display or computing device and an edge of the support panel on the generally horizontal surface.

The locking key may includes a disc with teeth on a periphery of the disc and the locking receptacle includes teeth configured to intermesh with the teeth on the disc, and the step of disengaging the locking key includes sliding the disc from the locking receptacle, and the step of engaging the locking key includes sliding the disc into the locking receptacle.

A holder has been conceived for a pointing device comprising: a holder housing including a sidewall extending around a receptacle configured to receive an end portion of the pointing device, wherein the holder housing includes an open end of the receptacle and a second end, opposite to the first end; a fastener configured to attach the holder housing to a tablet display or computing device; a resilient member within the holder housing and positioned proximate to the second end, wherein the resilient member is configured to deform at least a certain distance when an end of the pointing device is pushed into the holder and against the resilient member; a slot in the sidewall including a first slot section having an open end at the open end of the holder housing and a distal section, a second slot section offset from the first slot section and having a closed end in the sidewall for the holder housing, a bridge slot connecting the distal section of the first slot and an entrance to the second slot, wherein the slot in the sidewall is configured to receive a locking post on a side of the pointing device, wherein the locking post slides through the first slot section, across the bridge slot section and is retained in the second slot section. The slot may have a J-shape wherein the first slot section represents a long section of the J-shape, and the bridge slot section and the second slot section together represent a hook portion the J-shape. The holder housing may be positioned along and parallel to an edge of the tablet display or computing device.

A casing has been conceived and is disclosed herein for a tablet display or computing device comprising: a main back casing including a main back panel having sidewalls at three of four edges of the back panel and a fourth edge; a secondary back casing including a secondary back panel and sidewalls at three of four edges of the secondary back panel and a forth edge of the secondary back panel configured to abut the fourth edge of the main back panel; a slot in the main back panel or the secondary back panel, the slot including opposite sides and each side including a groove; a tongue panel extending from the fourth edge of the secondary back panel or main back panel and the tongue panel configured to seat in the slot, wherein the tongue panel includes sides each adjacent one of the opposite sides of the slot, and pins on each of the sides of the panel configured to slidably engage the grooves, wherein the pins are aligned along an axis parallel to the fourth edge, wherein the tongue panel has a first position seated in the slot and in a plane of both of the main and secondary back panels, and a second position in which the tongue panel is pivoted about the pins.

A back panel assembly has been conceived and is disclosed herein for a tablet display or computing device comprising: a back panel including apertures at each of four corner positions, wherein the dimensions of the corner positions correspond to dimensions of the corners of the tablet display or computing device; annular bushings in each of the apertures; a corner brace for each of the corner positions, the corner brace including an inside surface configured to receive one of the corners of the tablet display or tablet computing device and the corner brace formed of a deformable material; a post on a first surface of each corner brace, wherein the post is configured to be inserted into a first of the annular bushing in one of the apertures; a threaded aperture in each corner brace having an open end at the first surface and configured to align with a second of the annular bushings in another one of the apertures, and a fastener for each corner brace and including a shaft with threads configured to engage the threaded aperture in the corner brace, wherein the fastener includes a head attached to the corner brace which abuts the back panel while the fastener is in the threaded aperture to hold the back panel to the tablet display or computer device.

BRIEF DESCRIPTION OF THE FIGURES

The figures show embodiments of the invention disclosed and claimed in this application. The figures are:

FIG. 42 illustrates a two-dimensional representation wherein a supporting element is in the unlocked flush position with a tablet holder mounting plate.

FIG. 42A shows additional details of the FIG. 42 detailing an unlocked position of the geared end configuration of the pin that engages with a channeled opening within the tablet holder mounting plate wall.

FIG. 43 illustrates a two-dimensional representation wherein a supporting element is in the locked flush position with a tablet holder mounting plate.

FIG. 43A shows additional details of the FIG. 43 detailing a locked position of the geared end configuration of the pin that engages with a channeled opening within the tablet holder mounting plate wall.

FIGS. 48 and 48A-48B show how a supporting element can be coupled to a tablet holder mounting plate.

FIGS. 49-50 and 49A-50A illustrate a close-up cross-section of how a supporting element can be coupled to a tablet holder mounting plate.

FIGS. 51-57, 51A-57A, and 51B-52B show an example three-dimensional perspective flip chart animation of how a supporting element can be moved from side to side to lock, unlock, rotate, and relock it with respect to a tablet holder mounting plate.

FIG. 64 illustrates a three-dimensional bottom perspective view of how a molded rubber bracket is secured to a tablet holder mounting plate.

FIG. 65 illustrates a two-dimensional side view of FIG. 64.

FIG. 66 illustrates a cross-sectional two-dimensional representation of FIG. 64.

FIG. 67A-67D illustrates an image sequence where an electronic pen is secured into a detachable stylus holder.

FIG. 73A-73B illustrate two-dimensional side views of alternative embodiments of a raised wireless magnetic detachable keyboard.

DETAILED DESCRIPTION OF THE INVENTION

The embodiments of the invention disclosed herein are directed to tablet optimizing mechanical devices for providing multiple adjustable angular hand-writing support in both portrait and landscape orientations for a more natural note-taking and drafting experience, multiple adjustable viewing angles in both portrait and landscape orientations for a more comfortable viewing experience, a detachable inclined keyboard for a more ergonomic typing experience, a secure removable pen attachment for maximum drafting and note-taking convenience, robust padding for maximum crash protection, and a quick release mounting plate with bumper-style edge protection for quick tablet insertion and retrieval.

FIG. 1-FIG. 32: Represent various embodiments of the invention.

FIG. 33-FIG. 61: Represent various embodiments of the workings and implementation of an adjustable multiple viewing and hand-writing support mechanism for tablet computers.

FIG. 62-FIG. 66: Represent various embodiments of the workings and implementation of a drop resistant tablet holding brackets mechanism.

FIG. 67A-FIG. 69: Represent various embodiments of the workings and implementation of a detachable stylus mechanism.

FIG. 70-FIG. 74: Represent various embodiments of the workings and implementation of a height adjustable detachable wireless magnetic keyboard mechanism.

FIG. 75-FIG. 83: Represent various embodiments of the workings and implementation of a quick-release mounting plate mechanism.

DETAILED DESCRIPTION

The following figures illustrate the mechanics of exemplary devices. The displayed embodiments are shown for exemplary purposes, the various parts shown in the provided illustrations, such as gears, shafts, hinges, openings, springs, buttons, and plates can have various shapes and sizes to fit the desired form and function of the device in which they are integrated.

Figure 1:
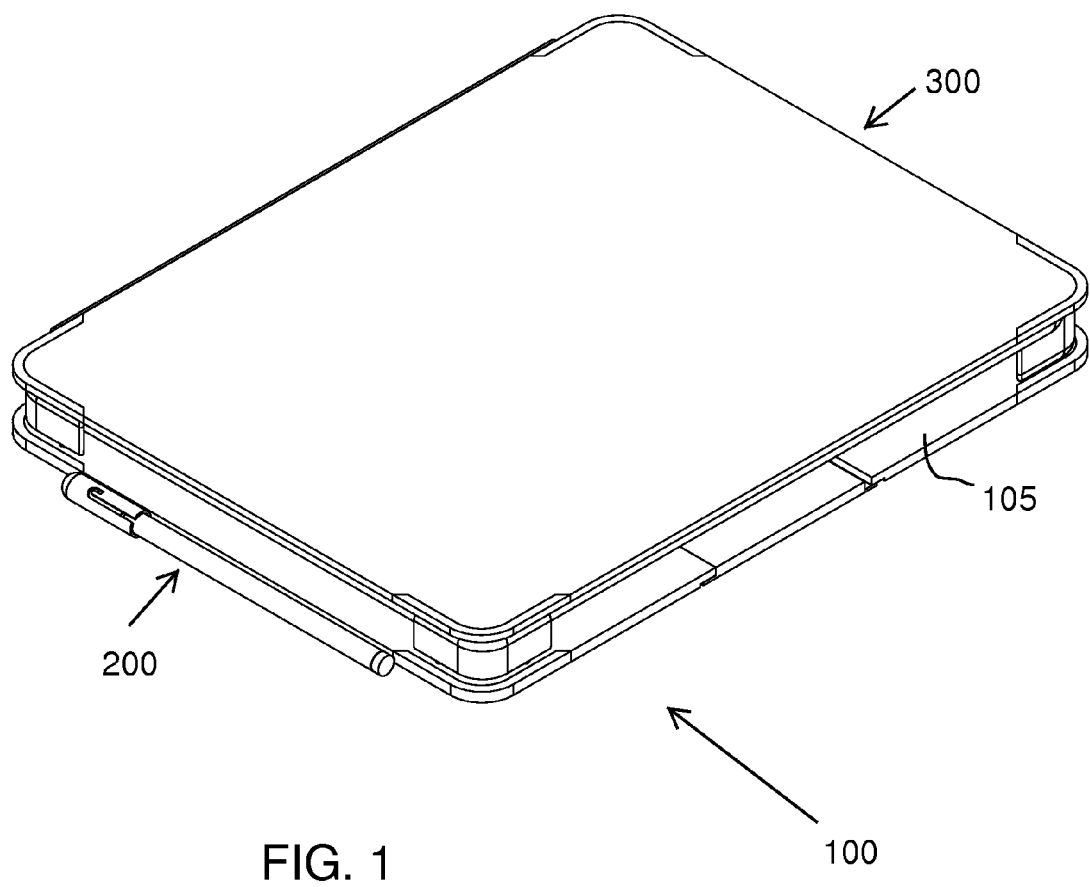
FIG. 1 illustrates a perspective view of an embodiment of a combined tablet holder and a detachable pen with the height adjustable detachable wireless magnetic keyboard used as protective cover.

FIG. 1 illustrates a perspective view of an embodiment of a combined tablet holder 100 and a detachable pen 200 with a height adjustable detachable wireless magnetic keyboard 300 used as protective cover.

Figure 2:
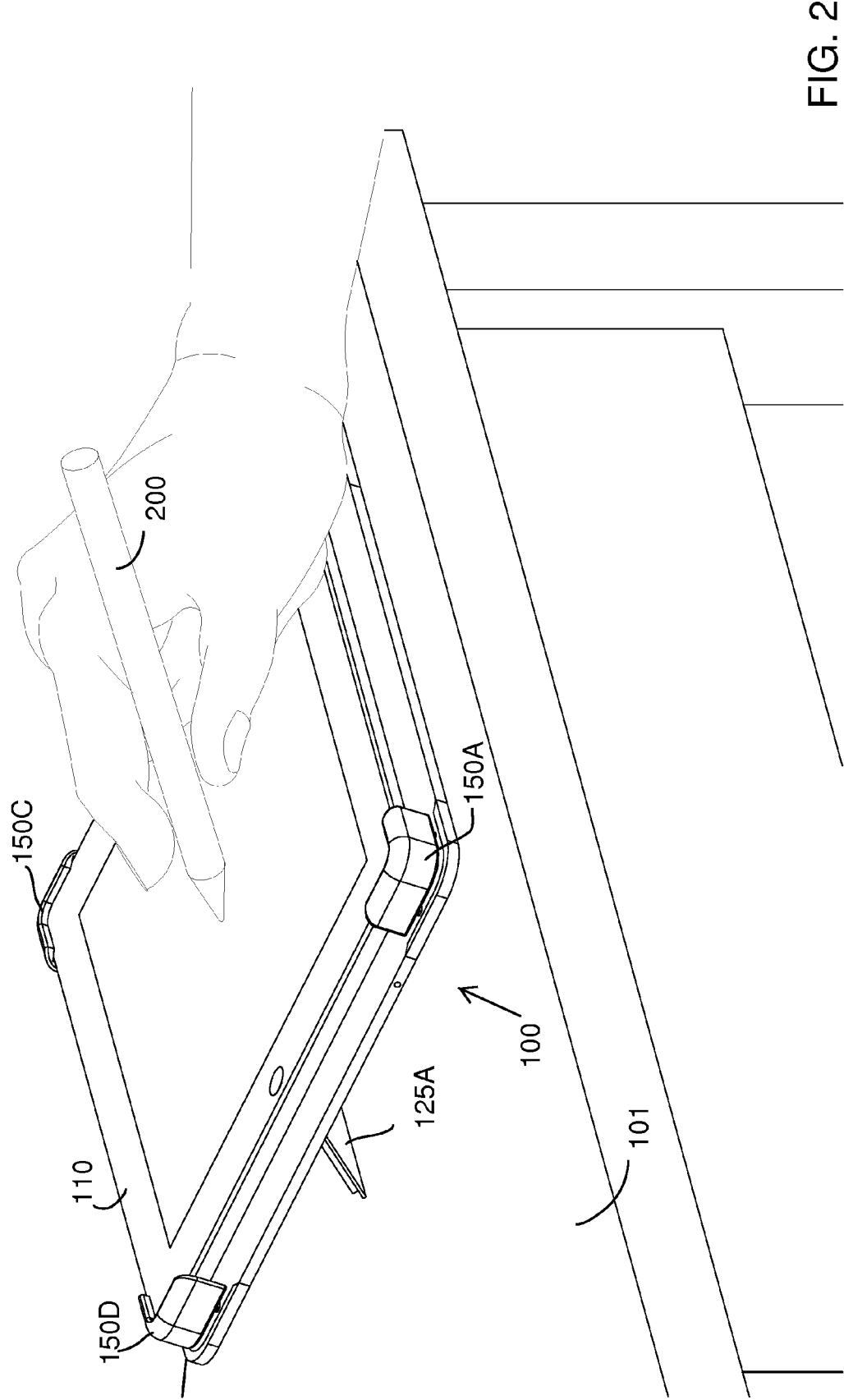
FIG. 2 illustrates a perspective view of a tablet mounted on the tablet holder illustrated in FIG. 1 against a fixed surface with one of its supporting elements in a deployed configuration. Such a configuration is useful for example where one wants to draw or handwrite on the tablet in the landscape orientation.

FIG. 2 illustrates a perspective view of a tablet 110 mounted on the tablet holder 100 illustrated in FIG. 1 against a fixed surface 101 with one of its supporting elements 125A in a deployed configuration. Such a configuration is useful for example where one wants to draw or handwrite on the tablet in the landscape orientation.

Figure 3:
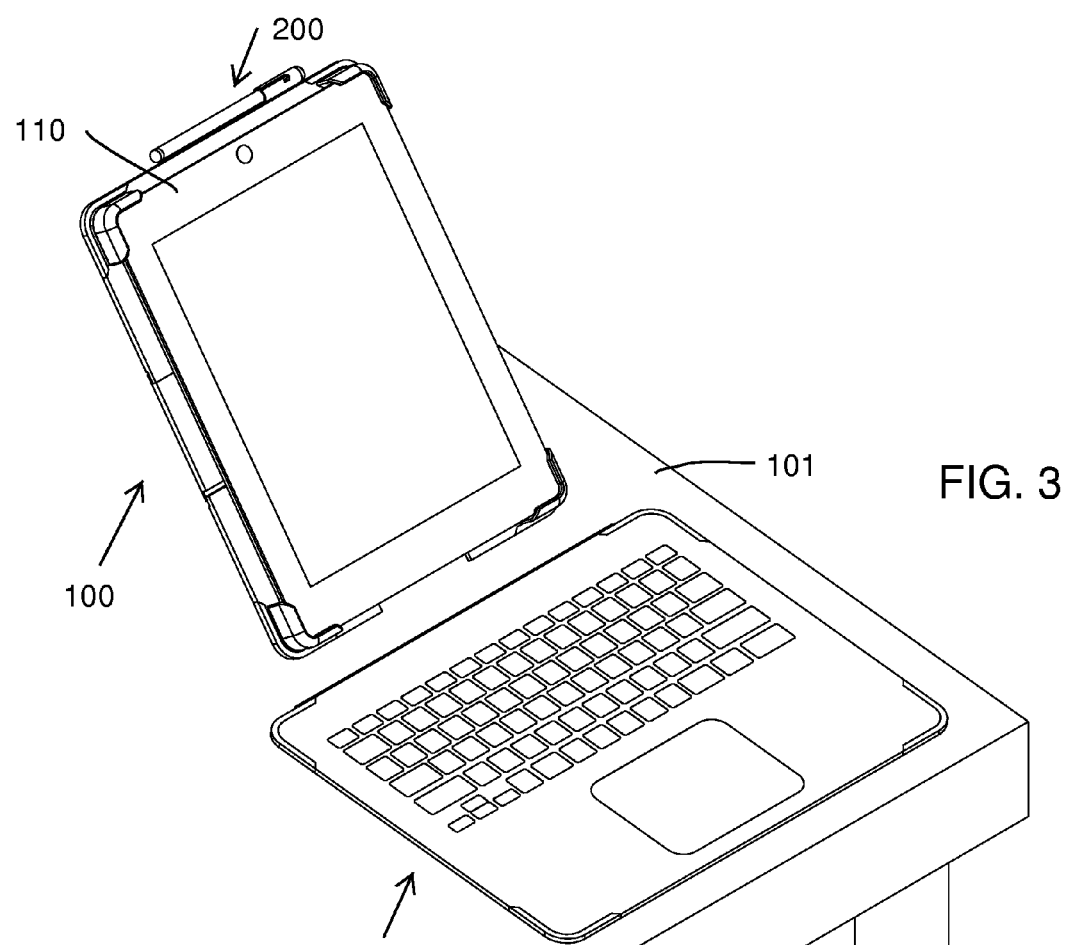
FIG. 3 illustrates a perspective view of a tablet mounted on the tablet holder illustrated in FIG. 1 against a fixed surface with one of its supporting elements in a deployed configuration with the detachable keyboard in front of it. Such a configuration is useful for example where one wants to type a letter in the portrait configuration.

FIG. 3 illustrates a perspective view of a tablet 110 mounted on the tablet holder 100 illustrated in FIG. 1 against a fixed surface 101 with one of its supporting elements in a deployed configuration with the detachable keyboard 300 in front of it. Such a configuration is useful for example where one wants to type a letter in the portrait configuration.

Figure 4:
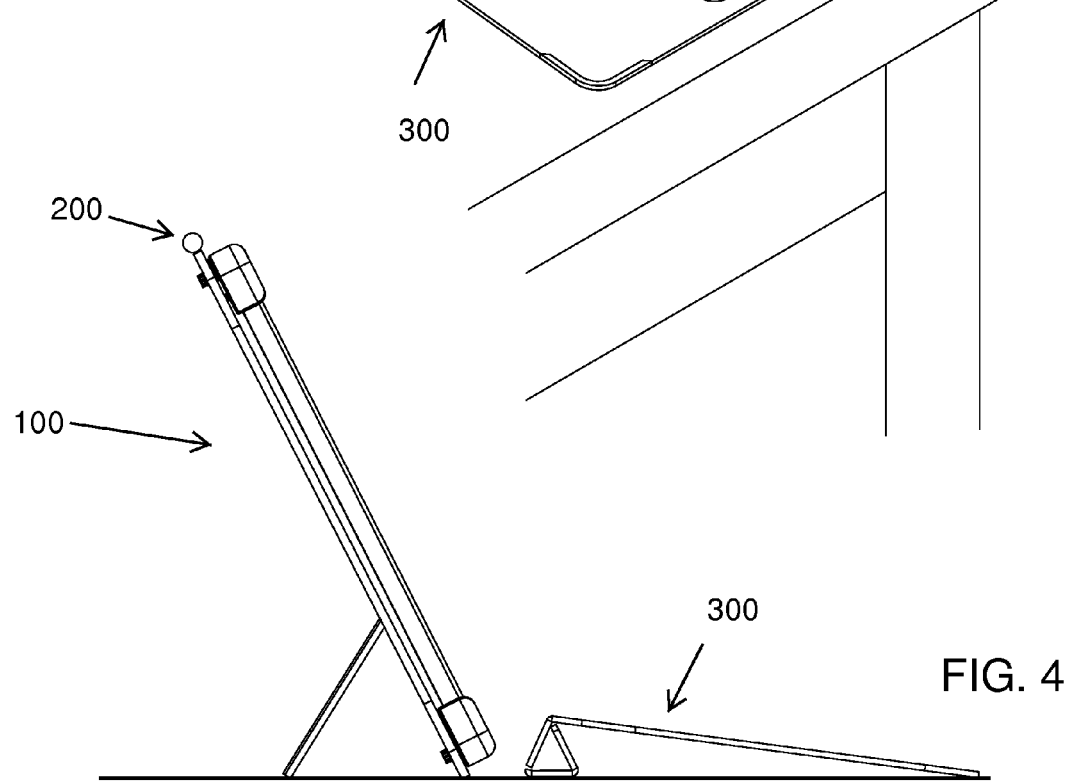
FIG. 4 illustrates a two-dimensional side view of the tablet holder and the detachable keyboard illustrated in FIG. 3.

FIG. 4 illustrates a two-dimensional side view of the tablet holder 100 and the detachable keyboard 300 illustrated in FIG. 3.

FIGS. 1 to 4 show that the tablet holder 100 may be configured as an adjustable multiple viewing and hand-writing support mechanism for a tablet computer.

One example non-limiting embodiment of a mechanism for orienting the tablet computer at a desired display angle are the load bearing rotation lock mechanisms shown in FIGS. 33 to 61 for fixing the angular position of a tablet holding mounting plate or device at sustainable loads of one pound (1 lb.) and above at display angles ranging from about 5 degrees to about 60 degrees.

Figure 5:
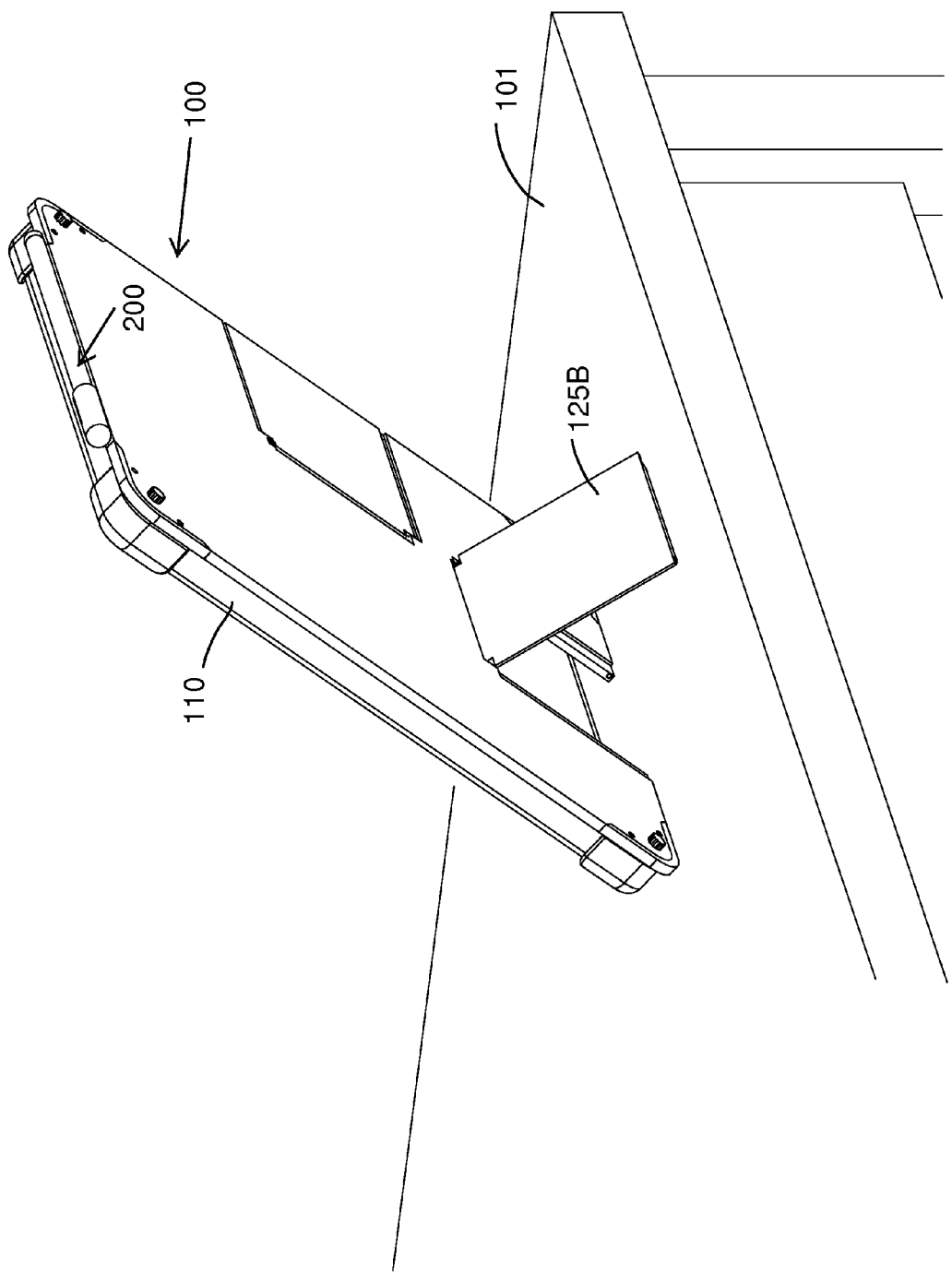
FIG. 5 illustrates a rear perspective view of a tablet mounted on a tablet holder against a fixed surface with one of its supporting elements extended to orient the tablet in the portrait orientation, with a penholder attached.

FIG. 5 illustrates a rear perspective view of a tablet 110 mounted on a tablet holder 100 against a fixed surface 101 with one of its supporting elements 125B extended to orient the tablet in the portrait orientation, with a penholder 200 attached.

Figure 6:
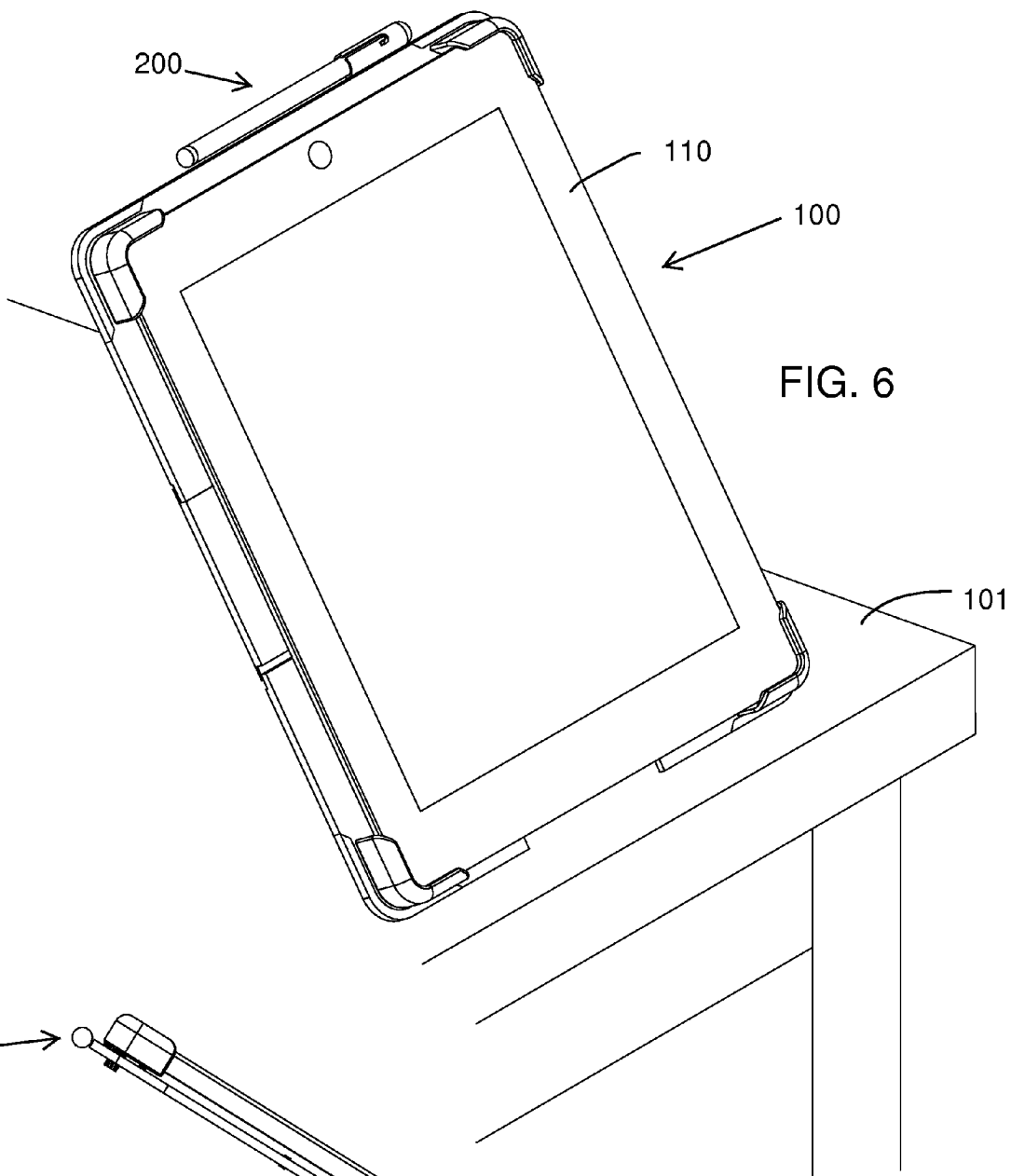
FIG. 6 illustrates a front perspective view of a tablet mounted on a tablet holder against a fixed surface with one of its supporting elements extended to orient the tablet in the portrait orientation, with a penholder attached.

FIG. 6 illustrates a perspective view of a tablet 110 mounted on a tablet holder 100 against a fixed surface 101 with one of its supporting elements extended to orient the tablet in the portrait orientation, with a penholder 200 attached.

Figure 7:
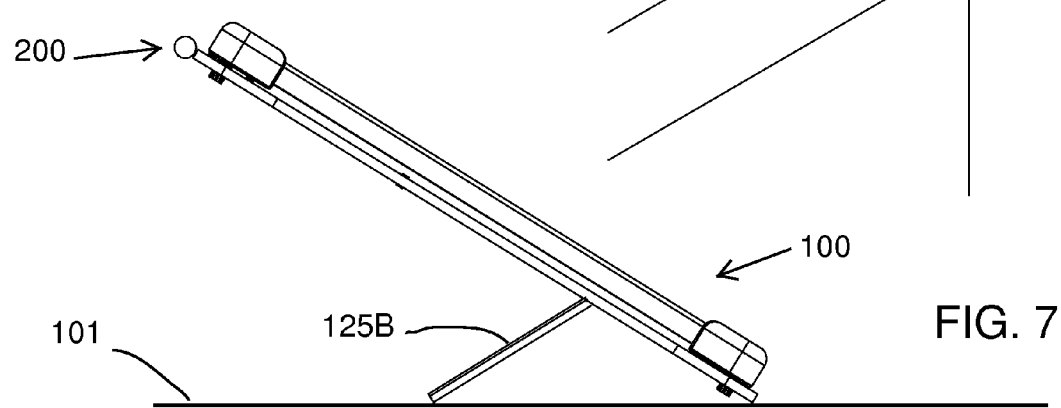
FIG. 7 illustrates a side view of the tablet holder illustrated in FIG. 6.

FIG. 7 illustrates a side view of the tablet holder 100 illustrated in FIG. 6.

Figure 8:
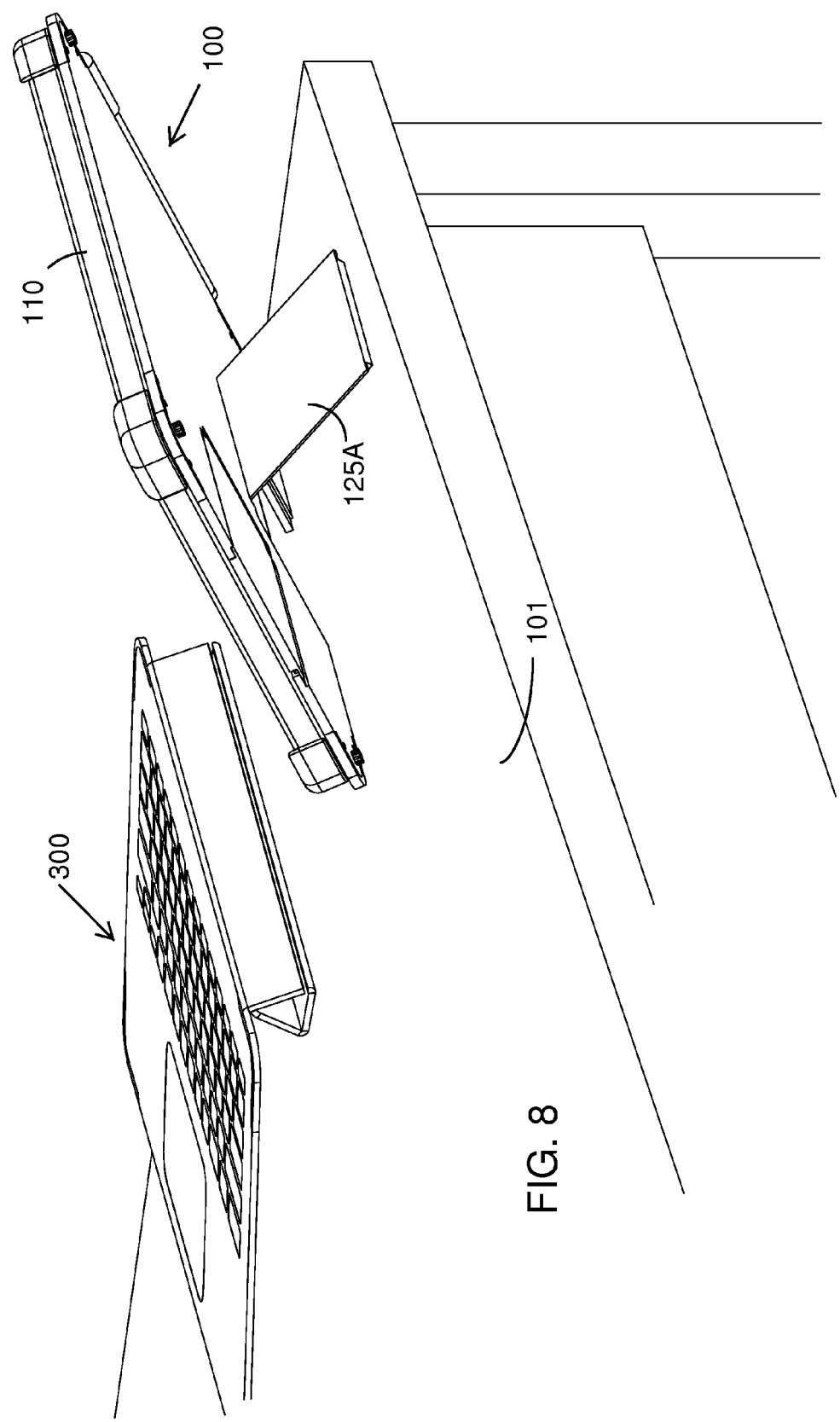
FIG. 8 illustrates a rear perspective view of a tablet mounted on a tablet holder and detachable keyboard illustrated against a fixed surface with the supporting element extended to support the tablet in landscape orientation.

FIG. 8 illustrates a rear perspective view of a tablet 110 mounted on a tablet holder 100 and a detachable keyboard 300 illustrated against a fixed surface 101 with the supporting element 125A extended to support the tablet 110 in landscape orientation.

Figure 9:
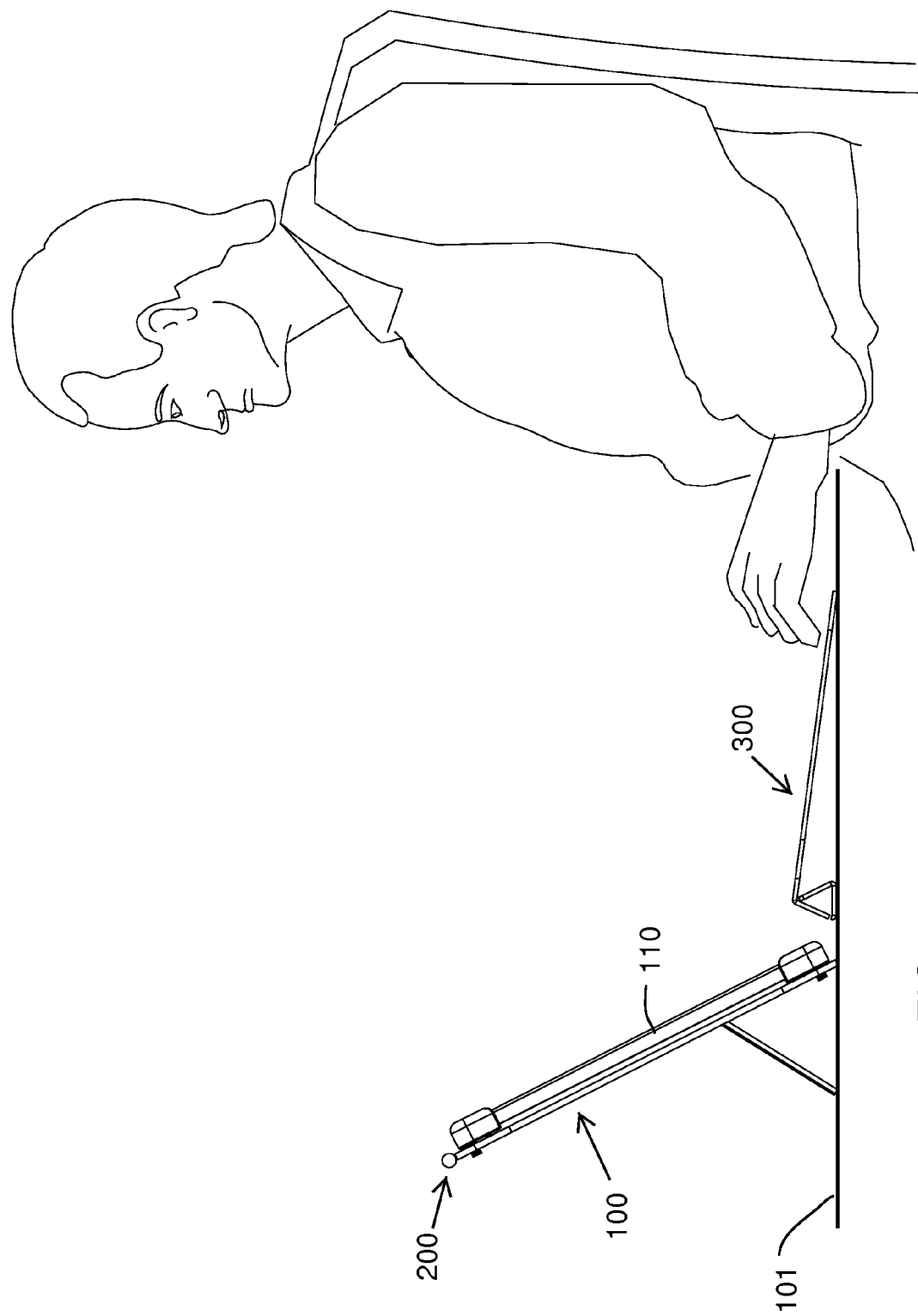
FIG. 9 illustrates a side view of a person using a tablet mounted on a tablet holder and detachable keyboard against a fixed surface area. Such a configuration is useful for example where one wants to use the tablet like a desktop computer.

FIG. 9 illustrates a side view of a person using a tablet 110 mounted on a tablet holder 100 and detachable keyboard 300 against a fixed surface area 101. Such a configuration is useful for example where one wants to use the tablet like a more ergonomic laptop, or a desktop.

Figure 10:
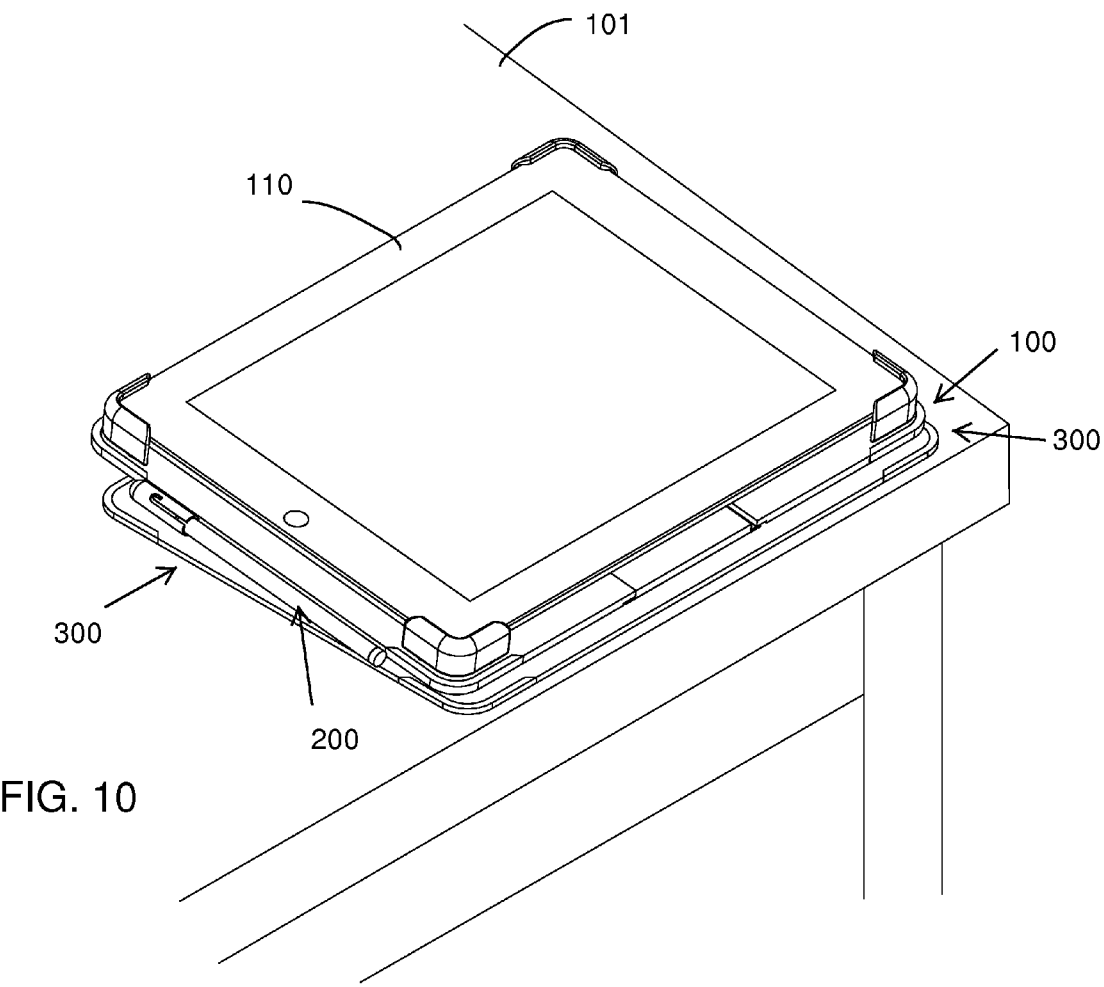
FIG. 10 illustrates an alternative embodiment of a tablet mounted on a tablet holder with the detachable keyboard folded under the tablet holder in an alternative configuration. Such a configuration is useful for example when one wants to use the tablet holder on one's own lap.

FIG. 10 illustrates an alternative embodiment of a tablet 110 mounted on a tablet holder 100 with the detachable keyboard 300 folded under the tablet holder in an alternative configuration. Such a configuration is useful for example when one wants to use the tablet holder on one's own lap.

Figure 11:
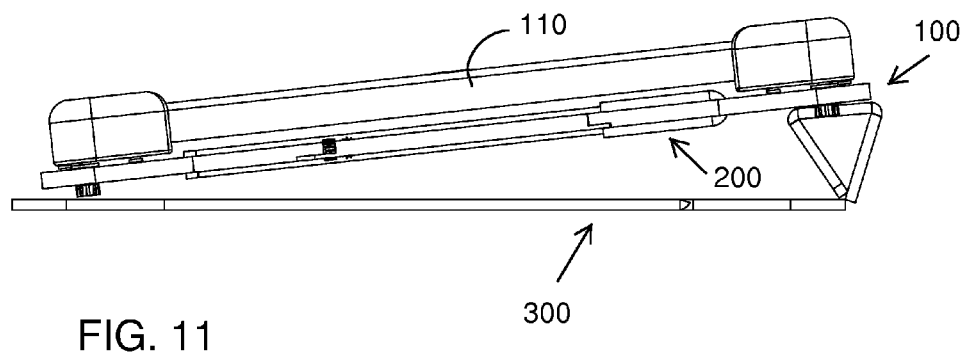
FIG. 11 illustrates a side view of the tablet holder and the detachable keyboard illustrated in FIG. 10.
Figure 12:
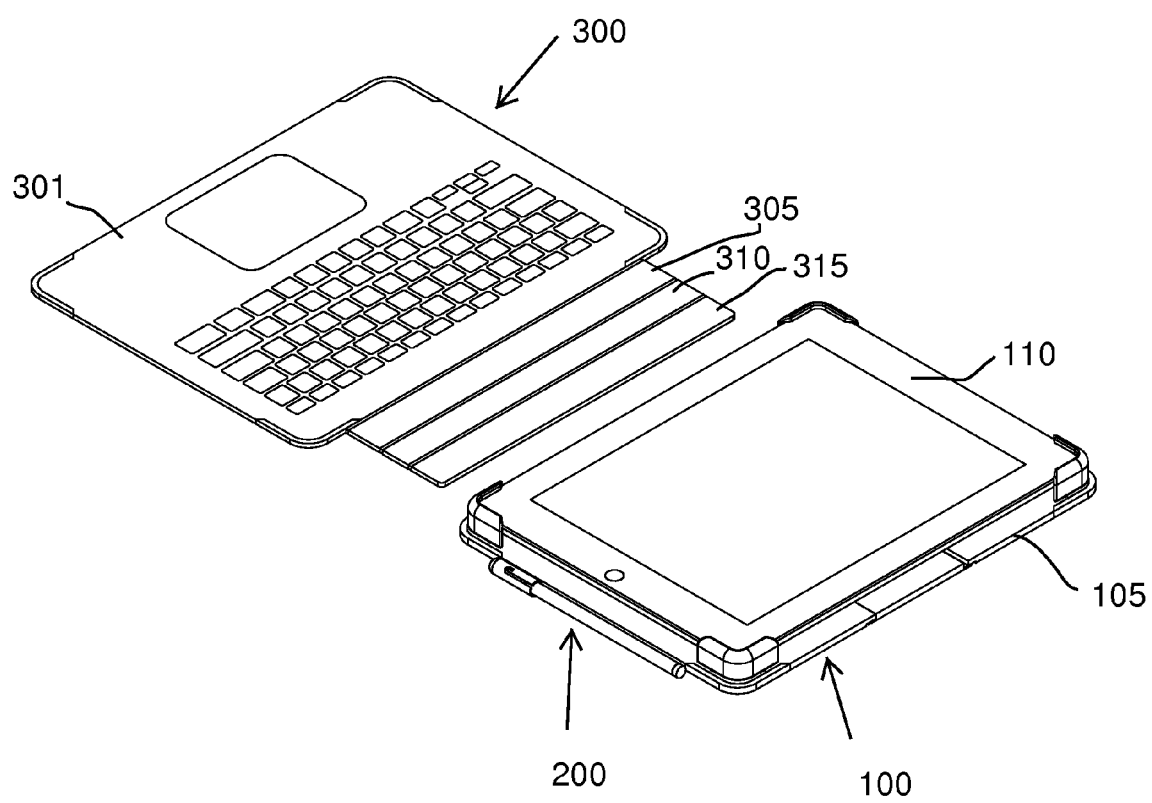
FIG. 12-17 illustrate an image sequence of how the detachable wireless magnetic keyboard consisting of a keyboard and three magnetized swiveling strips can be positioned as a protective cover for the tablet holder.
Figure 13:
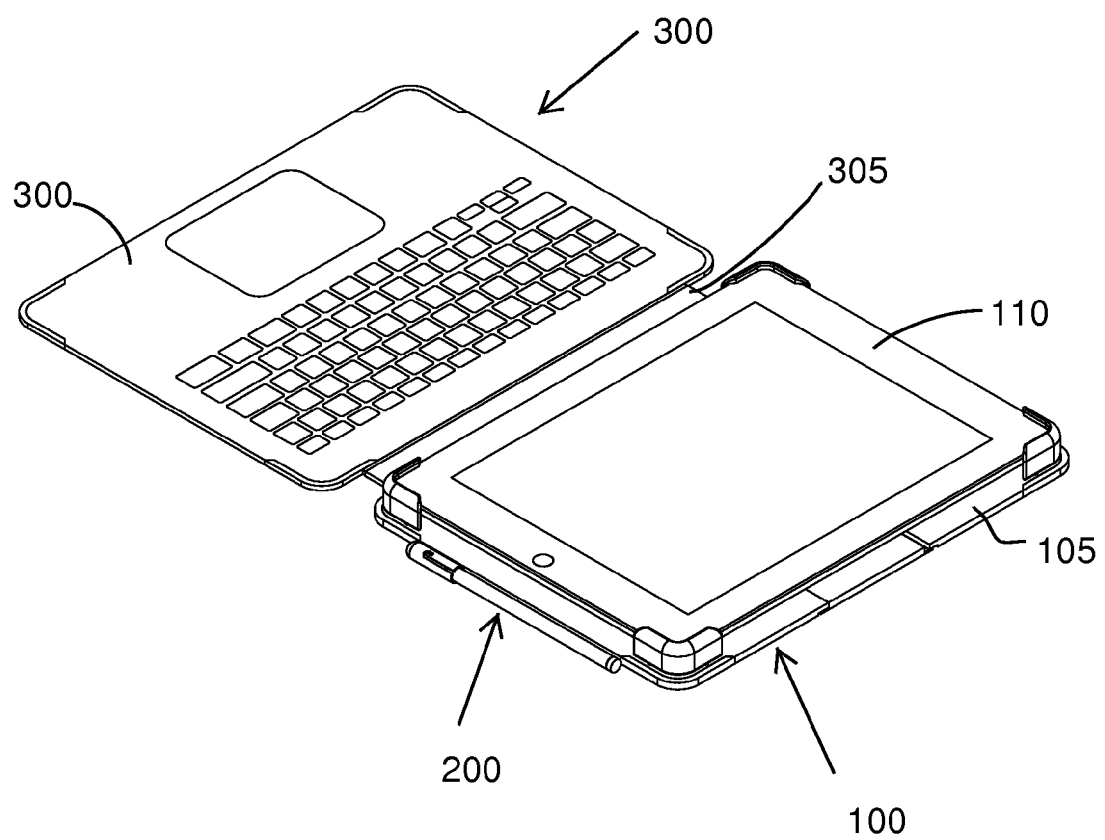
Figure 14:
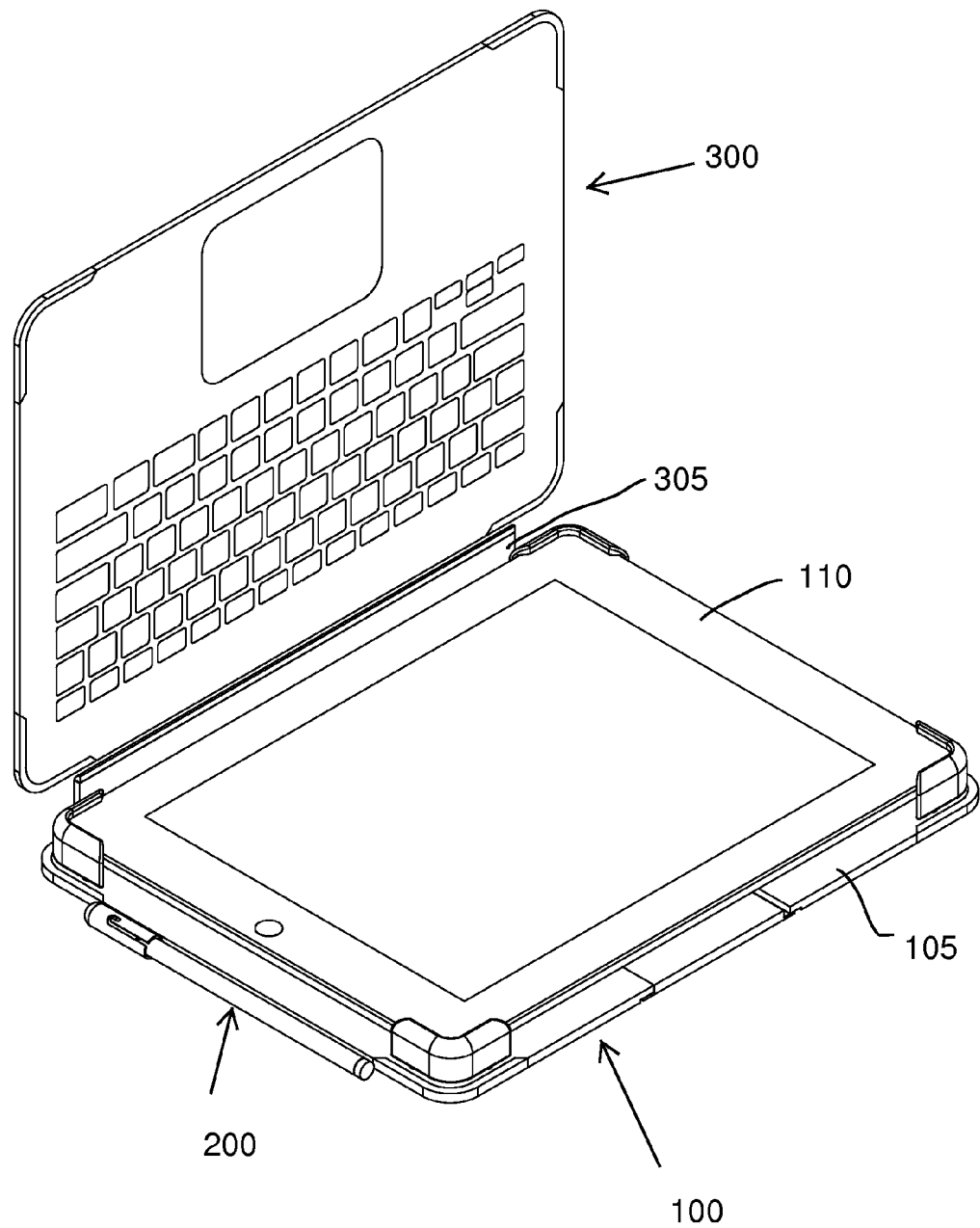
Figure 15:
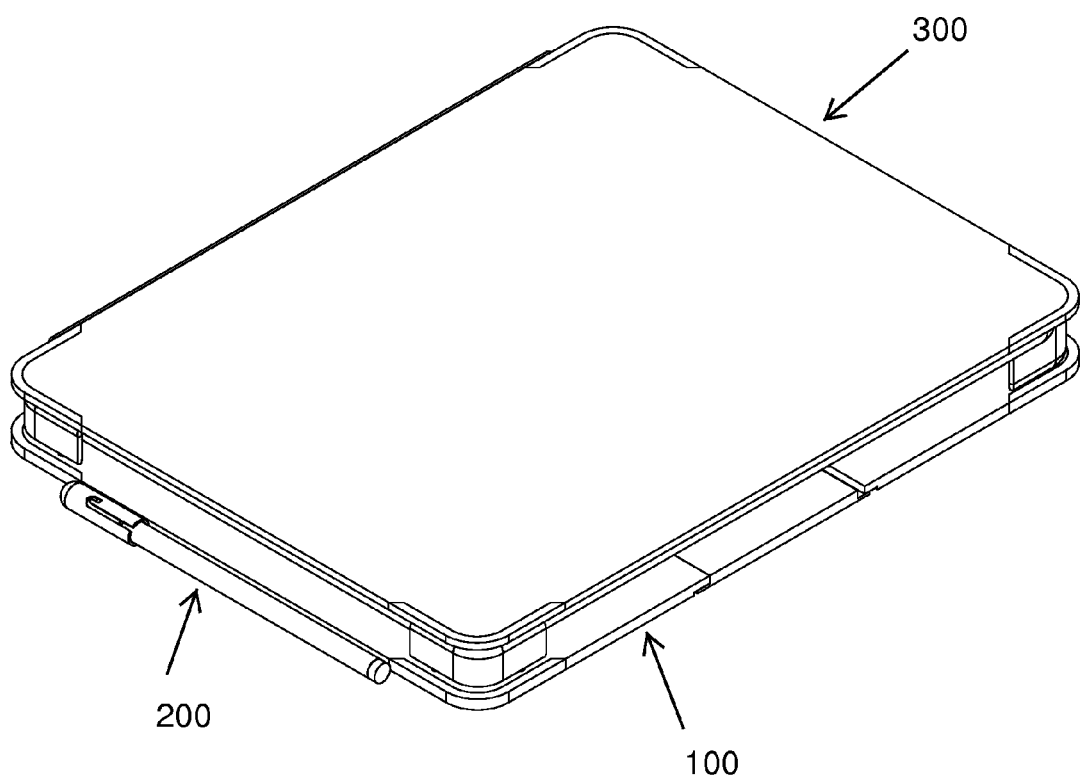
Figure 16:
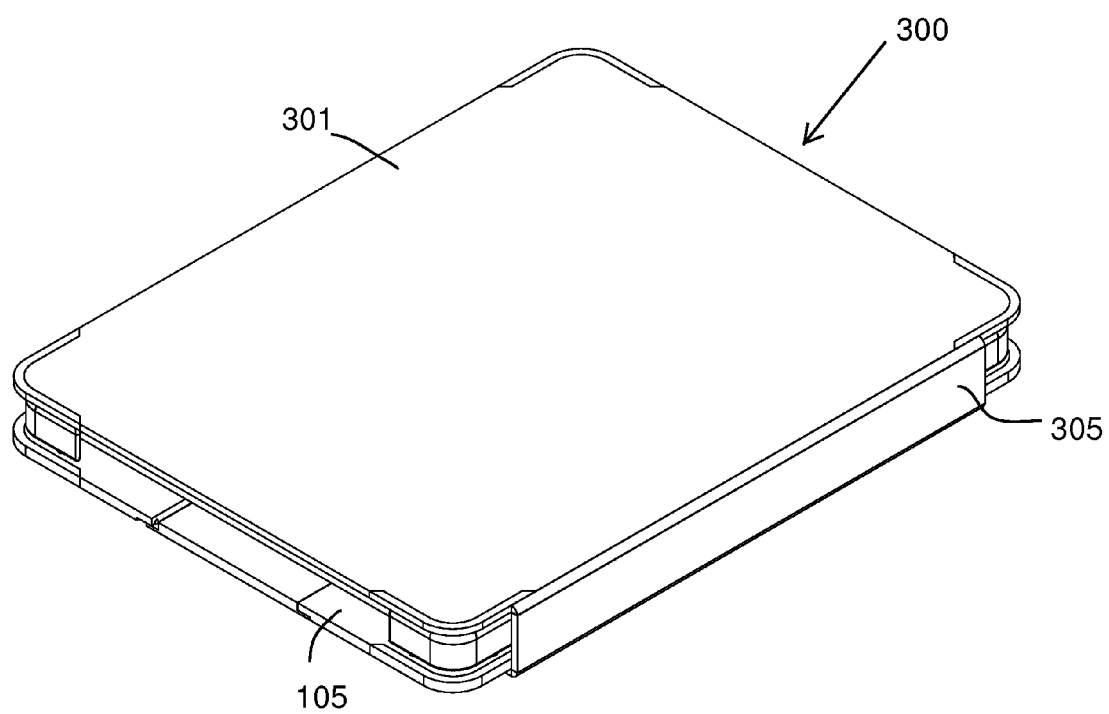
Figure 17:
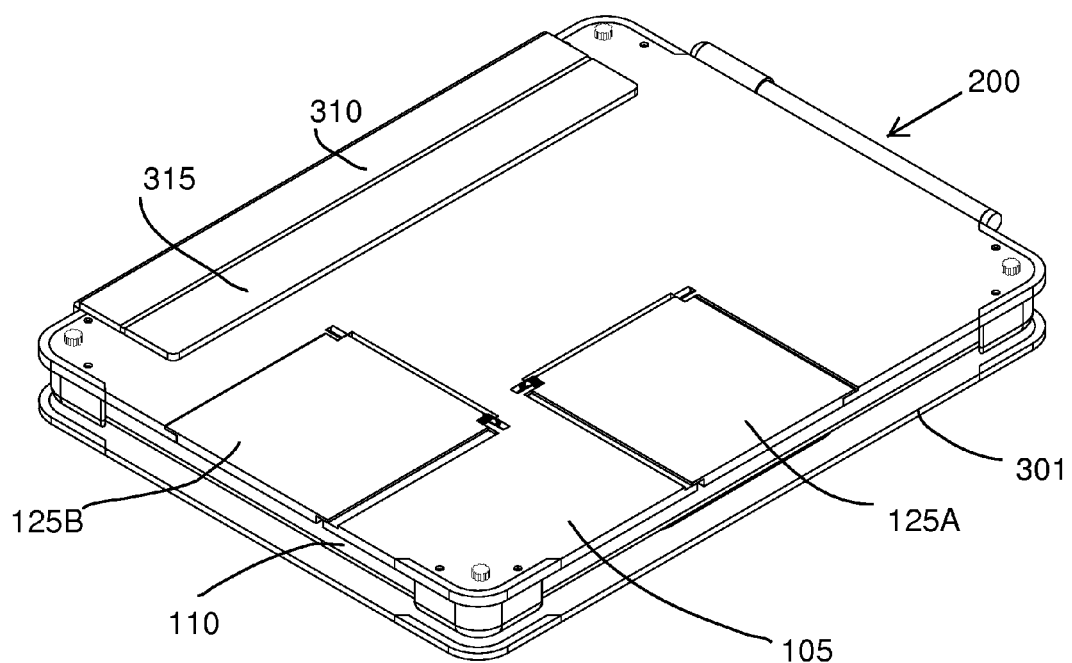

FIG. 11 illustrates a side view of the tablet holder 100 and the detachable keyboard 300 illustrated in FIG. 10.

FIG. 12-17 illustrate how the detachable wireless magnetic keyboard 300 consisting of a flat keyboard 301 and three attached magnetized swiveling strips 305, 310, 315 can be positioned around a tablet mounting plate 105 to serve as a protective cover for the tablet holder 100.

Figure 18:
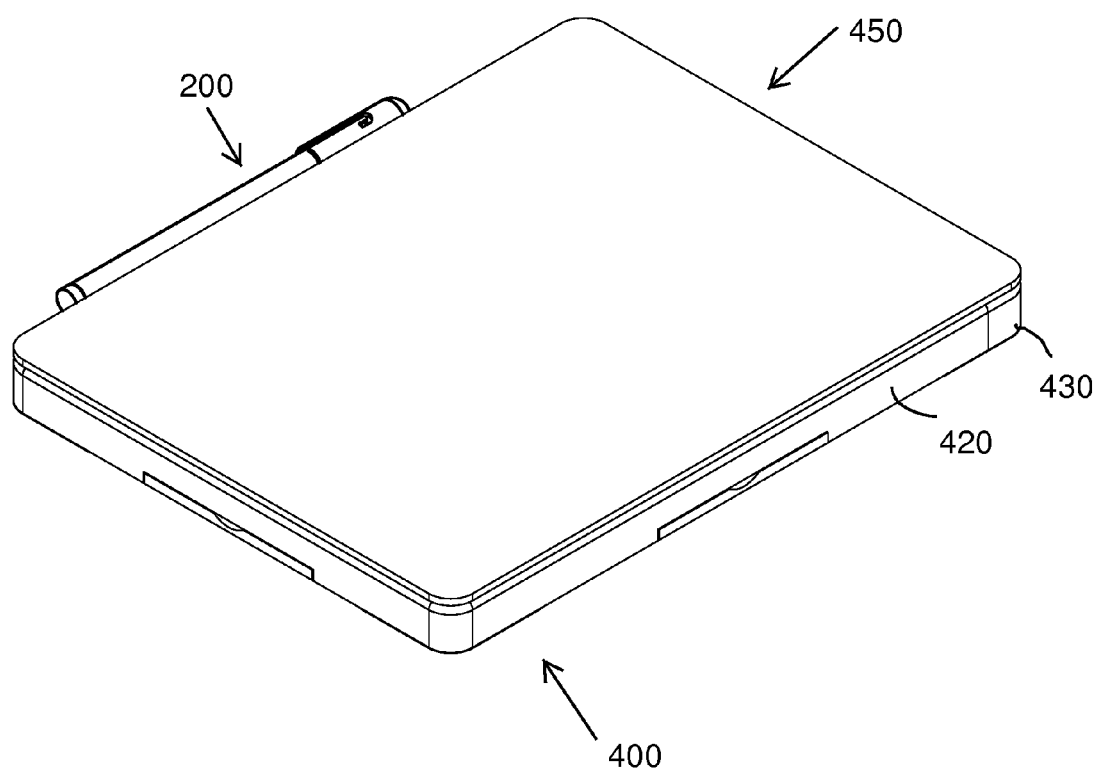
FIG. 18 illustrates a perspective view of an alternative embodiment of a combined tablet holder and detachable pen with a flat detachable wireless magnetic keyboard used as a protective cover. In this embodiment, the mounting plate is split into two sections with bumper-style edge protection for quick tablet insertion and retrieval.

FIG. 18 illustrates a perspective view of, an alternative, split tablet holder 400 and detachable pen 200 with a flat detachable wireless magnetic keyboard 450 used as protective cover. In this embodiment, the mounting plate 400 is split into two sections 420 & 430 with bumper-style edge protection for quick tablet insertion and retrieval.

Figure 19:
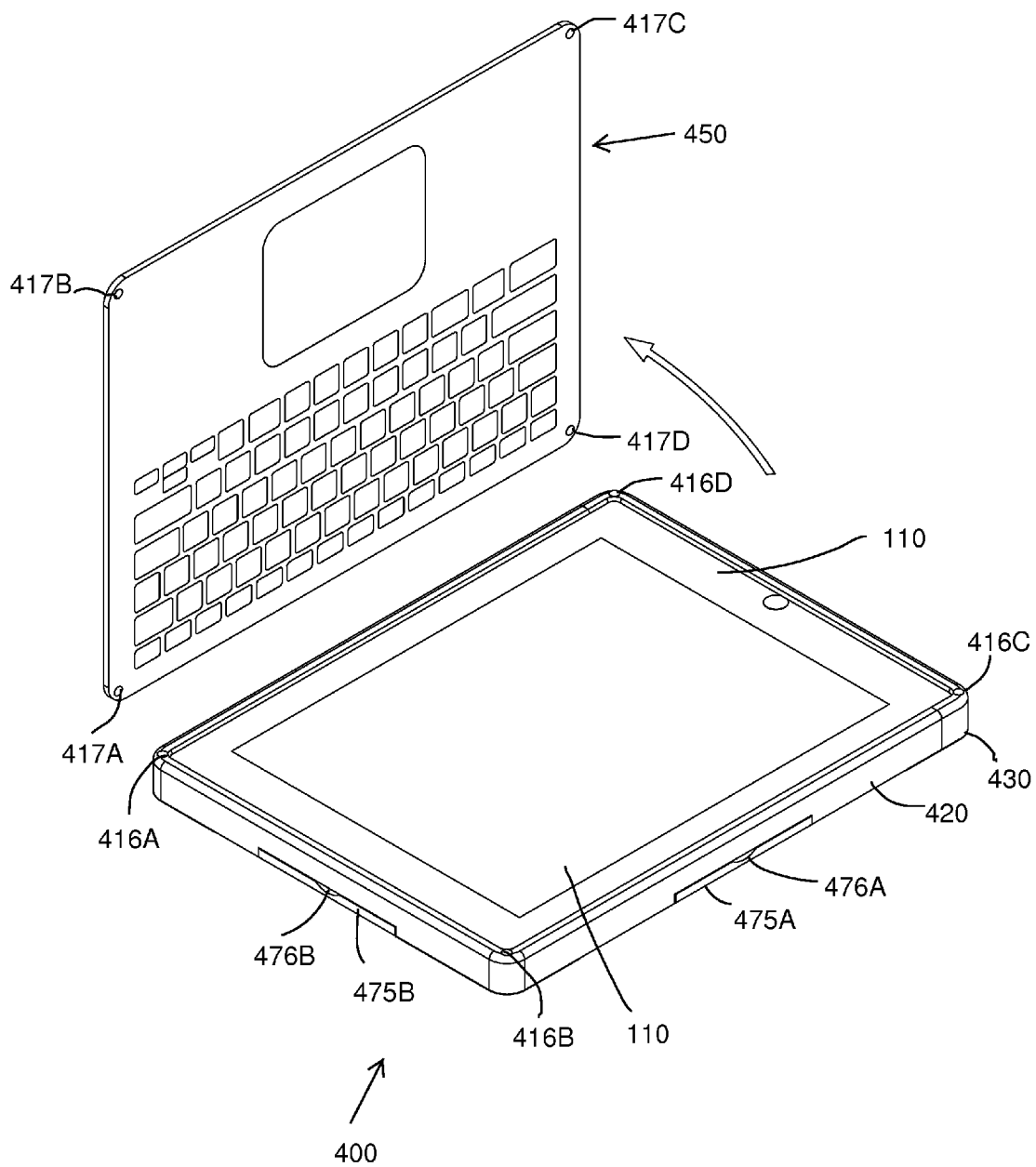
FIG. 19 illustrates an alternative view of FIG. 18 with the flat magnetic keyboard detached from the tablet holder.

FIG. 19 illustrates an alternative view of FIG. 18 with the flat magnetic keyboard 450 detached from the split tablet holder 400. The flat magnetic keyboard 450 may be secured to the split tablet holder 400 through magnets located on each corner of its keyboard 417A, 417B, 417C, and 417D as well as on its contoured bumper 416A, 416B, 416C, and 416D. This figure also illustrates the locations of supporting elements 475A and 476B which may be deployed in an extended position through finger depressions 476A and 476B.

Figure 20:
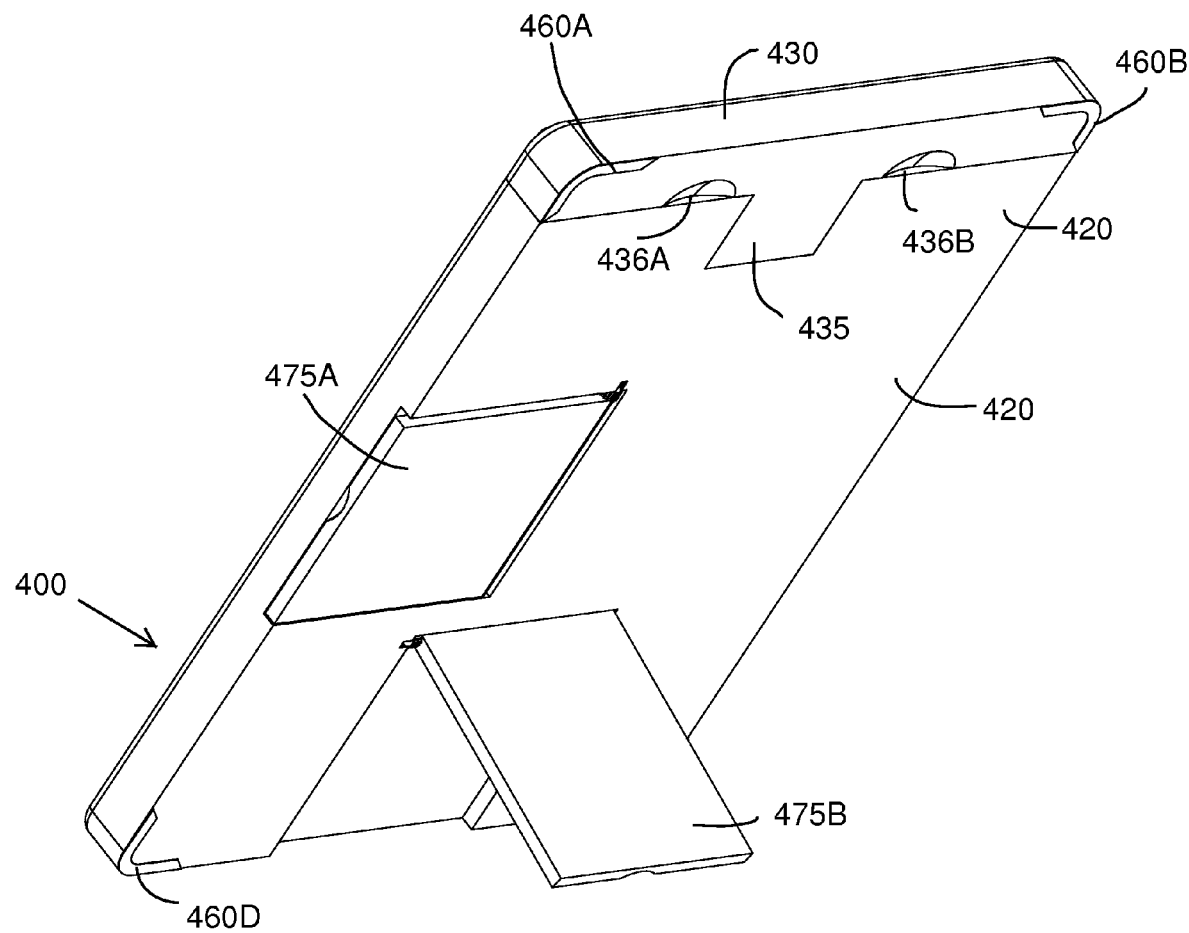
FIG. 20 illustrates a rear perspective view of the split tablet holder with one of its supporting elements extended to orient the tablet in the portrait orientation.

FIG. 20 illustrates a rear perspective view of the split tablet holder 400 with one of its supporting elements 475B extended to orient the tablet in the portrait orientation.

Figure 21:
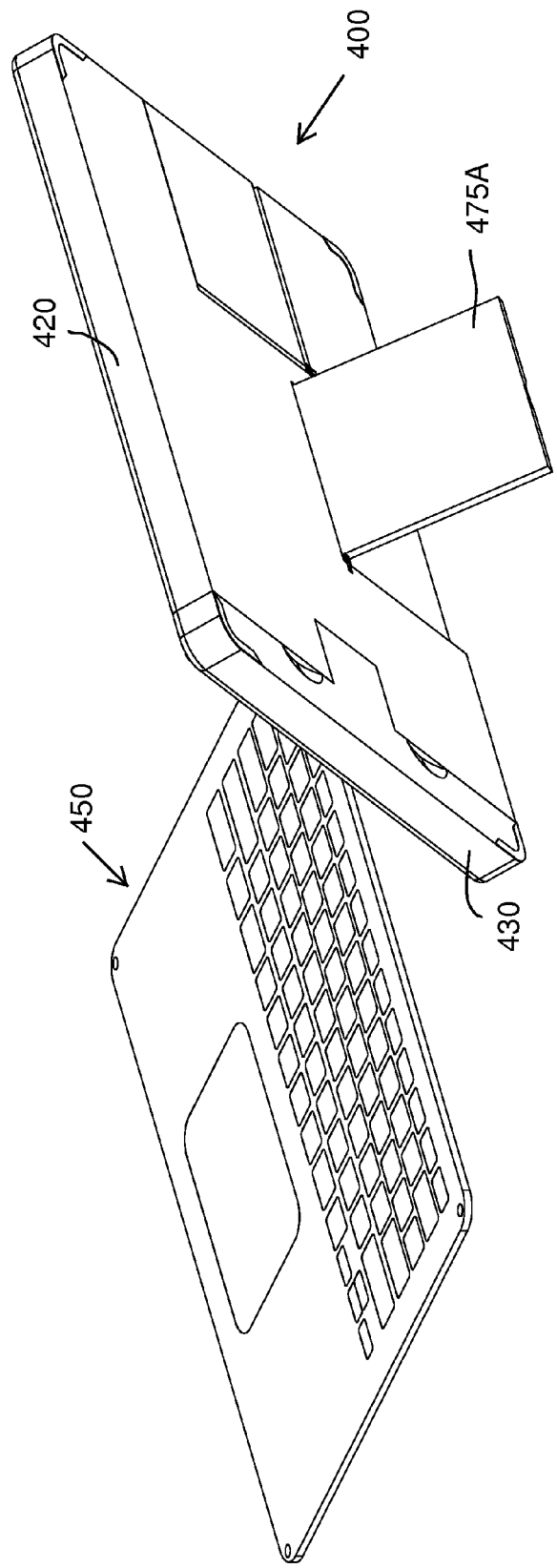
FIG. 21 illustrates a rear perspective view of the split mounting plate embodiment of the tablet holder with one of its supporting elements extended to orient the tablet in the landscape orientation with the detachable keyboard positioned in front of it in a desktop-like manner.

FIG. 21 illustrates a rear perspective view of the split mounting plate embodiment 400 of the tablet holder with one of its supporting elements 475A extended to orient the tablet in the landscape orientation with the detachable keyboard 450 positioned in front of it in a desktop-like manner.

Figure 22:
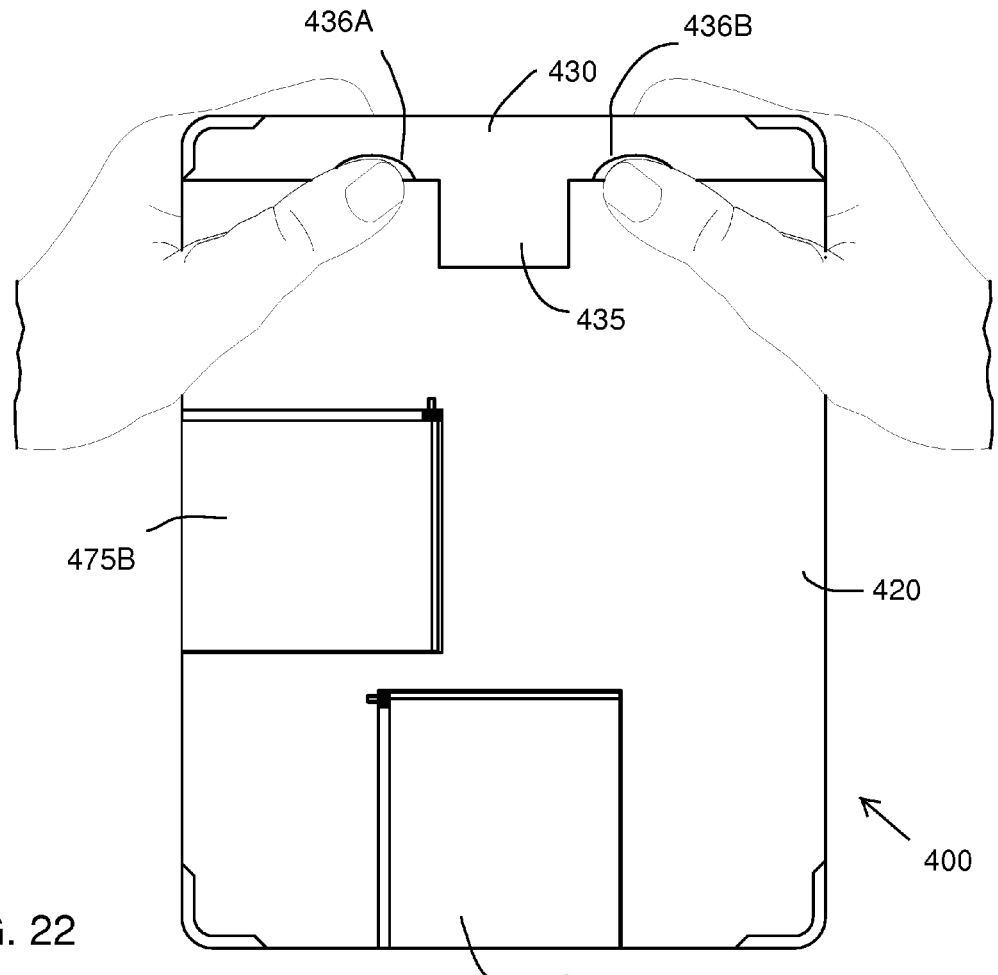
FIG. 22 illustrates a rear perspective view of the split mounting plate embodiment of the tablet holder with a user's fingers positioned in the finger depressions of the top plate, ready to separate the top section of the mounting plate from its bottom section.

FIG. 22 illustrates a rear perspective view of the split mounting plate embodiment of the tablet holder 400 with a user's fingers positioned in the finger depressions 436A & 436B of the top plate 430, ready to separate the top section 430 of the split mounting plate from its bottom section 420.

Figure 23:
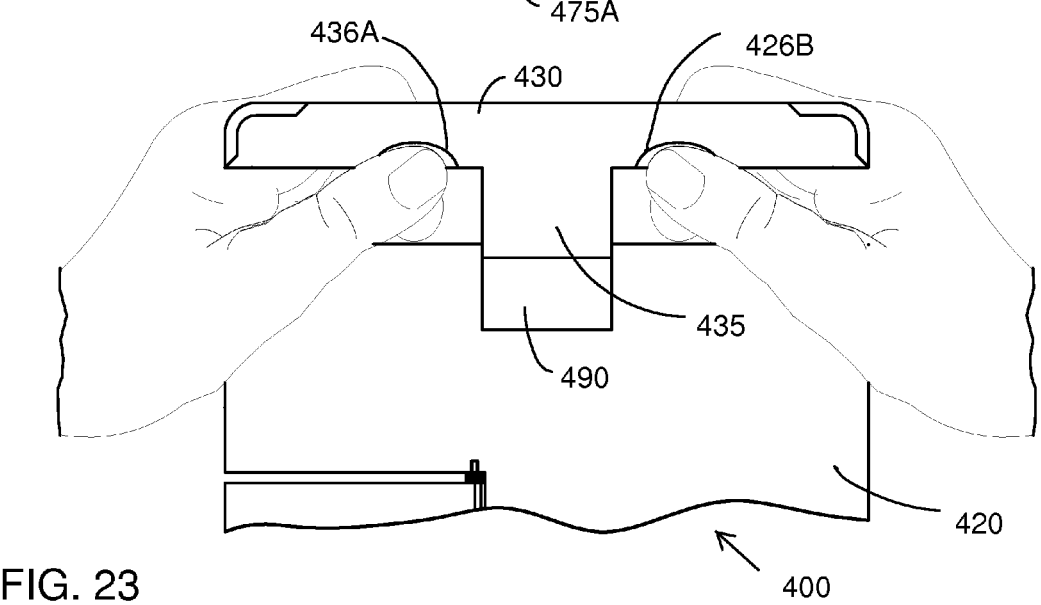
FIG. 23 illustrates a partial rear perspective view of the split mounting plate embodiment of the tablet holder with a user's fingers in the finger depressions of the top section of the mounting plate after having separated the top section of the mounting plate from the bottom section of the mounting plate.

FIG. 23 illustrates a partial rear perspective view of the split mounting plate embodiment of the tablet holder 400 with a user's fingers in the finger depressions 436A & 436B of the top section 430 of the mounting plate 400 after having separated the top section 430 of the mounting plate from the bottom section 420 of the mounting plate.

Figure 24:
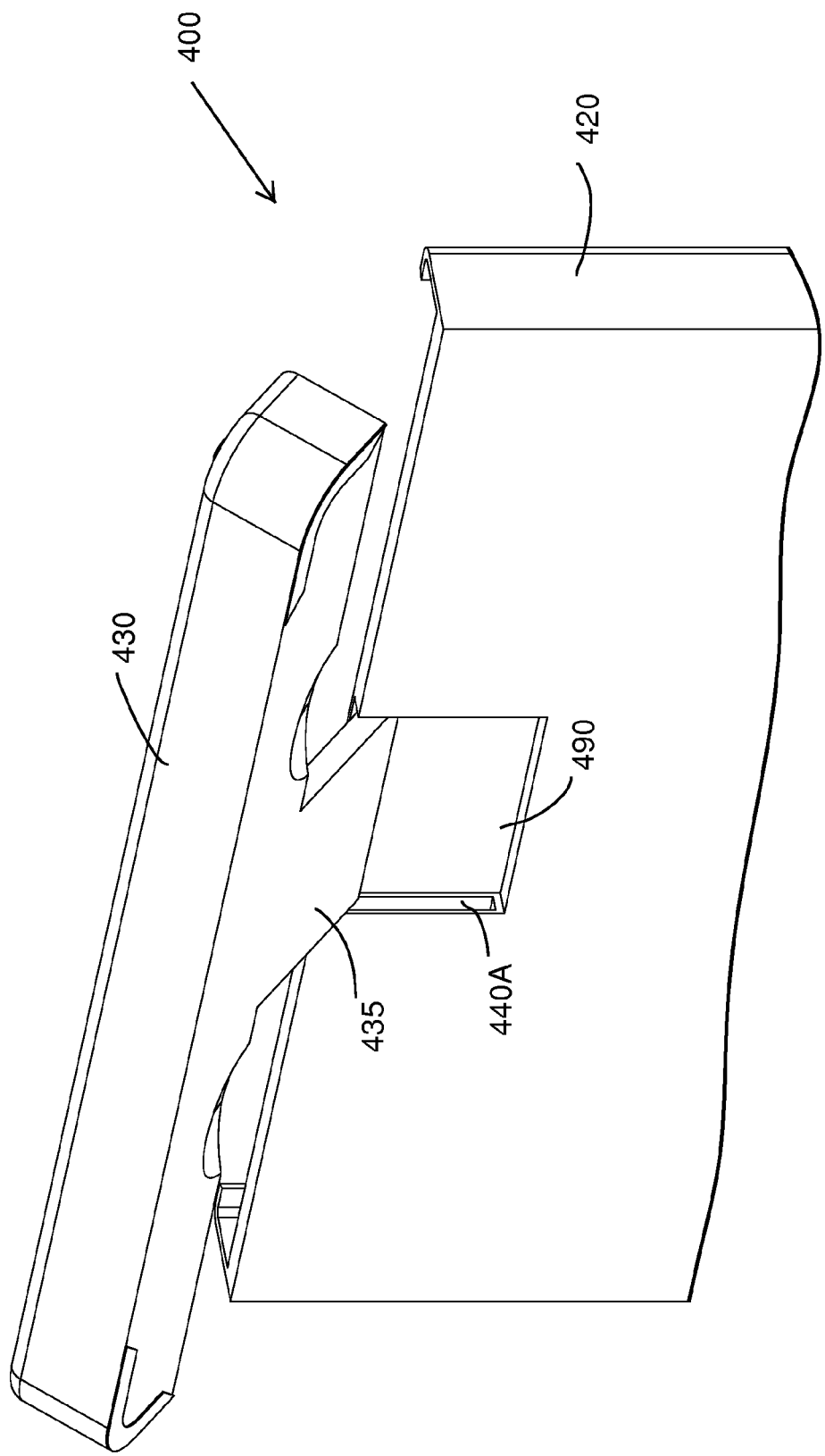
FIG. 24 illustrates a partial rear perspective view of the split mounting plate embodiment of the tablet holder with the top plate separated, but still attached, to the bottom plate.
Figure 25:
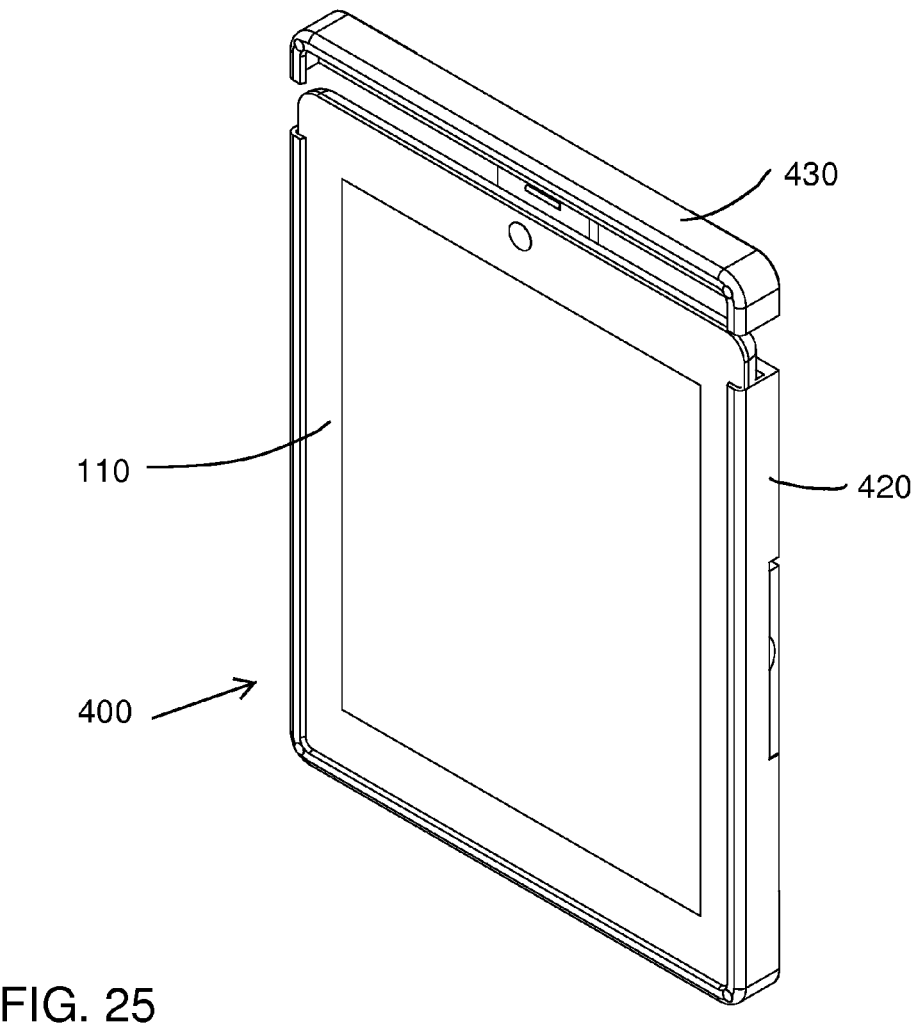
FIG. 25-32 illustrate an image sequence of how a tablet can be quickly released from a split mounting plate embodiment of the tablet holder.
Figure 26:
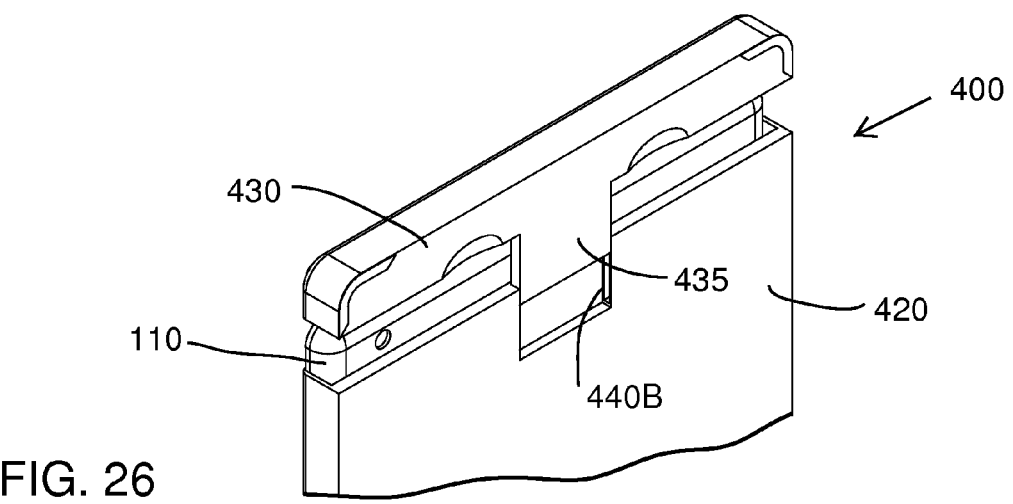
Figure 27:
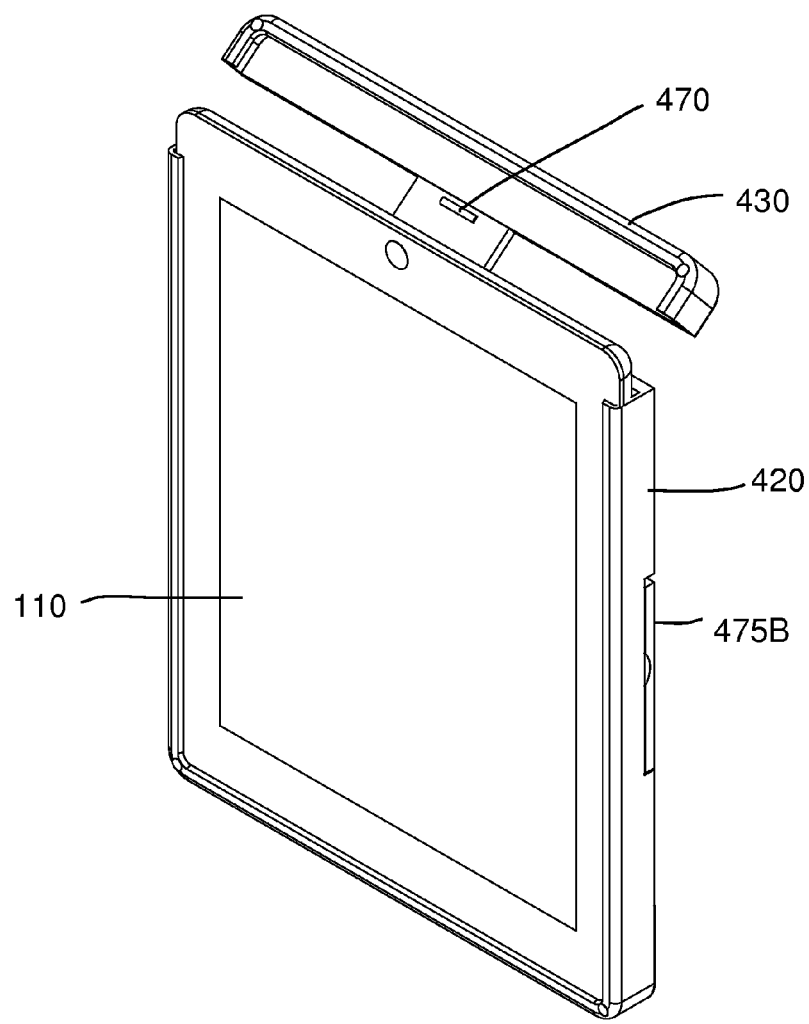
Figure 28:
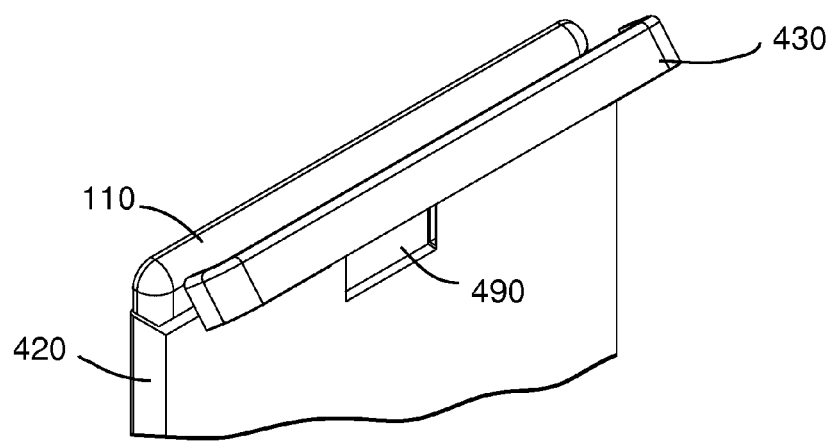
Figure 29:
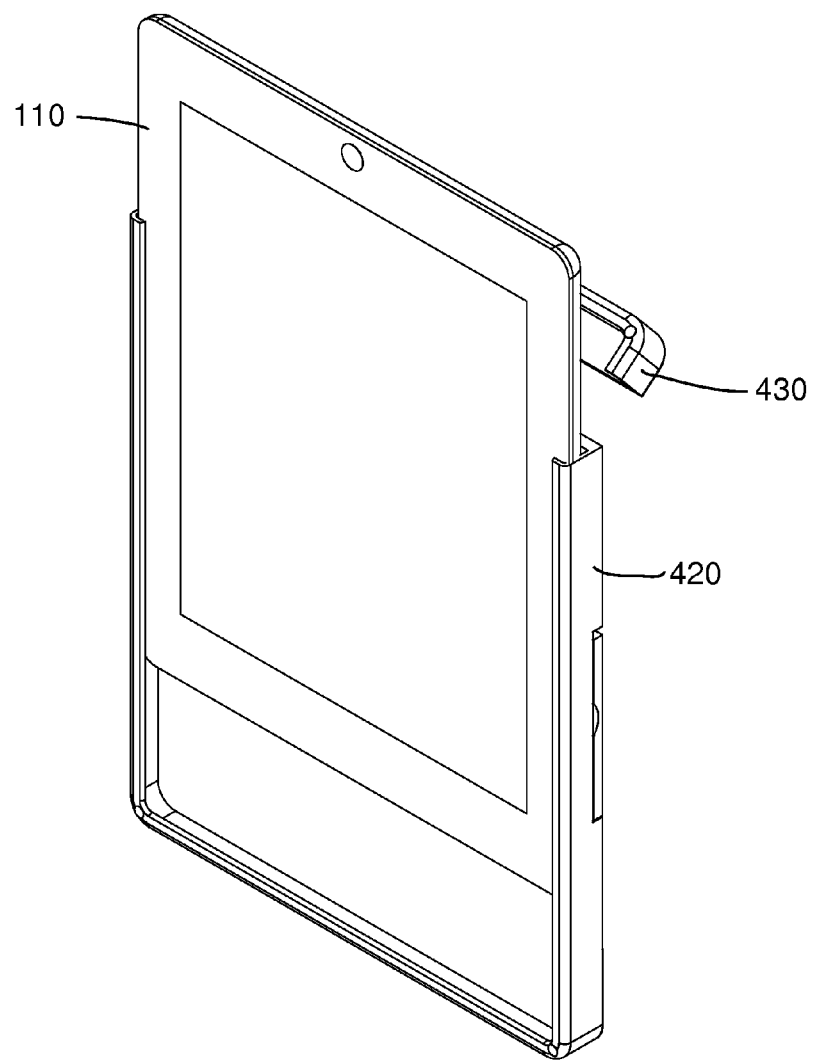
Figure 30:
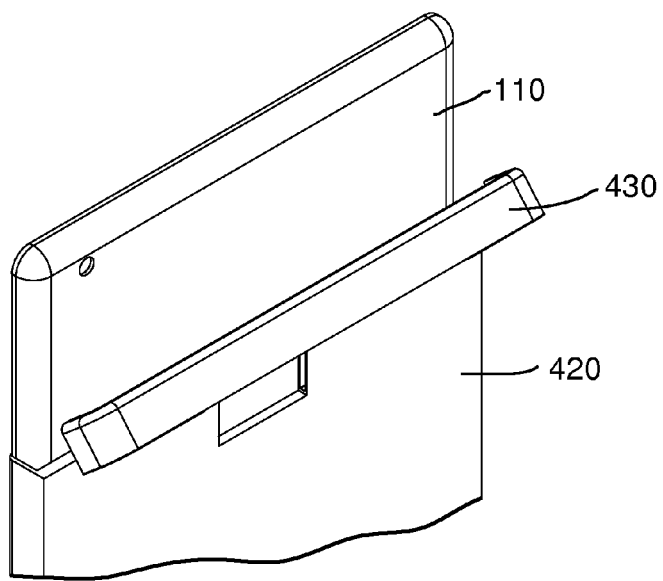
Figure 31:
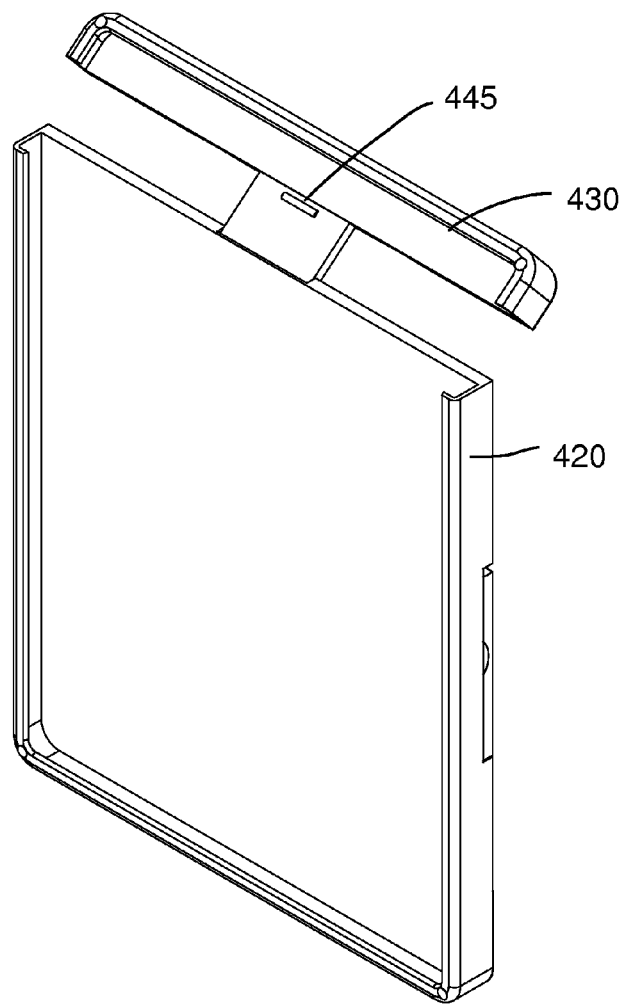
Figure 32:
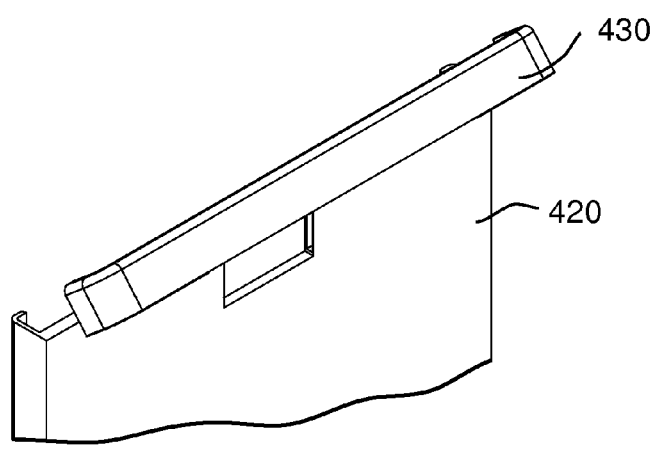

FIG. 24 illustrates a partial rear perspective view of the split mounting plate embodiment of the tablet holder 400 with the top plate 430 separated, but still attached, to the bottom plate 420.

FIG. 25-32 illustrate an image sequence of how a tablet 110 can be quickly released from a split mounting plate embodiment of the tablet holder 400.

The following illustrations represent various embodiments of the workings and implementation of an adjustable multiple viewing and hand-writing support mechanism for tablet computers.

One example non-limiting embodiment of such a mechanism is a load bearing rotation lock mechanism for fixing the angular position of a tablet holding mounting plate or device at sustainable loads of 1 lb. and above at display angles ranging from about 5 degrees to about 60 degrees (with respect to a resting surface or base) which may be applied by users when using a stylus to draw or to write.

Such device consisting of a hinge pin made up of a shaft fastened to a fixed notched, grooved, or pinned disk, cylinder, or gear. The shaft is molded to, or otherwise bonded, to a hinge plate or tablet supporting mechanism. As the shaft rotates, the hinge plate or tablet supporting mechanism that is connected to the shaft rotates.

When the end of the shaft that is fastened to a fixed notched, grooved, or pinned disk is thrust towards a stationary disk or cylinder that is made up of diametrically inverse groves, notches, or holes, the two disks or cylinders come in contact with each other and interlock preventing the shaft and its associated hinge plate, or tablet supporting mechanism, from moving or turning one relative to the other.

If on the other hand, the hinge pin is fastened to a gear (typically a spur gear), then instead of being pushed into an opposing disk, the hinge pin would be inserted into an internal gear that is the inverse of the fastened spur gear in such a way that when the two gears come in contact with one another, they interlock and prevent the shaft and its associated hinge plate, or tablet supporting mechanism, from moving or turning one relative to another. The term spur gear is used broadly to mean a rotational locking mechanism. For example, the spur gear and gear receptacle may be embodied as a ratchet and tooth, a shaft with a hex end wrench and a hexed hole to receive the end of the shaft, a disc with teeth on its periphery that mesh with teeth on an inside surface of a receptacle, and other similar mechanisms.

The locations of the spur gear and the internal gear are interchangeable for the purpose of locking the rotation of the above described hinge pin; the internal gear may be mounted on the rotating plate and thrust towards an inverse stationary spur gear to fix the rotation of the hinge pin.

The shaft of the hinge pin and the hinge plate, or tablet supporting mechanism, may be fused or separate. When the shaft of the pin and the hinge plate, or tablet supporting mechanism are fused, then the combination of the hinge pin and the fused hinge plate are thrust towards the fixed notched, grooved, or pinned disk, cylinder, or gear in a grooved channel. When the shaft of the pin and the hinge plate, or tablet supporting mechanism, are independent of each other such as when the shaft of the pin may be spring loaded in the same manner a wristwatch spring is spring loaded, the hinge plate can be moved from side to side to lock it and unlock it by sliding it over the shaft of the pin.

Figure 33:
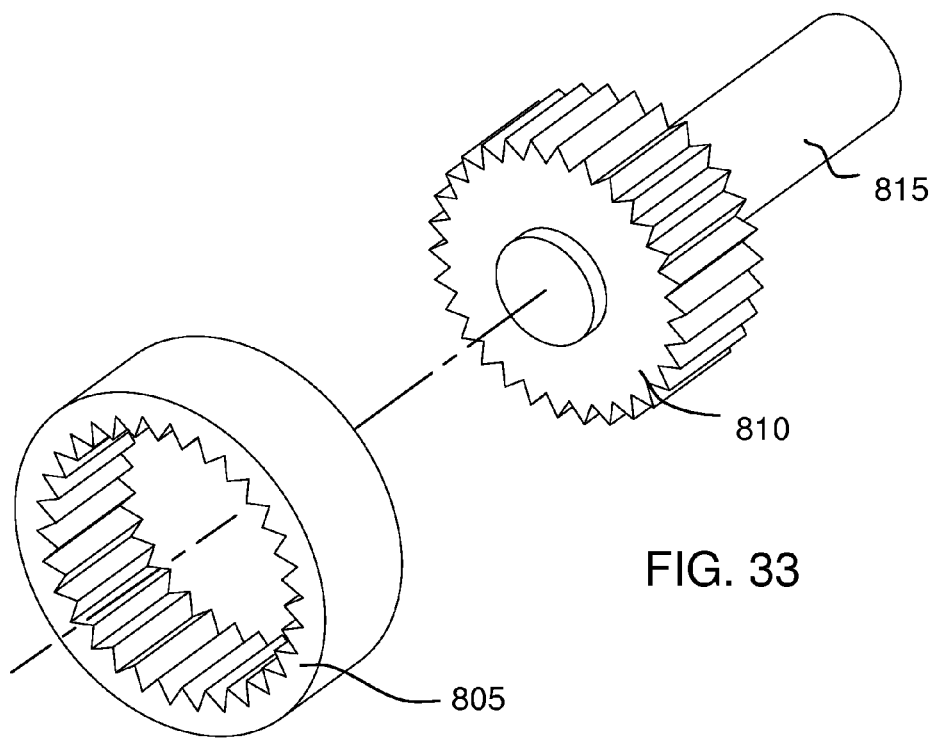
FIG. 33 illustrates a three-dimensional perspective of an exploded view representation of how an example non limiting spur gear connected to a cylindrical shaft can mesh with an internal gear.

These and other features and advantages would be better and more completely understood by referring to the following detailed description of exemplary non-limiting illustrative embodiments in conjunction with the drawings of which:

FIG. 33 is a three-dimensional perspective of an exploded view representation of how an example non limiting spur gear 810 connected to a rotating cylindrical shaft 815 can mesh with a fixed or stationary internal gear 805 to lock the angular position of the rotating shaft.

Figure 34:
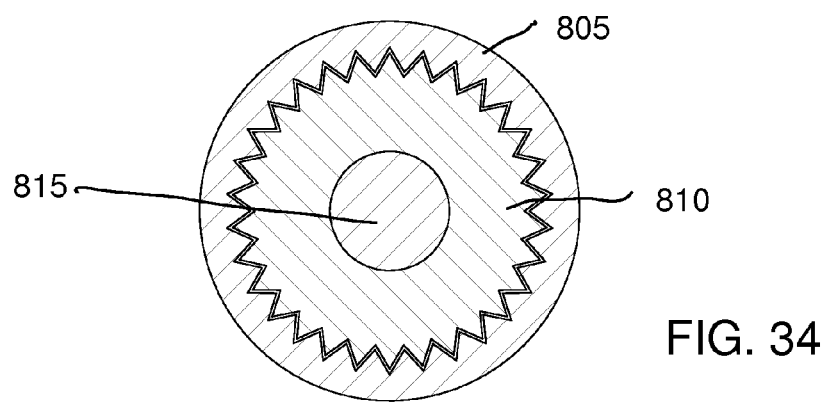
FIG. 34 illustrates a cross-sectional two-dimensional representation of how an example non-limiting spur gear connected to a cylindrical shaft can mesh with an internal gear to fix the angular/rotational position of the shaft.

FIG. 34 illustrates a cross-sectional two-dimensional representation of how an example non-limiting spur gear 810 connected to a cylindrical shaft 815 can mesh with an internal gear 805 to fix the angular/rotational position of the shaft.

Figure 35:
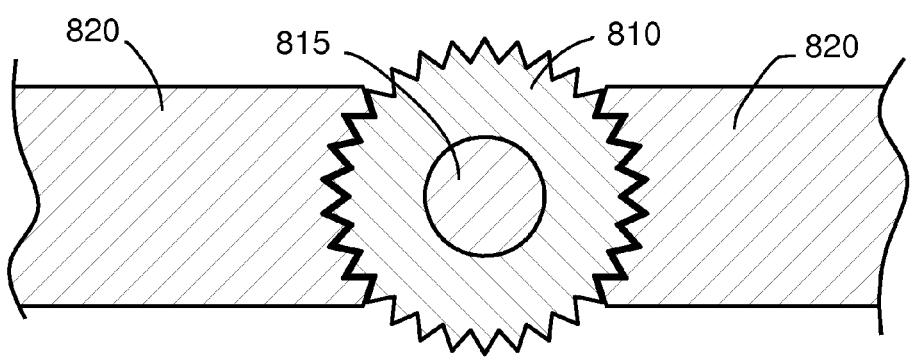
FIG. 35 illustrates a cross-sectional two-dimensional representation of how an example non-limiting spur gear connected to a cylindrical shaft can mesh (or engage) with a partial internal gear imbedded in the side wall extending between the front surface and the rear surface of a fixed plate in order to fix the angular rotational position of the shaft.
Figure 36:
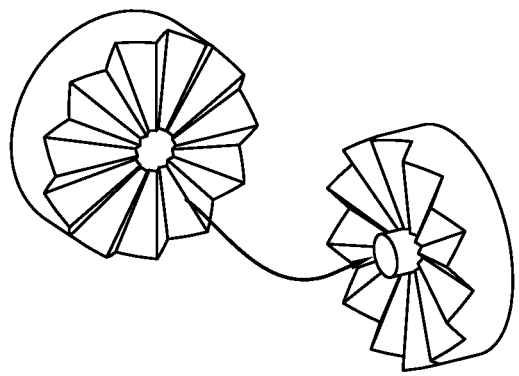
FIG. 36-39 illustrate a three-dimensional perspective view of several example non-limiting notched, grooved, and pinned plates and cylinders made up of diametrically inverse groves, notches, and holes that may be meshed together to fix the rotational position of a shaft.
Figure 37:
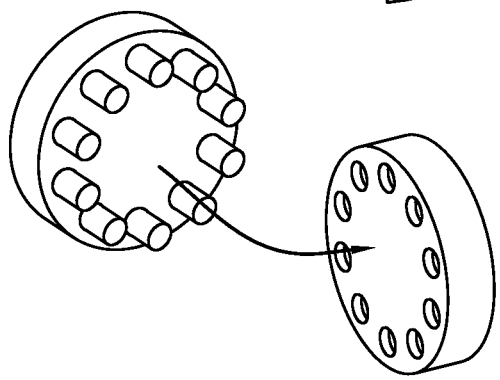
Figure 38:
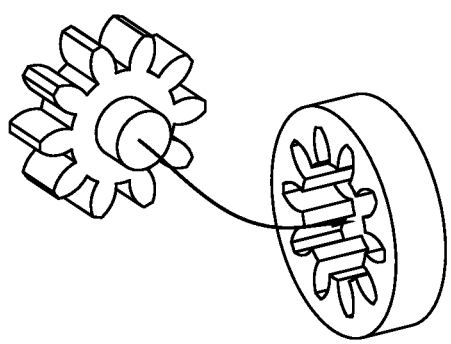
Figure 39:
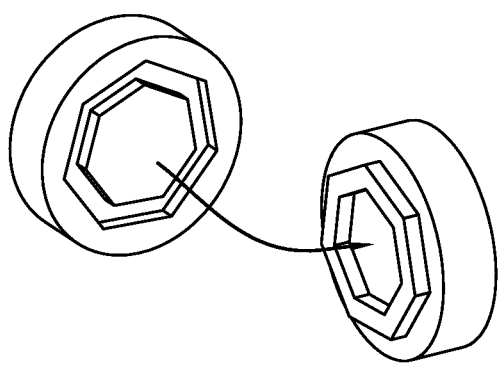
Figure 40A:
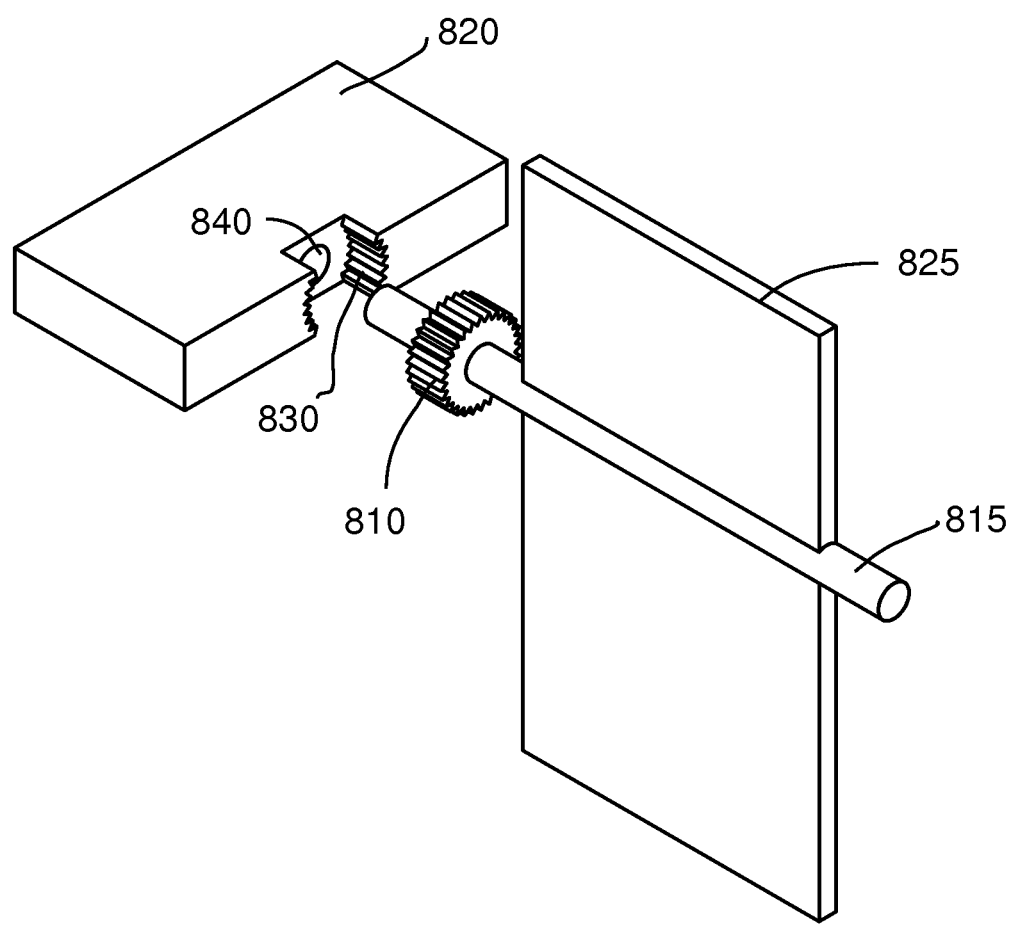
FIG. 40A-40F show an example flip chart animation of how the rotational position of an example non-limiting plate, or supporting element, attached to cylindrical shaft or pin fastened to an example non-limiting spur gear can be locked, unlocked, rotated, and relocked when inserted into and extracted from a partial internal gear imbedded in the side wall extending between the front surface and the rear surface of a fixed plate.
Figure 40B:
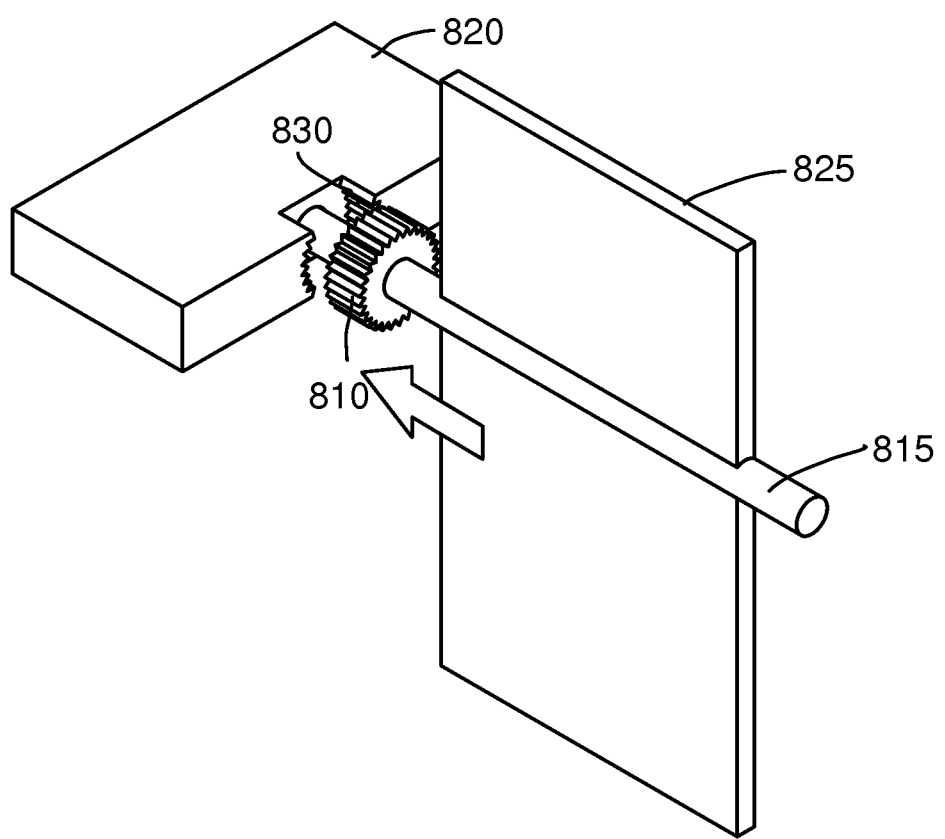
Figure 40C:
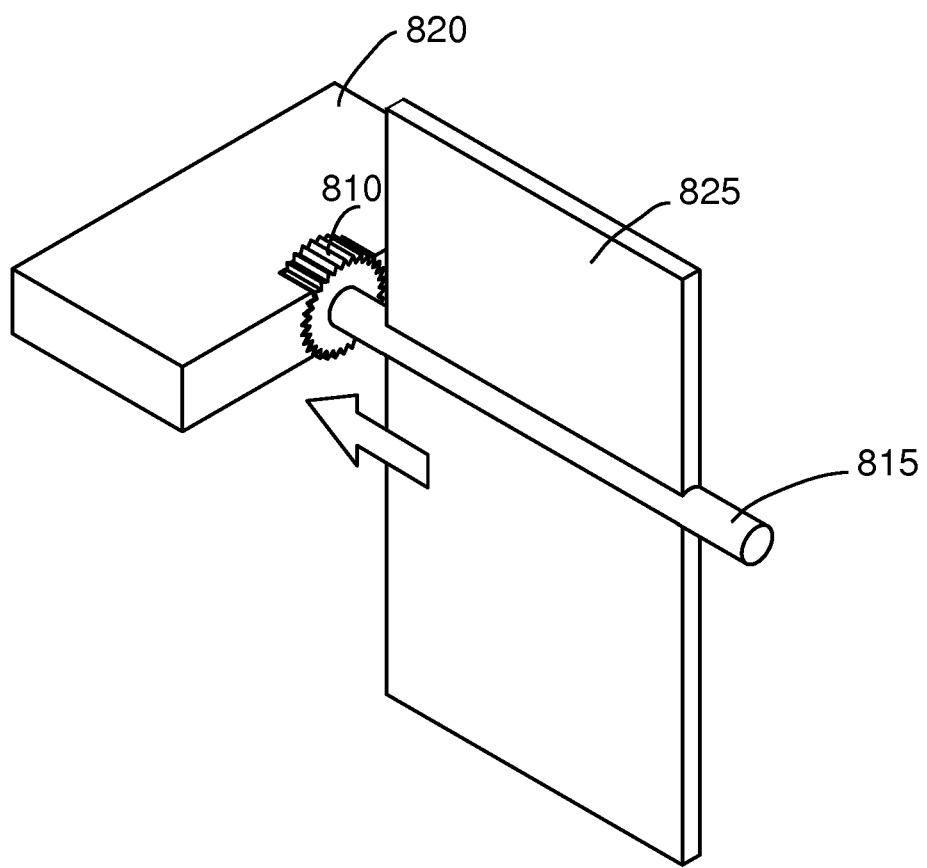
Figure 40D:
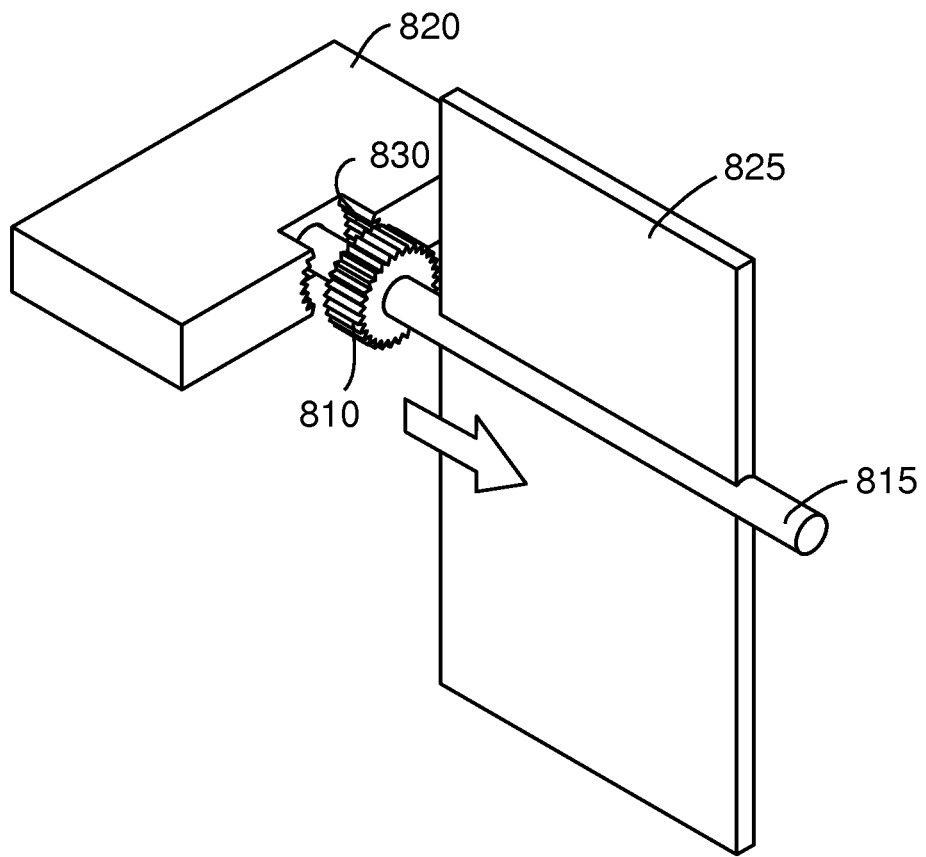
Figure 40E:
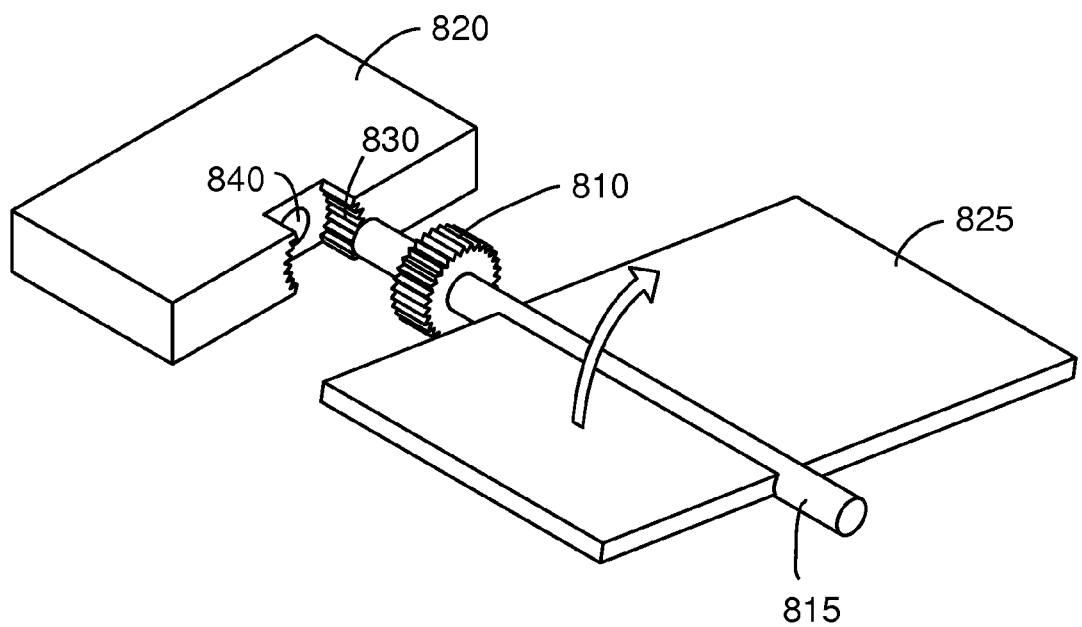
Figure 40F:
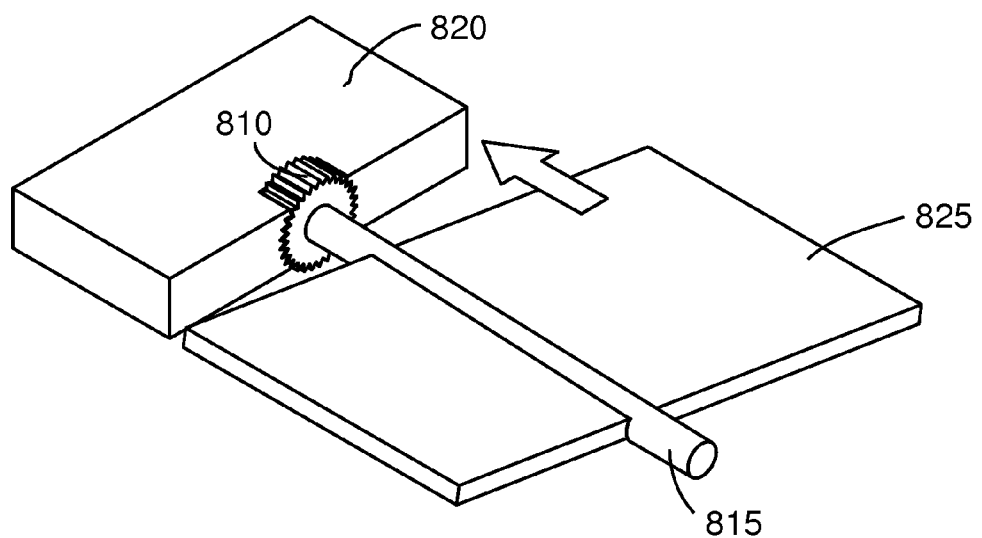

FIG. 35 illustrates a cross-sectional two-dimensional representation of how an example non-limiting spur gear 810 connected to a cylindrical shaft 815 can mesh with a partial internal gear 820 imbedded in the side wall extending between the front surface and the rear surface of a fixed plate in order to fix the angular rotational position of the shaft.

FIG. 36-39 illustrate a three-dimensional perspective view of several example non-limiting notched, grooved, and pinned plates and cylinders made up of diametrically inverse groves, notches, and holes that may be meshed together to fix the rotational position of a shaft.

FIG. 40A-40F show an example flip chart animation of how the rotational position of an example non-limiting plate, or supporting element 825, attached to cylindrical shaft or pin 815 fastened to an example non-limiting spur gear 810 can be locked, unlocked, rotated, and relocked when inserted into and extracted from a partial internal gear 830 imbedded in the side wall extending between the front surface and the rear surface of a fixed plate.

Figure 41:
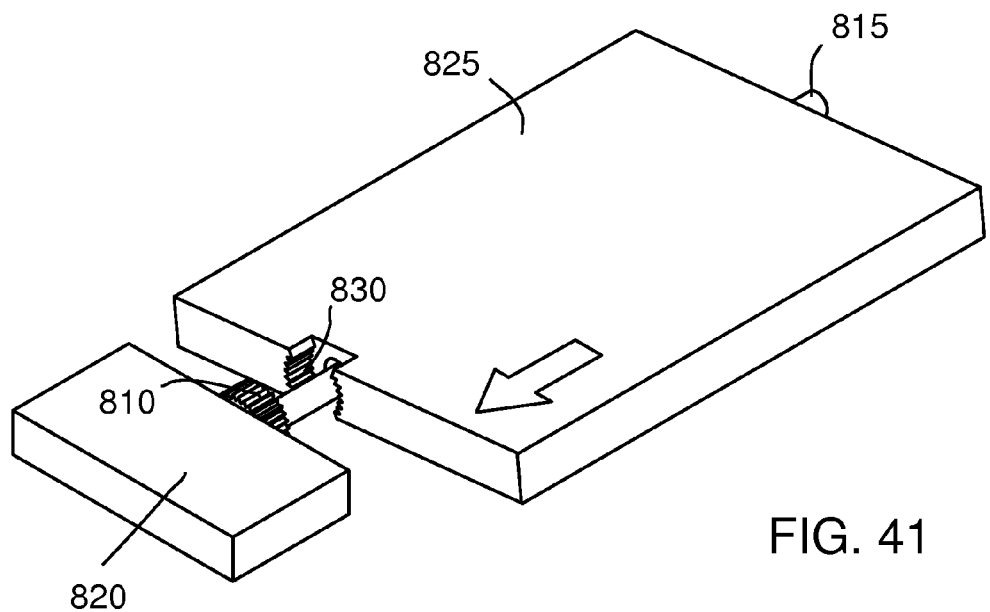
FIG. 41 illustrates a three-dimensional perspective view showing how interchanging the location of the gears of FIG. 40A-40F by fixing the position of the spur gear while making the internal gear rotatable will have the same locking and unlocking effect on the example non-limiting rotatable plate, or supporting element, illustrated in FIG. 40A-40F.

FIG. 41 illustrates a three-dimensional perspective view showing how interchanging the location of the gears of FIG. 40A-40F by fixing the position of the spur gear 810 while making the internal gear 830 rotatable will have the same locking and unlocking effect on the example non-limiting rotatable plate, or supporting element, illustrated in FIG. 40A-40F.

FIG. 42 illustrates a two-dimensional representation wherein a supporting element 825 is in the unlocked flush position with a tablet holder mounting plate 840.

FIG. 42A shows additional details of the FIG. 42 detailing an unlocked position of the geared end 810 configuration of the pin 815 that engages with a channeled opening 860A within the tablet holder mounting plate wall 840.

FIG. 43 illustrates a two-dimensional representation wherein a supporting element 825 is in the locked flush position with a tablet holder mounting plate 840.

FIG. 43A shows additional details of the FIG. 43 detailing a locked position of the geared end 810 configuration of the pin 815 that engages with a channeled opening 860A within the tablet holder mounting plate wall 840.

Figure 44:
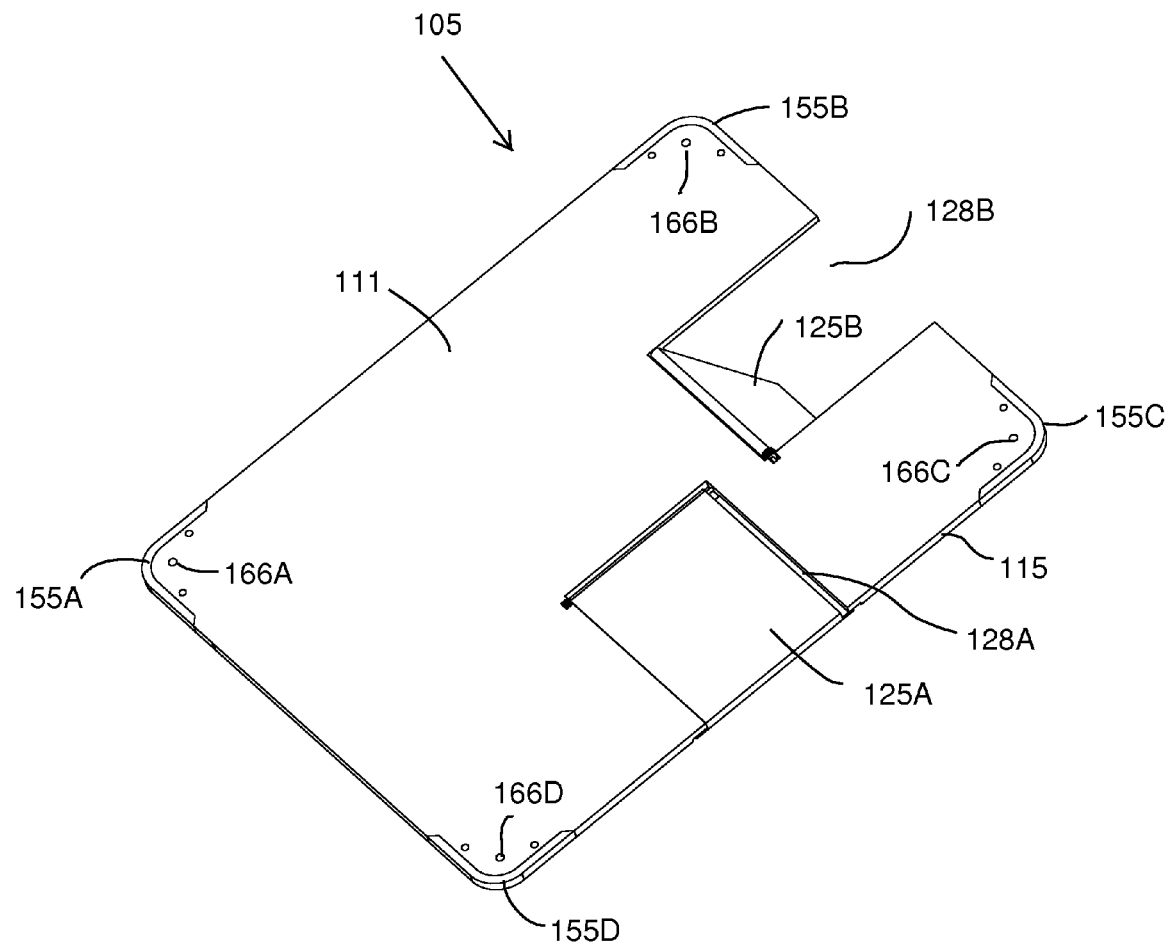
FIG. 44 shows a perspective view of an exemplary embodiment wherein a supporting element is built into a tablet holder mounting plate. The supporting element is deployed in a configuration that is useful for example where one wants to handwrite on a tablet in the portrait orientation.

FIG. 44 shows a perspective view of an exemplary embodiment wherein supporting elements 125A and 125B are built into a tablet holder mounting plate 105 with a front surface 111, a rear surface 113, and a side wall extending between the front surface and the rear surface 115. The mounting plate includes two cavities 128A and 128B used to contain supporting elements 125A & 125B. The supporting element 125B is deployed in a configuration that is useful for example where one wants to handwrite on a tablet in the portrait orientation.

Figure 45:
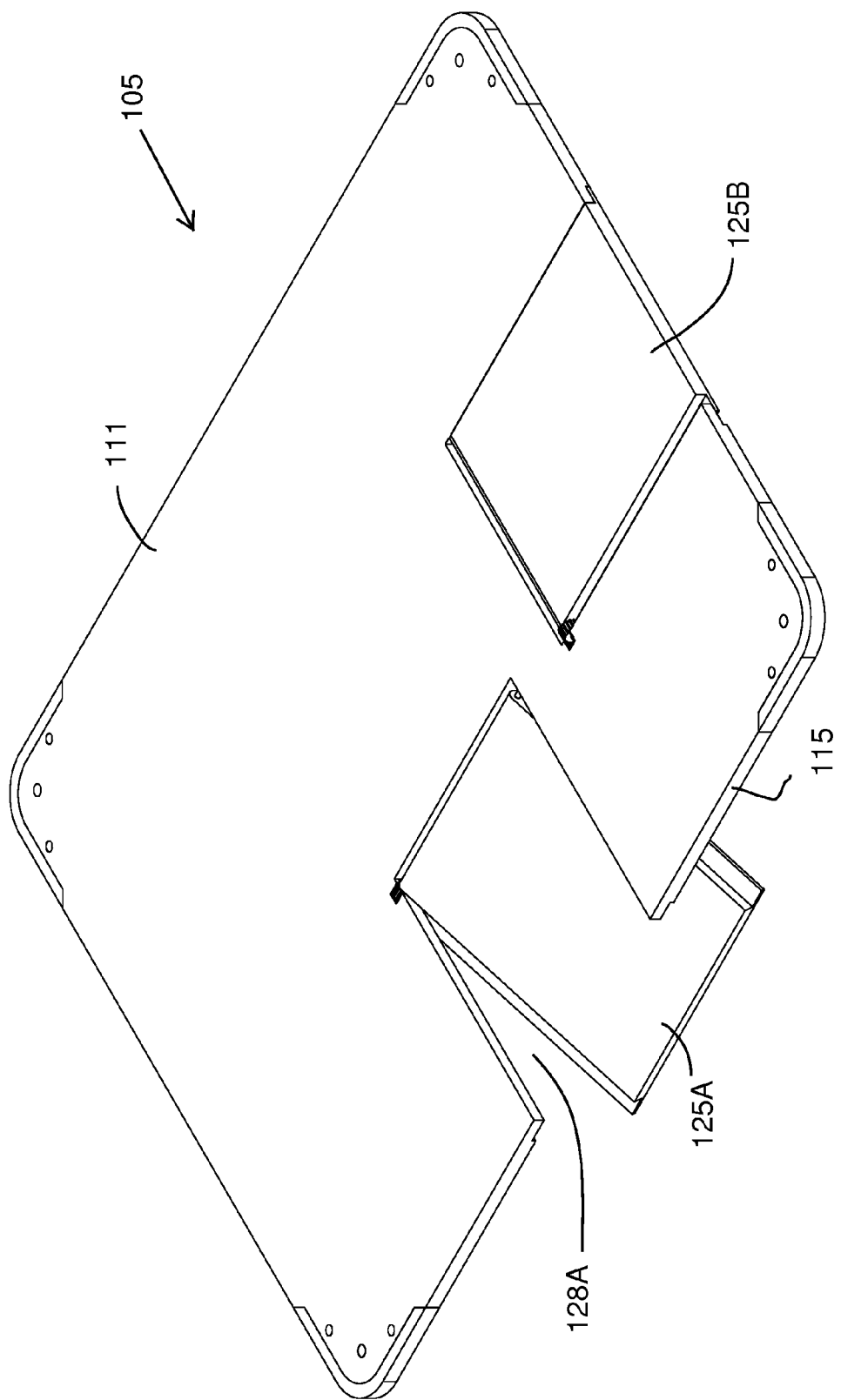
FIG. 45 shows a perspective view of an exemplary embodiment wherein a supporting element is built into a tablet holder mounting plate. The supporting element is deployed in a configuration that is useful for example where one wants to draw on a tablet in the landscape orientation.

FIG. 45 shows a perspective view of an exemplary embodiment wherein supporting elements 125A and 125B are built into a tablet holder mounting plate 105. The supporting element 125A is deployed in a configuration that is useful for example where one wants to draw on a tablet in the landscape orientation.

Figures 46, 47:
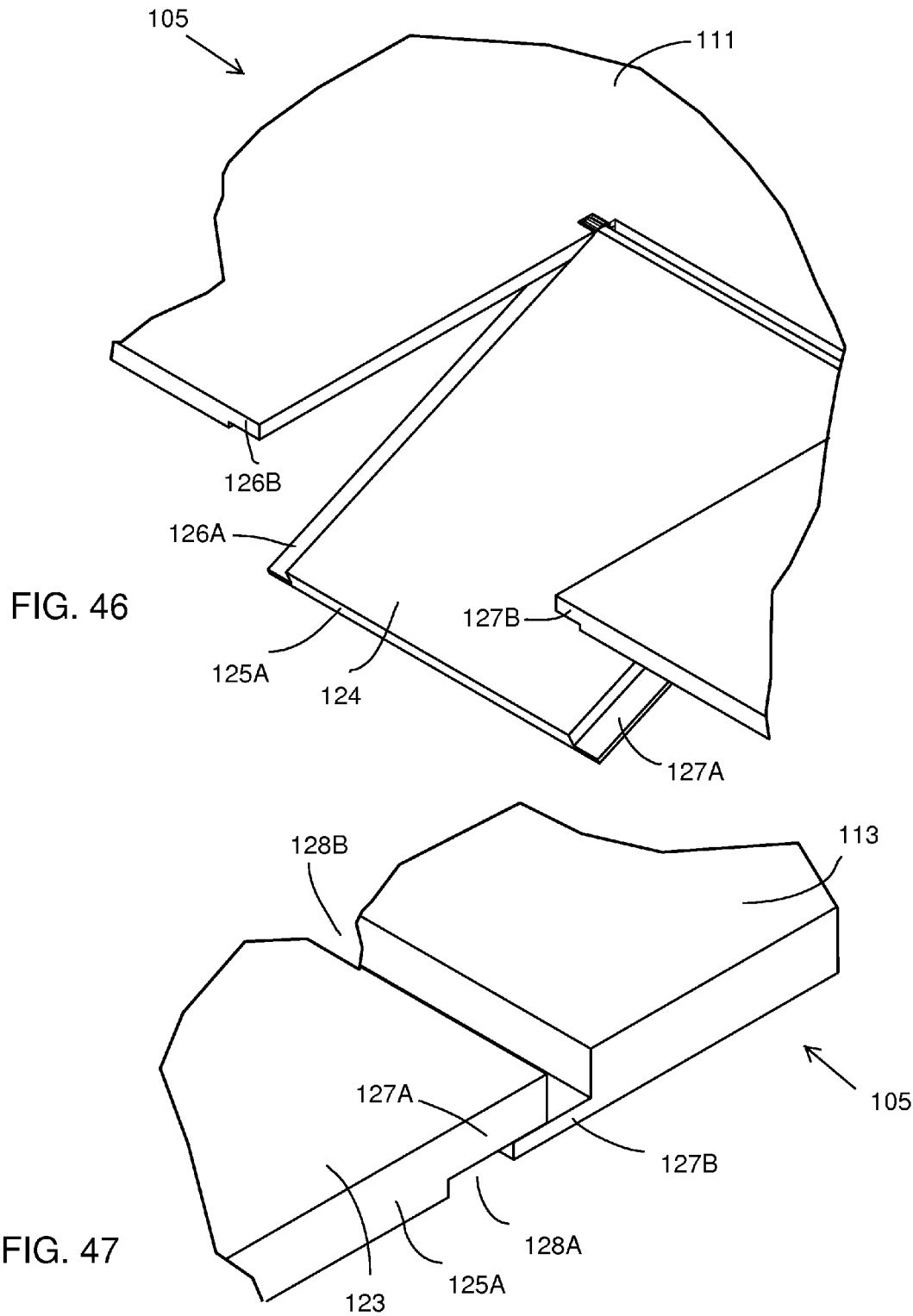
FIG. 46 illustrates a close-up three-dimensional embodiment of the front plate of a mounting plate supporting element in an extended position, with special emphasis on the shape of the ledges of the supporting element.
FIG. 47 illustrates a close-up three-dimensional embodiment of the back plate of a mounting plate supporting element and how it interacts with the ledges of the backside of the mounting plate in order to close the gap that results on either side of the supporting element when it is moved side to side to lock and unlock the rotational position of a tablet holder mounting plate.
Figure 52:
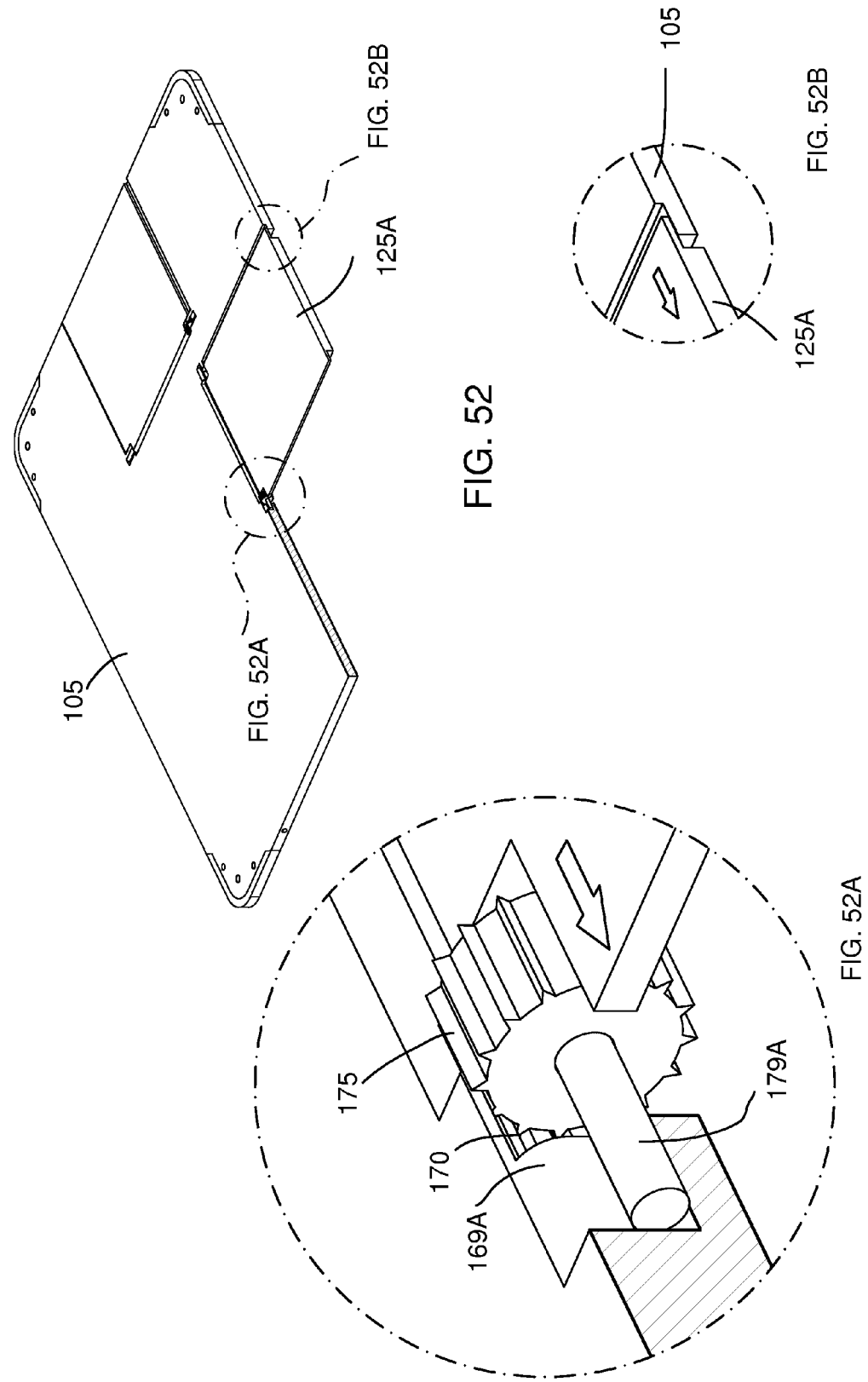

FIG. 46 illustrates a close-up three-dimensional embodiment of the front plate 124 of a mounting plate supporting element 125A in an extended position, with special emphasis on the shape of the ledges 126A and 127A of the supporting element.

FIG. 47 illustrates a close-up three-dimensional embodiment of the rear plate 113 of a mounting plate supporting element 125A and how it interacts with the ledges of the backside of the mounting plate 127B in order to close the gap 128B that results on either side of the supporting element 125A when it is moved side to side to lock and unlock the rotational position of a tablet holder mounting plate 105.

FIGS. 48 and 48A-48B show how a supporting element 125A can be coupled to a tablet holder mounting plate 105 by inserting the first end 179A and the second end 179B of the geared hinge pin 179 of the supporting element 125A into the first end 169A and the second end 169B of the grooved channel 170 of a tablet mounting plate 105.

FIGS. 49-50 and 49A-50A illustrate a close-up cross-section of how a supporting element 125A can be coupled to a tablet holder mounting plate 105 as described above.

FIGS. 51-57, 51A-57A, and 51B-52B show a three-dimensional perspective image sequence of how a supporting element 125A can be moved from side to side to lock, unlock, rotate, and relock it with respect to a tablet holder mounting plate 105.

Figure 58A:
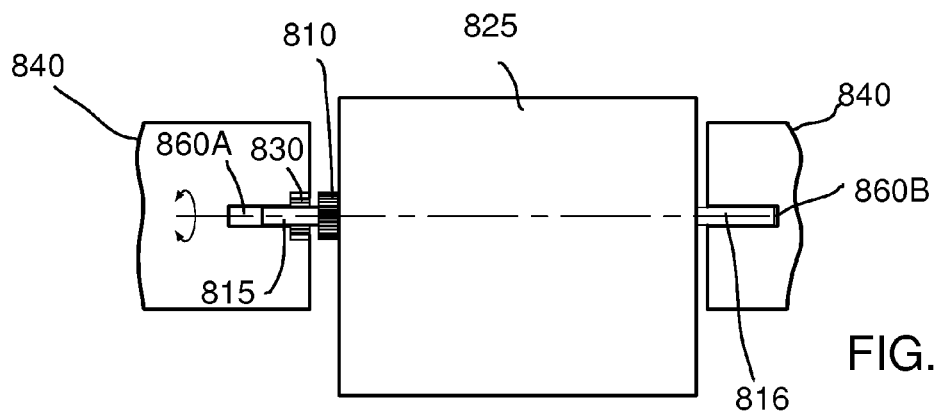
FIG. 58A-58B show a detail of how a supporting element can be moved from side to side within a channelized opening in the back of the tablet holder mounting plate by engaging and disengaging a geared shaft molded into the supporting element from side to side.
Figure 58B:
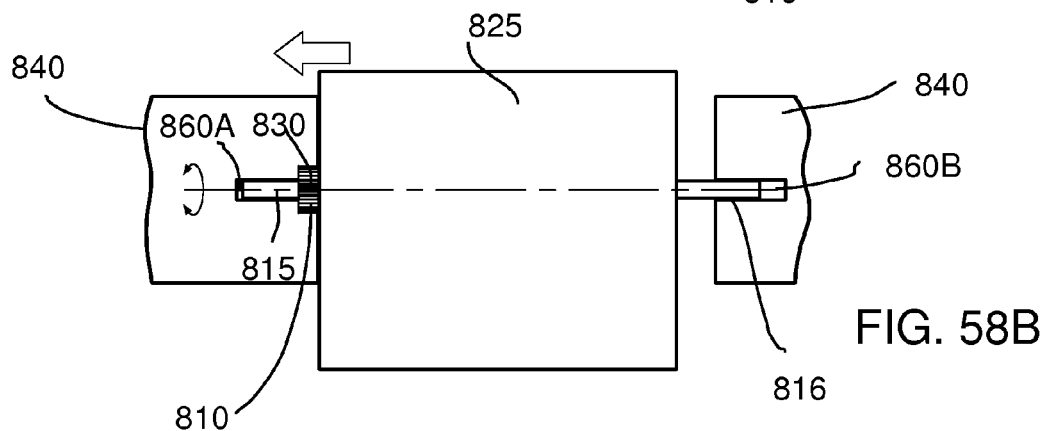

FIG. 58A-58B show a detail of how a supporting element 825 can be moved from side to side within a channelized opening 860A & 860B in the back of the tablet holder mounting plate 840 by engaging and disengaging the first end 815 and the second end 816 of a geared shaft fused into the supporting element 825 from side to side of the tablet holder mounting plate 840.

Figure 59:
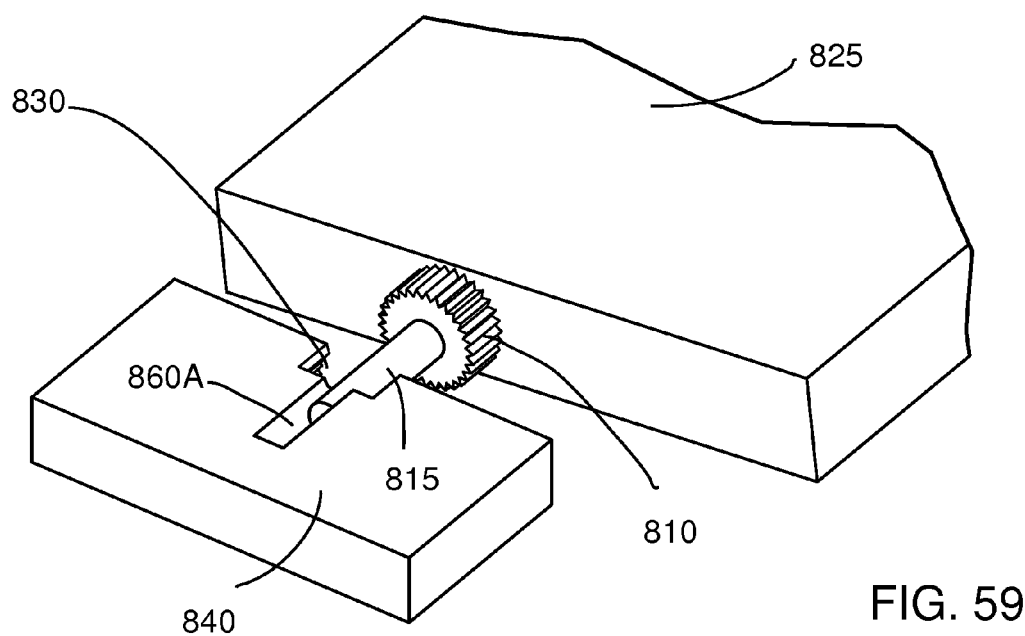
FIG. 59 illustrates a partial three-dimensional embodiment of FIG. 58A above

FIG. 59 illustrates a partial three-dimensional embodiment of FIG. 58A above.

Figure 60A:
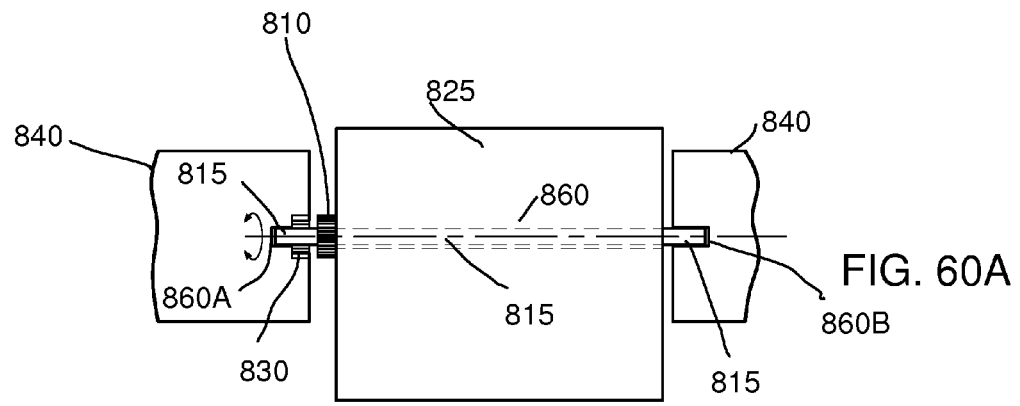
FIG. 60A-60B show a detail of how a geared supporting element can be moved from side to side within a channelized opening in the back of the tablet holder mounting plate by sliding over a pin. The pin may be spring loaded in the same manner a wristwatch spring pin is spring loaded.
Figure 60B:
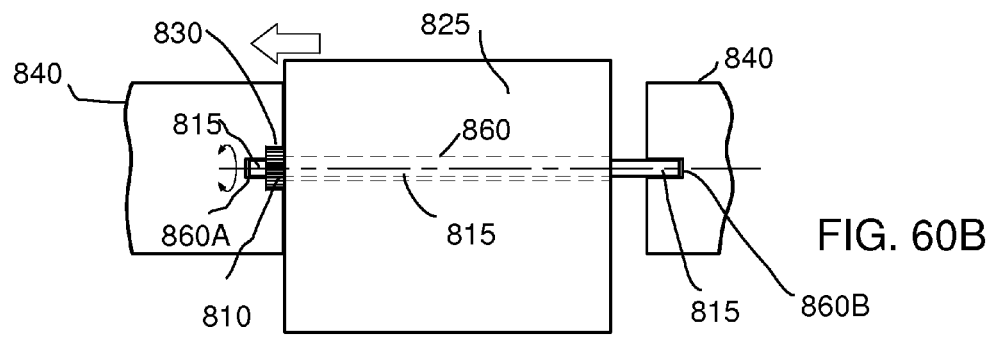

FIG. 60A-60B show a detail of how a geared supporting element 825 can be moved from side to side within a channelized opening 860 in the back of the tablet holder mounting plate 840 by sliding over a pin 815. The pin 815 may be spring loaded in the same manner a wristwatch spring pin is spring loaded.

Figure 61:
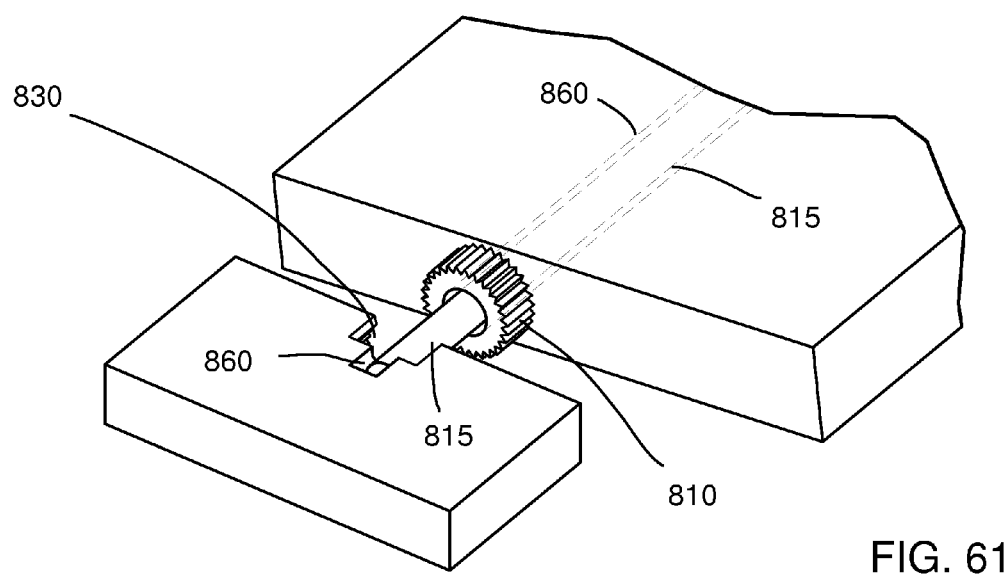
FIG. 61 illustrates a partial three-dimensional embodiment of FIG. 70A above

FIG. 61 illustrates a partial three-dimensional embodiment of FIG. 60A above.

Figure 62:
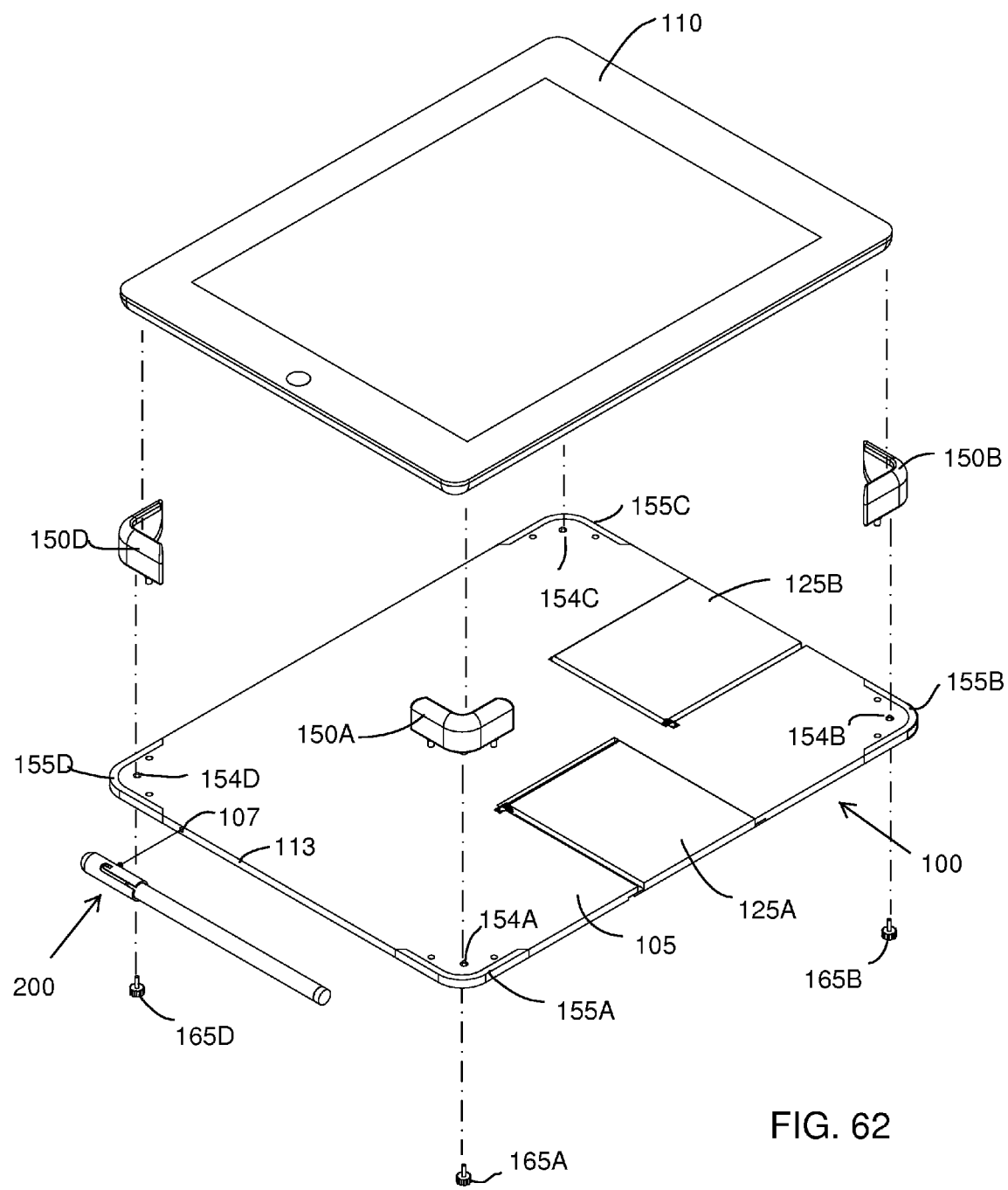
FIG. 62 illustrates a three-dimensional perspective exploded view of the components of the tablet holder mounting plate and how they fit together.

The following illustrations represent embodiments of the workings and implementation of a drop resistant tablet holding brackets mechanism:

FIG. 62 illustrates a three-dimensional exploded view representation of the example non-limiting tablet holder 100 showing how the individual components fit together to hold a tablet to a mounting plate. In particular, this illustration displays how the mounting plate 105 provides a tablet 110 double protection from knocks and drops through the use of four contoured rubber bumpers 150A, 150B, 150C, and 150D which are positioned at very close proximity to four molded rubber brackets 155A, 155B, 155C, and 155D located at the corner of the mounting plate 105. The contoured rubber bumpers 150A, 150B, 150C, and 150D secure the tablet 110 to the mounting plate 105 with the help of four threaded screws 165A, 165B, 165C, and 165D which pass through four drilled holes 154A, 154B, 154C, and 154D on the chassis of the mounting plate 105. The illustration also shows how a detachable pen holder 200 with a threaded screw can be attached to and detached from the side wall of the mounting plate 113 through a threaded hole 107.

Figure 63:
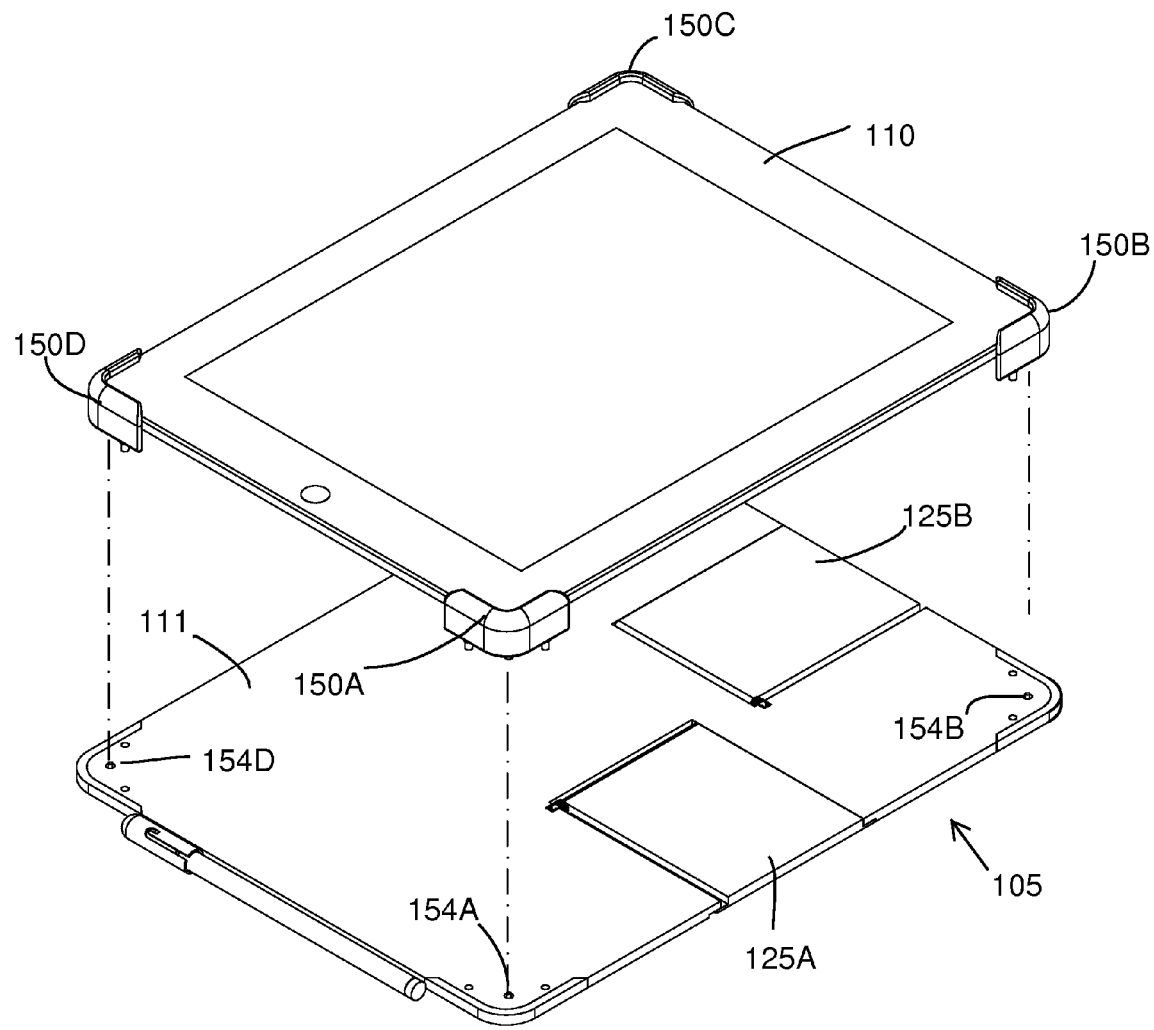
FIG. 63 illustrates a three-dimensional perspective view of the components of the tablet holder mounting plate and how they secure a tablet to the mounting plate.

FIG. 63 illustrates a three-dimensional perspective view of the components of the tablet holder mounting plate 105 and how they secure a tablet 110 to the mounting plate 105 through the use of the contoured rubber bumpers 150A, 150B, 150C, and 150D.

FIG. 64 illustrates a three-dimensional bottom perspective view of how a contoured rubber bumper 150 secures a tablet 110 to a mounting plate 105 and provides robust protection against knocks and drops. Each rubber bumper is secured to a mounting plate through three built-in rubberized protruding elements 184, 186, and 187 that can be inserted into corresponding holes 154, 156, and 157 on the chassis of the mounting plate. Protruding elements 186 and 187 consist of rubberized cylinders, while the center protruding element 184 is a hollowed cylinder with a threaded core through which passes a threaded screw 165 that fastens the contoured rubber bumper 150 to the mounting plate 105. Each protruding rubber element 186, 187, and 184 is further enhanced with a corresponding built-in rubberized flat ring 196, 197, and 194 located a short distance from the base 199 of the contoured rubber bumper 150. The built-in rubberized rings are used to dampen the impact of a crash if the mounting plate 100 is knocked or dropped. Protruding rubberized elements 186 and 187 are used to stabilize the orientation of the contoured rubber bumper 150.

FIG. 65 illustrates a two-dimensional side view of FIG. 64.

FIG. 66 illustrates a cross-sectional two-dimensional representation of FIG. 64 showing how the rubberized rings 194, 196, and 197 at the bottom of a contoured rubber bumper 150 are used to dampen the impact of a knock or a crash on a tablet holder 100 secured by contoured rubber bumpers 150.

The following illustrations represent various embodiments of the workings and implementation of a detachable stylus mechanism:

FIG. 67A-67D illustrate an image sequence where an electronic pen 205 is secured into a detachable stylus holder 215. The pen attachment mechanism relies on inserting a short protruding element 210 attached to an electronic stylus 205 into a "J" shaped groove on a spring loaded cap for a detachable stylus mechanism 215 and twisting the electronic pen in a way that secures the stylus in the cap by positioning the short protruding element 210 at the tip of the short end of the "J" groove and securing it in place through pressure provided by a spring, or a material with spring-like properties 225 located at the tip of the pen cap enclosure.

Figure 68A:
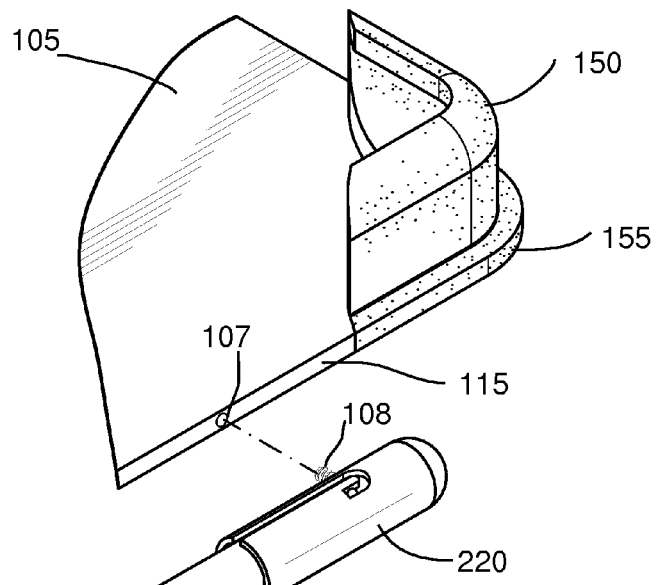
FIG. 68A-68B illustrates an image sequence where the detachable stylus holder is attached to the side section of the mounting plate.
Figure 68B:
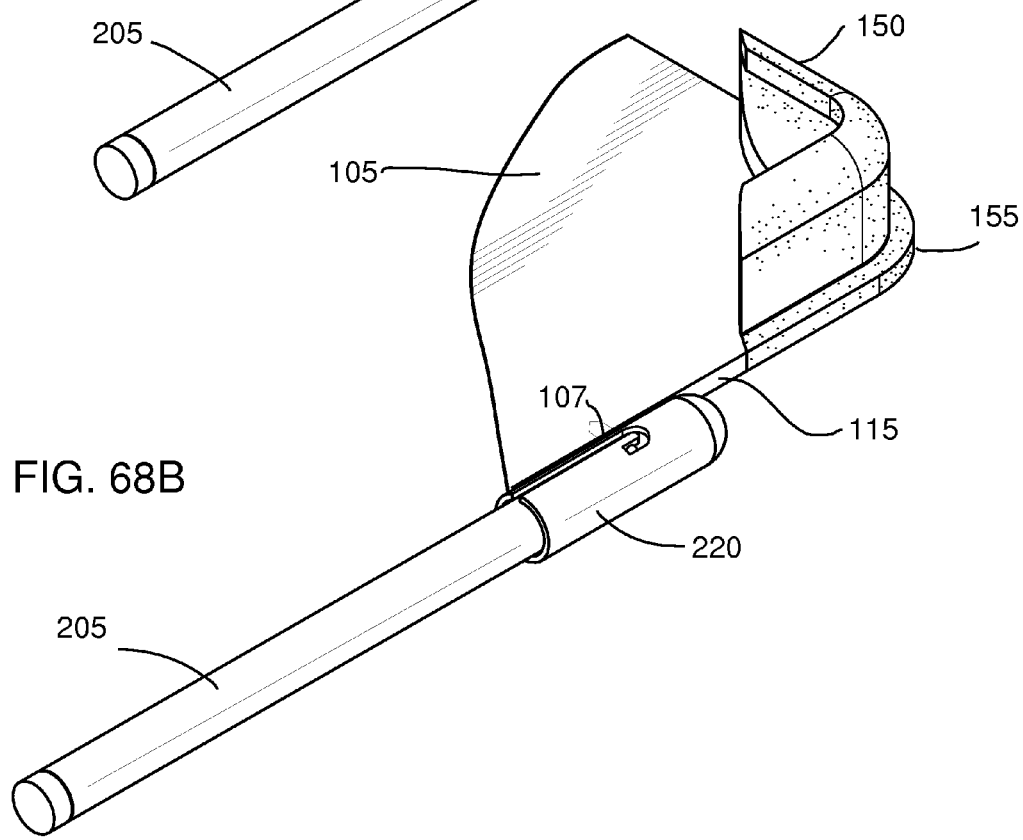

FIG. 68A-68B illustrate an image sequence where the detachable stylus holder 220 is attached to the side wall 115 of the mounting plate 105 through a threaded protrusion 108 that screws into a threaded hole 107 on the side wall 115 of the mounting plate 105.

Figure 69:
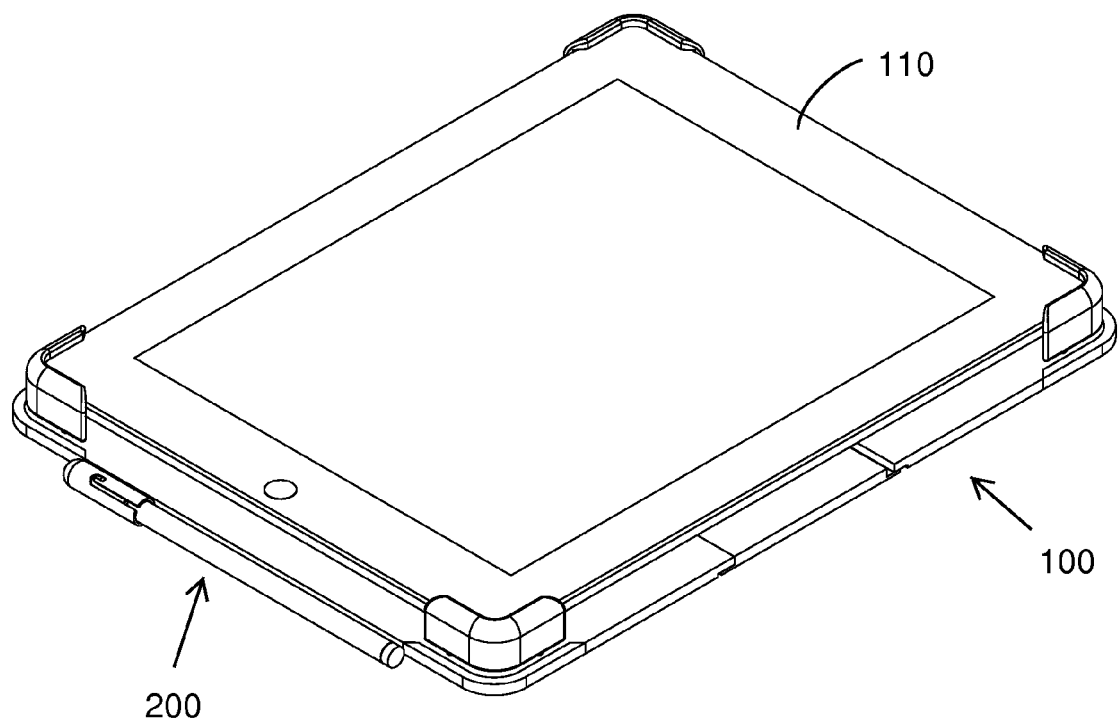
FIG. 69 illustrates a perspective view of an embodiment of a tablet holder with an attached electronic pen.

FIG. 69 illustrates a perspective view of an embodiment of a tablet 110 mounted on a tablet holder 100 fitted with a detachable stylus mechanism 200.

Figure 70:
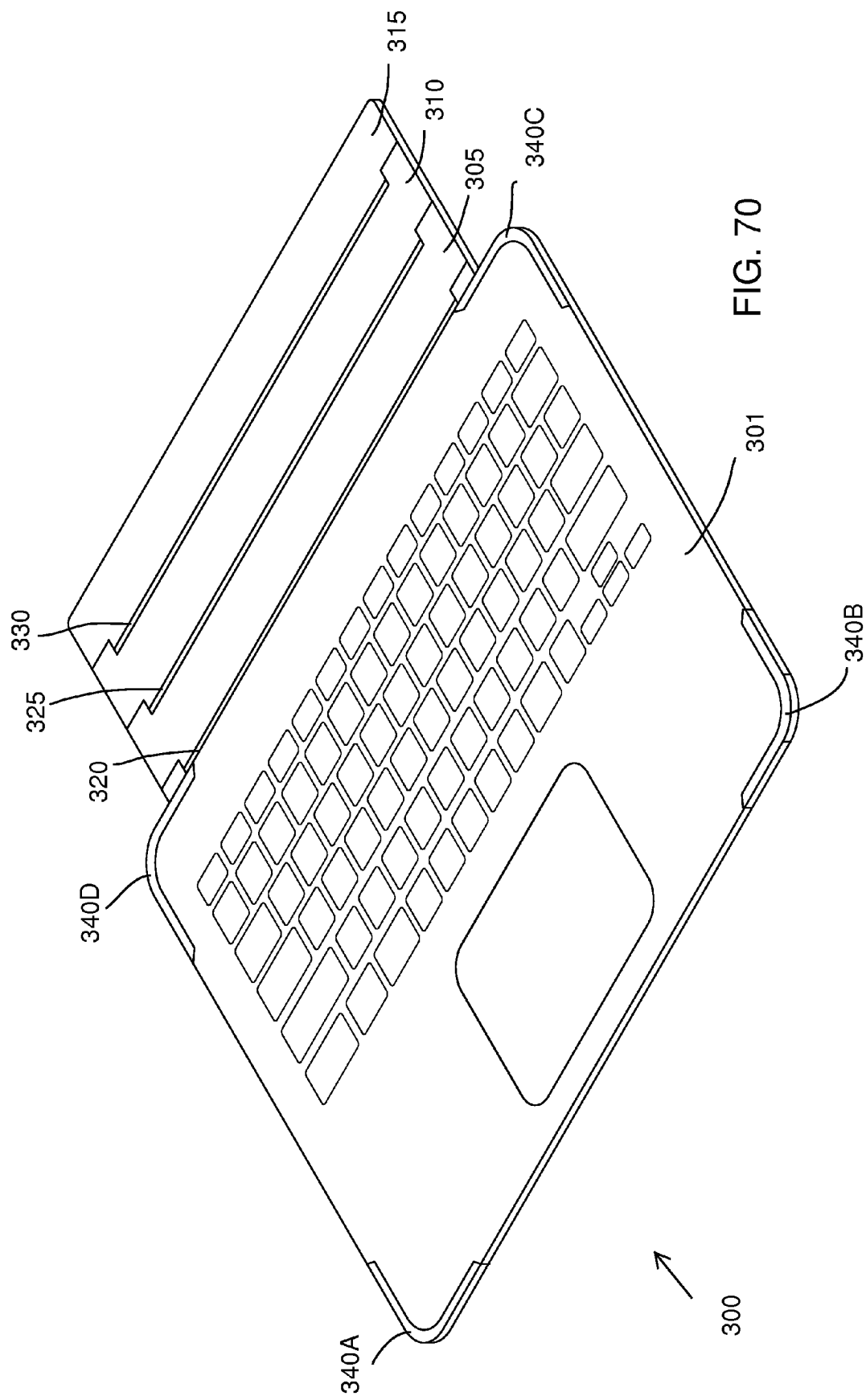
FIG. 70 illustrates a perspective view of an embodiment of a wireless magnetic detachable keyboard.

The following illustrations represent various embodiments of the workings and implementation of a height adjustable detachable wireless magnetic keyboard mechanism:

FIG. 70 illustrates a perspective view of an embodiment of a height adjustable wireless magnetic detachable keyboard mechanism 300. The mechanism consists of a keyboard plate 301 with four molded rubber brackets 340A, 340B, 340C, and 340D, supplemented by three hinged magnetized strips 305, 310 and 315 that can swivel around rubberized flexible joints 320, 325, and 330 or around pins which may be spring loaded in the same manner a wristwatch spring is spring loaded. The keyboard plate may be magnetized near rubber brackets 340A and 340B to enable to keyboard to attach to corresponding magnetized tips at the top of the molded rubber brackets located at the corner of a tablet holder mounting plate.

Figure 71:
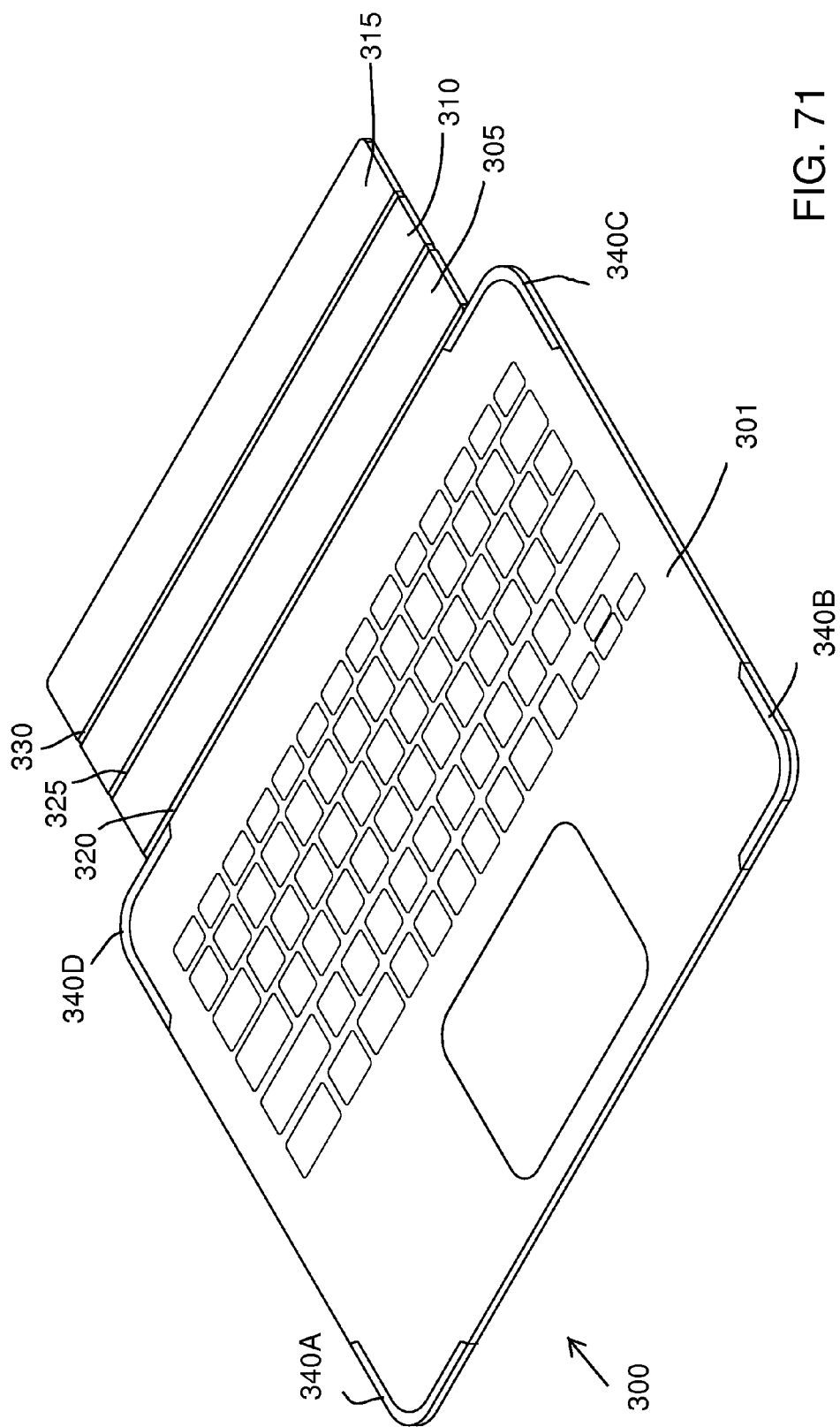
FIG. 71 illustrates a perspective view of an alternative embodiment of a wireless magnetic detachable keyboard.
Figure 72A:
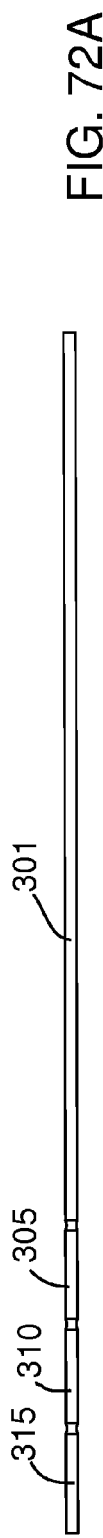
FIG. 72A-72D illustrate an image sequence of how the detachable keyboard elements can be flexed to set the keyboard at a raised incline.
Figure 72B:
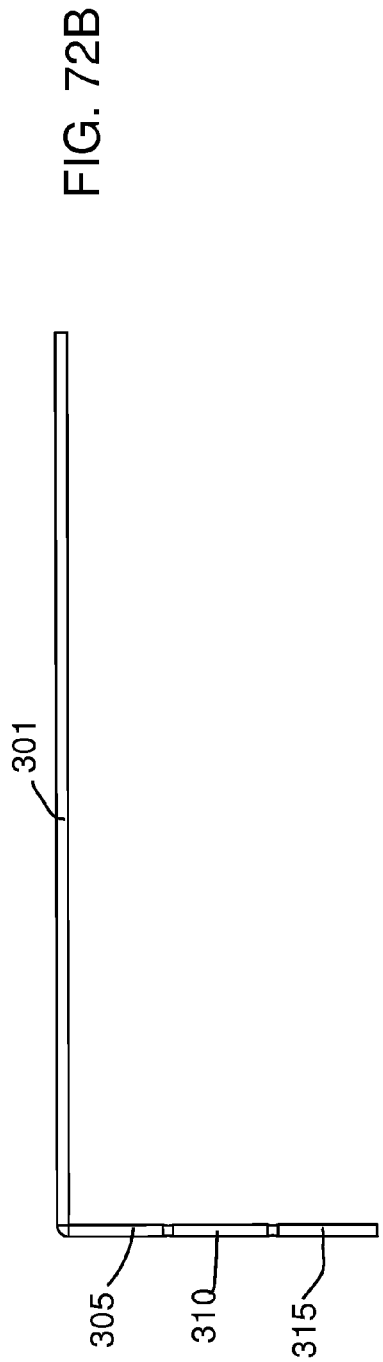
Figure 72C:
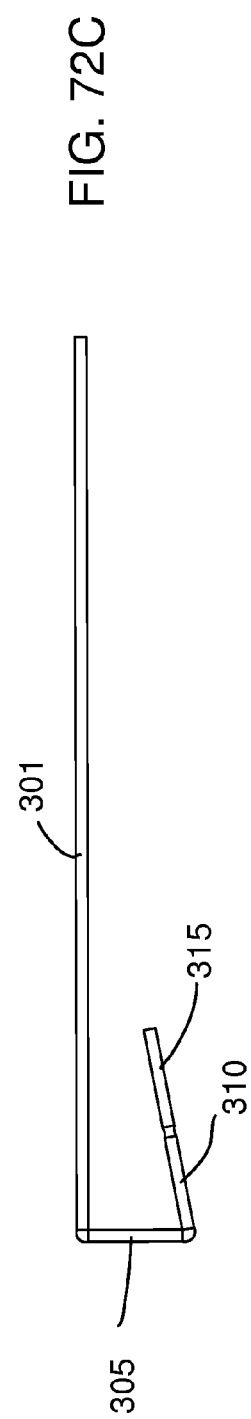
Figure 72D:
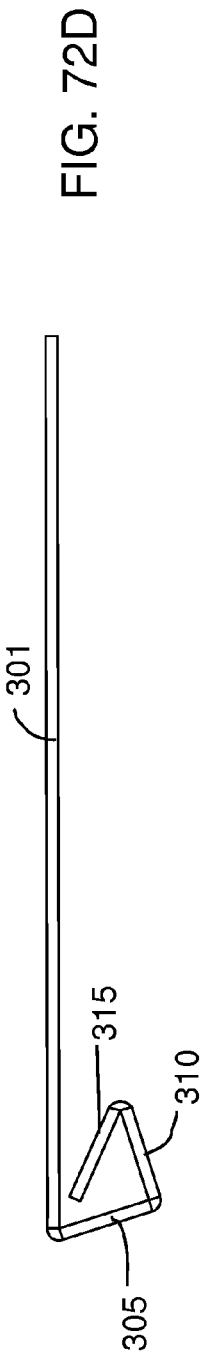

FIG. 71 illustrates a perspective view of an alternative embodiment of the wireless magnetic detachable keyboard illustrated in FIG. 70.

FIG. 72A-72D illustrate an image sequence of how the detachable keyboard elements 305, 310, and 315 can be flexed to set the keyboard plate 301 at a raised incline.

FIG. 73A-73B illustrate two-dimensional side views of alternative embodiments of a raised wireless magnetic detachable keyboard.

Figure 74:
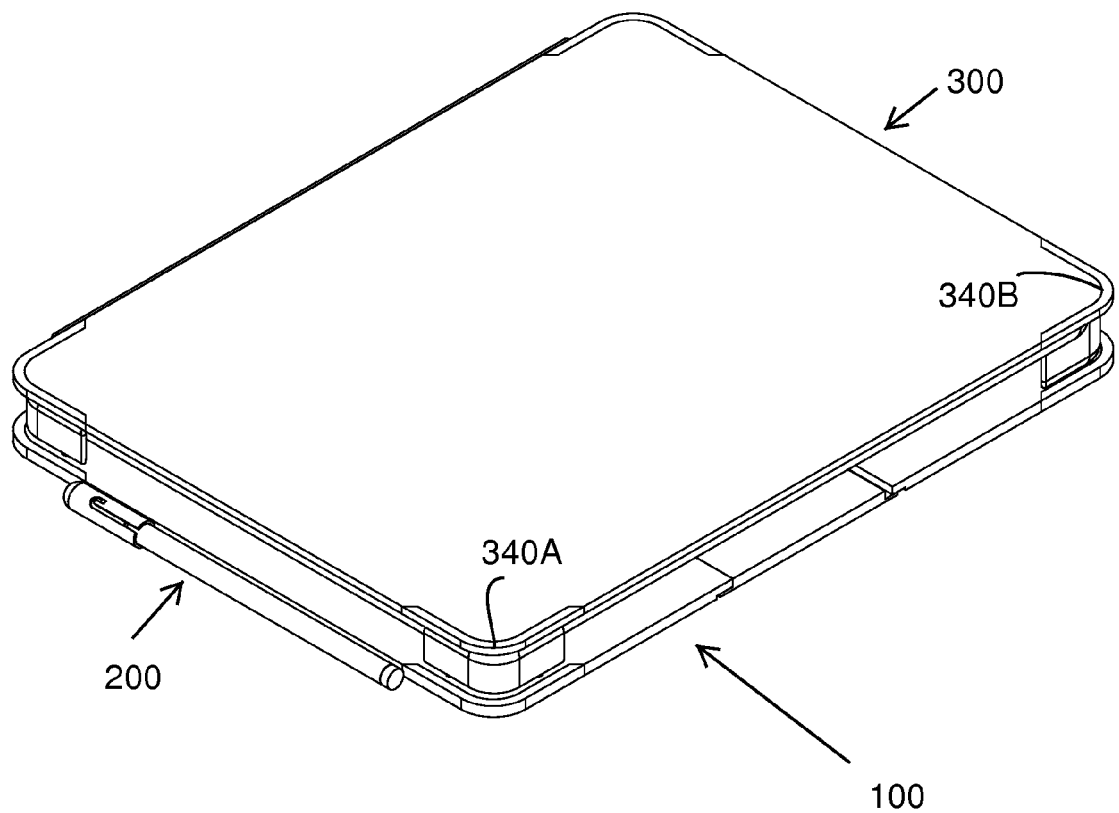
FIG. 74 illustrates a perspective view of an embodiment of a combined tablet holder and detachable pen with the height adjustable detachable wireless magnetic keyboard used as protective cover.

FIG. 74 illustrates a perspective view of an embodiment of a combined tablet holder 100 and detachable stylus mechanism 200 with the height adjustable detachable wireless magnetic keyboard mechanism 300 used as protective cover.

The following illustrations represent various embodiments of the workings and implementation of a quick-release mounting plate mechanism.

Figure 75:
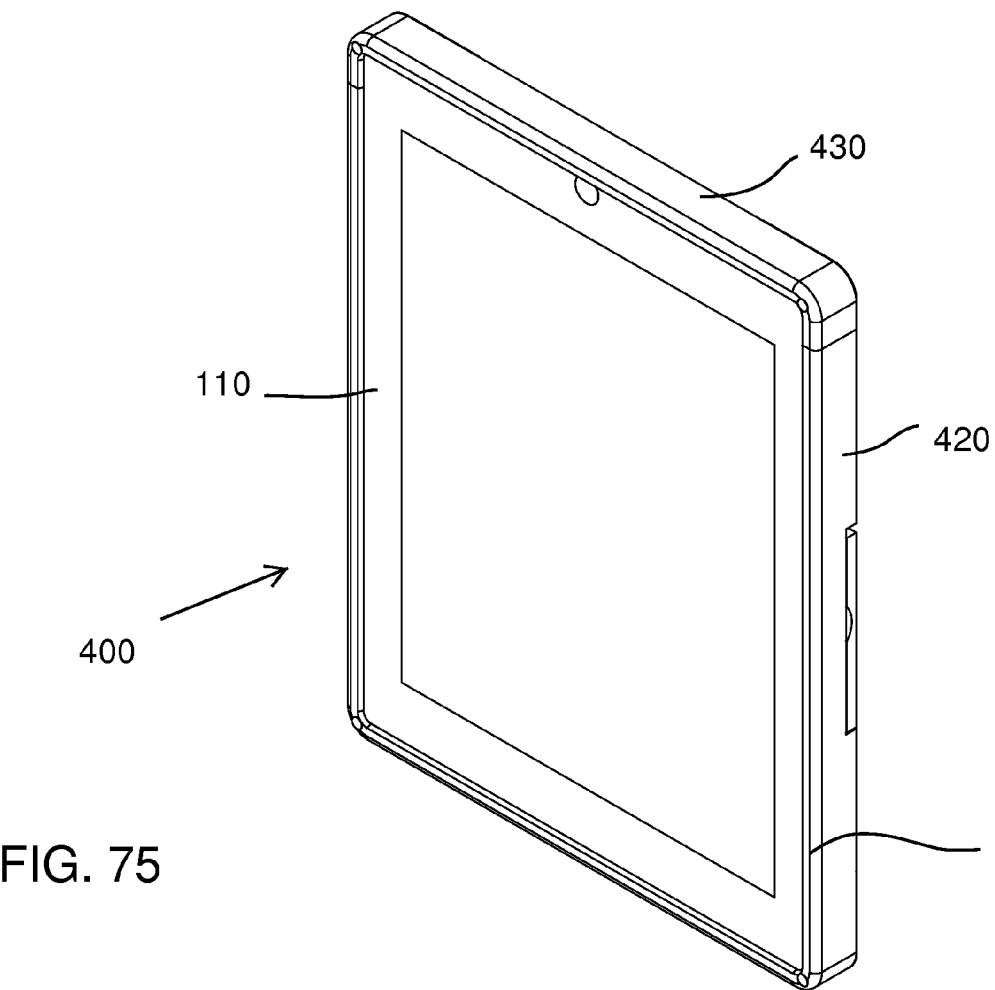
FIG. 75 illustrates a perspective view of an embodiment of a tablet holder where the mounting plate is split into two sections with bumper-style edge protection for quick tablet insertion and retrieval.

FIG. 75 illustrates a perspective view of an embodiment of a split mounting plate tablet holder 400 with bumper-style edge protection 421 where the mounting plate is split into two sections; a top section 430 and a bottom section 420.

Figure 76:
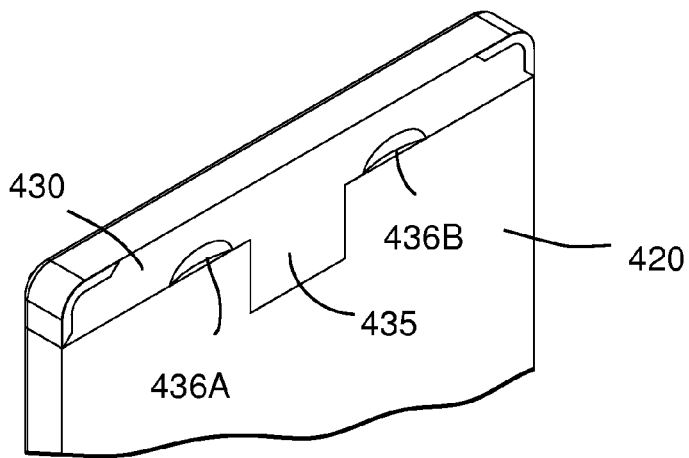
FIG. 76 illustrates a rear perspective view of an embodiment of a split mounting plate tablet holder.

FIG. 76 illustrates a partial rear perspective view of an embodiment of a split mounting plate tablet holder with finger depressions 436A and 436B to enable quick separation of the top section 430 from the bottom section 420.

Figure 77:
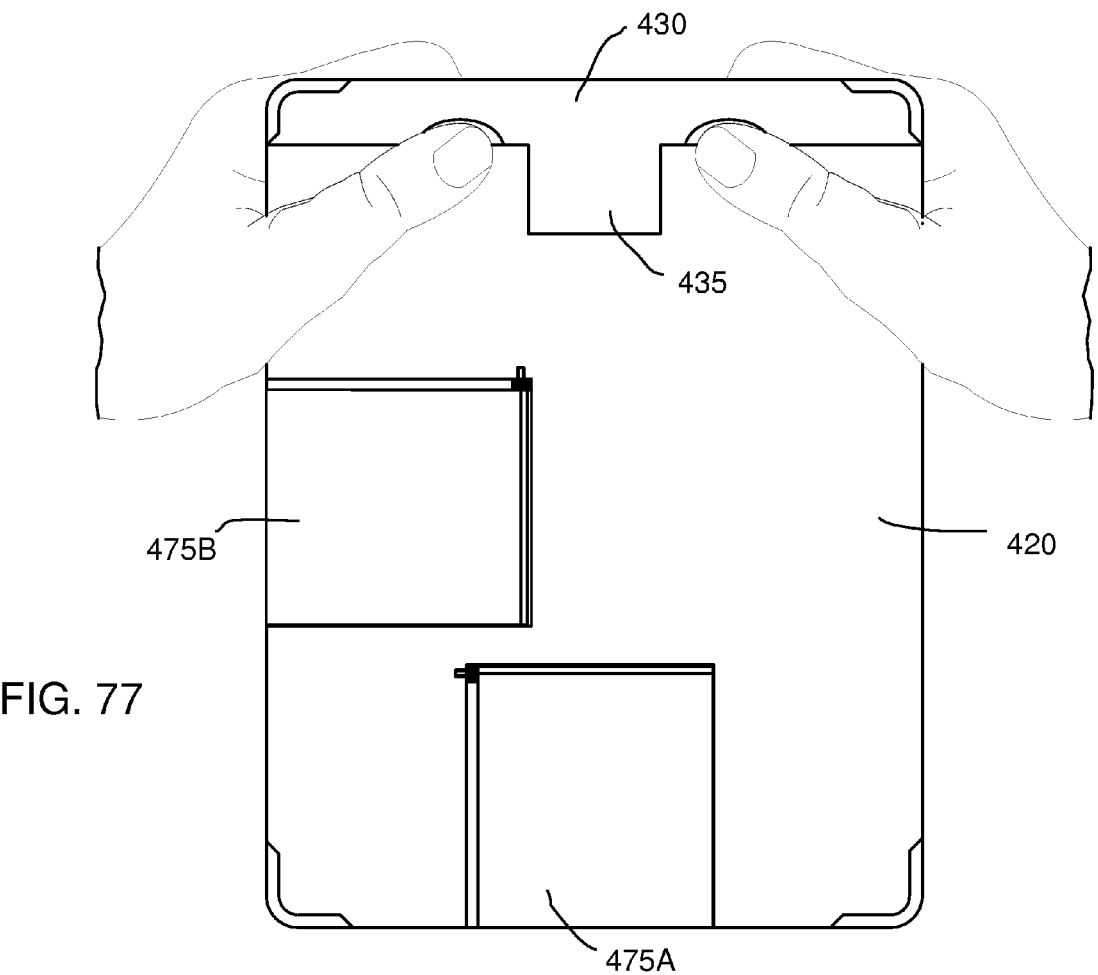
FIGS. 77 and 78 show an image sequence of a split mounting plate tablet holder where the top section is being removed.
Figure 78:
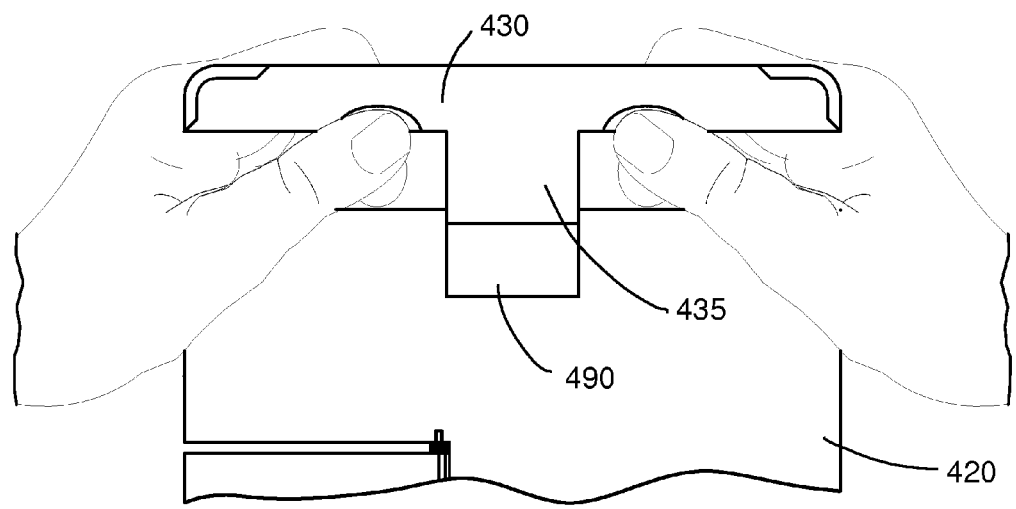

FIG. 77 and FIG. 78 show an image sequence of a split mounting plate tablet holder where the "T" shaped top section 430 is being separated from the "U" shaped bottom section 420.

Figure 79:
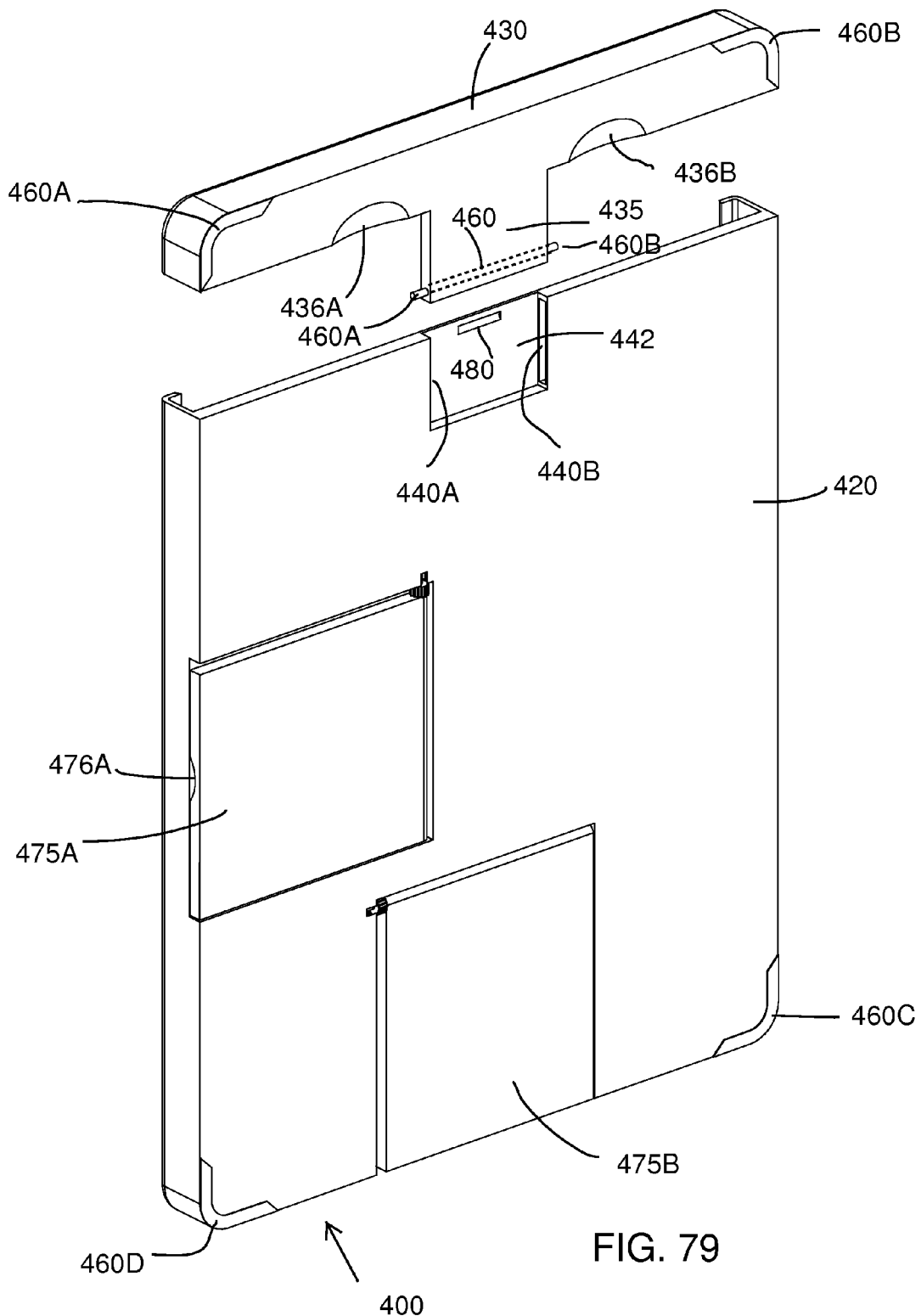
FIG. 79 illustrates a rear perspective view of the components of a split mounting plate tablet holder.

FIG. 79 illustrates a rear perspective view of the components of a split mounting plate tablet holder 400 showing the quick release mechanism that enables the quick separation of the "T" shaped top section 430 from the "U" shaped bottom section 420 while keeping the two sections coupled together through a sliding hinge plate 435. Keeping the two sections attached prevents the loss or the misplacement of the top section 430.

Because the bumper-style edge protection partially covers the edges of a tablet in order to provide drop protection and to keep a tablet in place, the top section 430 of the split mounting plate must slide completely off the tablet device in a vertical fashion and then swivel back along the axis of a pin 460 located at the bottom end of its hinge plate 435 for a tablet device to be completely free to glide off the lower section 420 of the split mounting plate.

This is achieved through a coupling mechanism that couples the first end 460A and the second end 460B of a hinge pin 460 located at the bottom end of hinge plate 435 to grooved vertical channels 440A and 440B located alongside the vertical side walls of a "U" shaped cavity 442 at the top end of the lower section 420 of the split mounting plate tablet holder 400.

The shaft of hinge pin 460 that is located at the bottom end of hinge plate 435 may be coupled to the vertical channels alongside cavity 442 by being spring loaded in the same manner a wristwatch spring is spring loaded.

The top section 430 of the split mounting plate tablet holder 400 is secured to the lower section 420 of the split mounting plate tablet holder through a notch and groove mechanism. The notch 470 is located near the top end of the front side of hinge plate 435 and the grove 480 is located near the top end of the back side of the corresponding "U" shaped cavity 442 in the bottom section 420 of the split mounting plate tablet holder 400. When the "T" shaped top section 430 is fully inserted into the "U" shaped bottom section 420, the notch on the front side of the top section 470 comes into alignment with the groove on the rear side of the bottom section 480 and the two click together, securely joining the top section 430 of the split mounting plate tablet holder to its bottom section 420.

This view also shows the positions of supporting elements 475A and 475B which are located in carved cavities in the bottom section 420 of the split mounting plate tablet holder 400.

Figure 80:
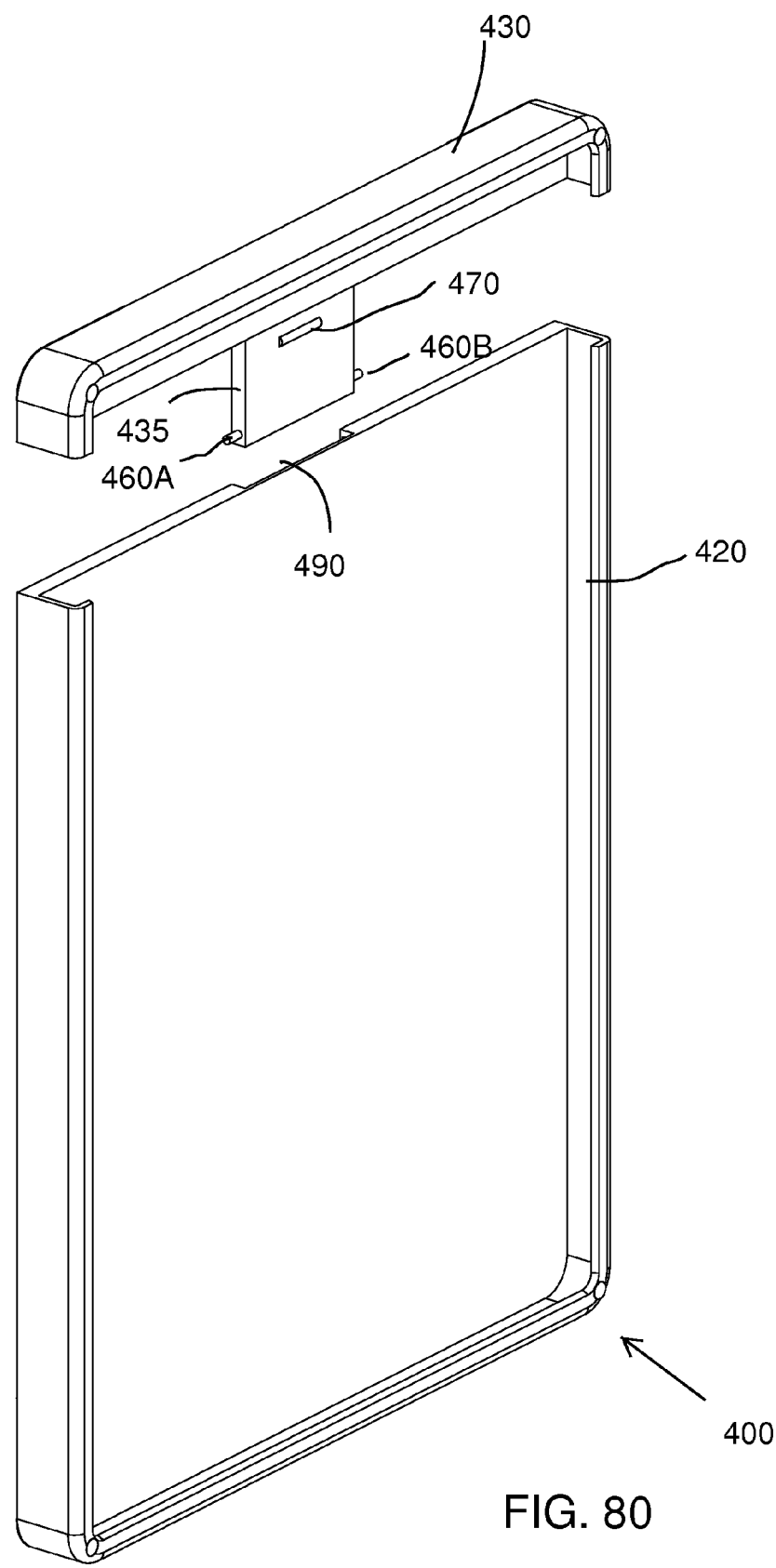
FIG. 80 illustrates a perspective view of the components of a split mounting plate tablet holder.

FIG. 80 illustrates a perspective view of the components of a split mounting plate tablet holder. This view specifically illustrates the shape and location of the locking notch 470 that is located near the top end of the front side of hinge plate 435 on the top section 430 of the split mounting plate tablet holder 400.

Figure 81:
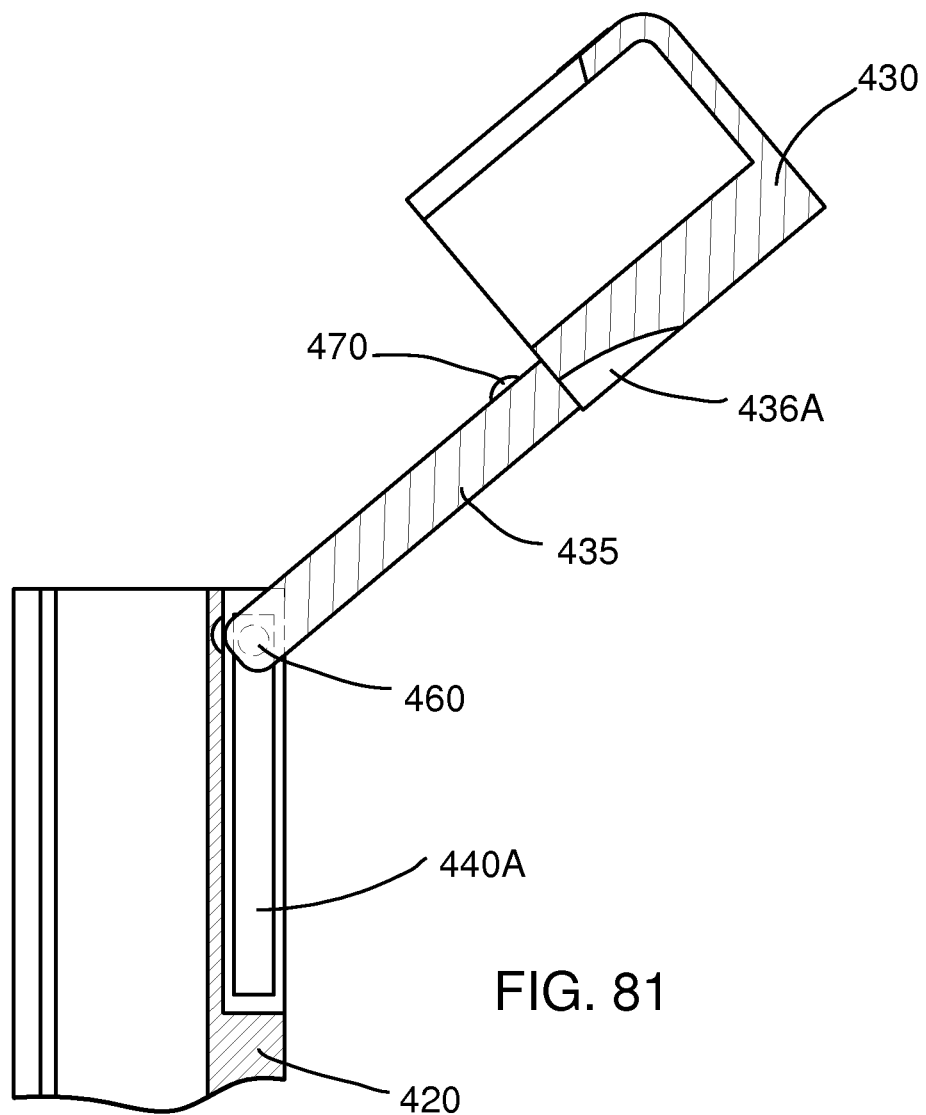
FIG. 81 illustrates a two dimensional cross section of the attachment mechanism of a split mounting plate tablet holder with the top section in an unlocked and open position.

FIG. 81 illustrates a two dimensional cross section of the attachment mechanism of a split mounting plate tablet holder with the top section 430 in an unlocked and open position.

Figure 82:
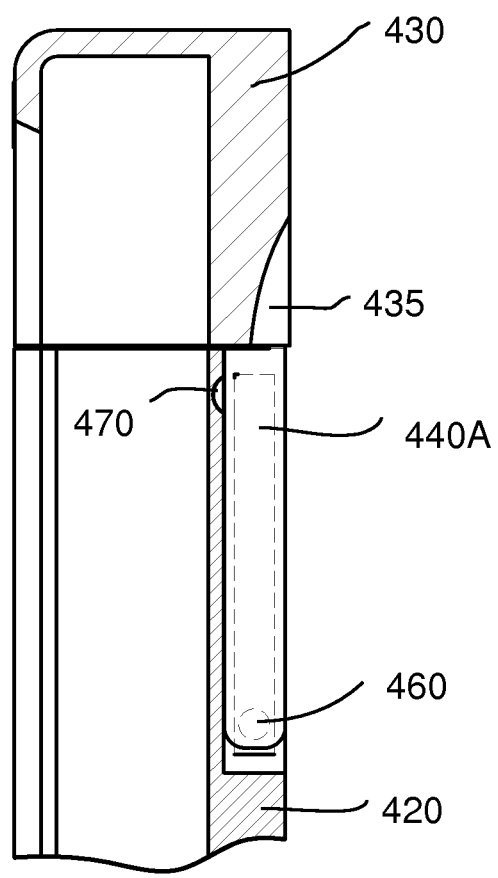
FIG. 82 illustrates a two dimensional cross section of the attachment mechanism of a split mounting plate tablet holder with the top section in the locked position.

FIG. 82 illustrates a two dimensional cross section of the attachment mechanism of a split mounting plate tablet holder with the top section 430 in the secure, locked position.

Figure 83:
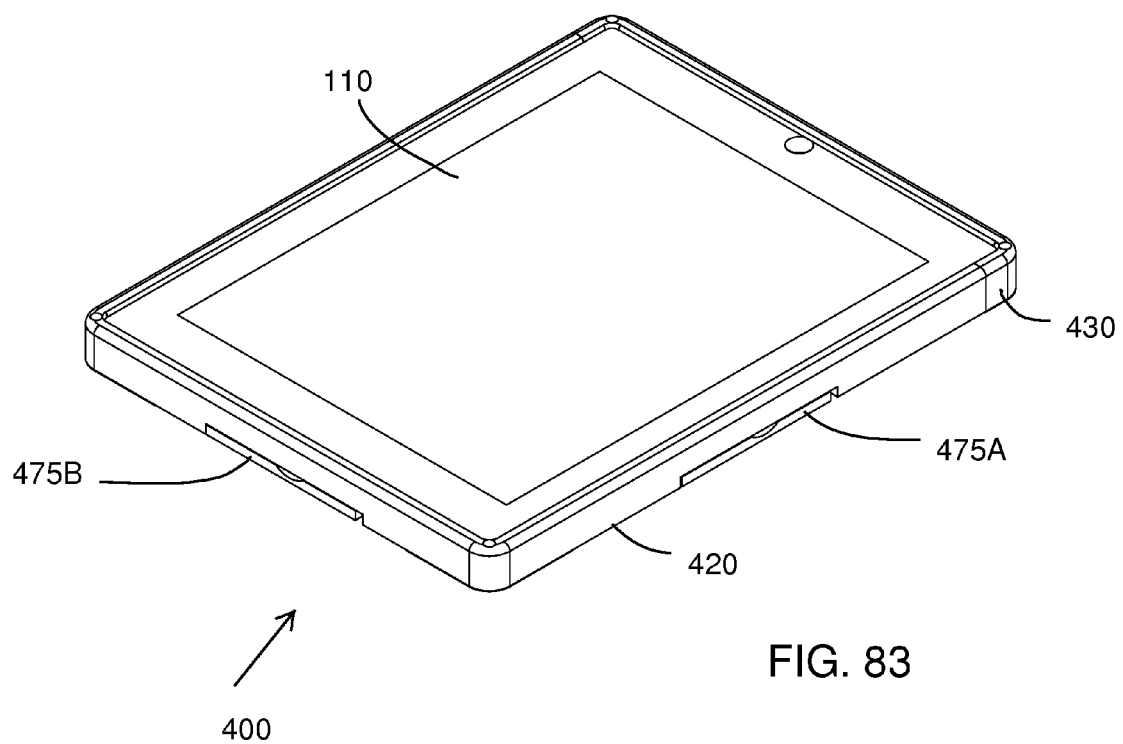
FIG. 83 illustrates a perspective view of a split plate tablet holder with bumper-style edge protection.

FIG. 83 illustrates a perspective view of a split plate tablet holder with bumper-style edge protection 400.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A hinge or clamp assembly comprising:
a first plate or arm including a slot and outer cylindrical bores on opposite sides of the slot, wherein the outer cylindrical bores are coaxial, and wherein at least one of the outer cylindrical bores includes an aperture with teeth or faceted sides;
a second plate or arm seated in the slot of the first plate or arm, wherein a width of the second plate or arm is narrower than a width of the slot and a gap is between a first side of the second plate and a first side of the slot;
a middle cylindrical bore in the second plate or arm and coaxial with the outer cylindrical bores, wherein the middle cylindrical bore has a first end facing an end of one of the outer cylindrical bores and an opposite end facing an end of an another one of the outer cylindrical bores such that the middle cylindrical bore does not extend into the outer cylindrical bores;
a hinge shaft extending through the middle cylindrical bore and extending into each of the outer cylindrical bores, wherein the second plate or arm pivots relative to the first plate or arm about the hinge shaft, and
a disk fixed to the second plate or arm and coaxial with the hinge shaft, the disk includes an outer circumferential surface having teeth or faceted sides configured to engage the teeth or faceted sides of the aperture of the at least one cylindrical bore, wherein the disk is fastened to the second plate or arm and the disk has a thickness narrower than the gap,
wherein the second plate or arm slides in the slot and traverses the gap, wherein the teeth or faceted sides of the disk engage the teeth or faceted sides of the aperture while the first side of the second plate is slid towards the first side of the slot such that the second plate is at a fixed rotational position with respect to the first plate or arm, and
the disk is removed from the aperture while the first side of the second plate is slid away from the first side of the slot such that the second plate may pivot with respect to the first plate or arm.

2. A casing for an electronic device comprising:
a back wall including a slot and outer cylindrical bores on opposite sides of the slot, wherein the outer cylindrical bores are coaxial and wherein at least one of the outer cylindrical bores includes an aperture with teeth or faceted sides;
a second plate or arm seated in the slot of the back wall, wherein a width of the second plate or arm is narrower than a width of the slot and a gap is between a first side of the second plate and a first side of the slot;
a middle cylindrical bore in the second plate or arm and coaxial with the outer cylindrical bores, wherein the middle cylindrical bore has a first end facing an end of one of the outer cylindrical bores and an opposite end facing an end of another one of the outer cylindrical bores such that the middle cylindrical bore does not extend into the outer cylindrical bores;
a hinge shaft extending through the middle cylindrical bore and extending into each of the outer cylindrical bores, wherein the second plate or arm pivots relative to the first plate or arm about the hinge shaft, and
a disk fixed to the second plate or arm and coaxial with the hinge shaft, the disk includes an outer circumferential surface having teeth or faceted sides configured to engage the teeth or faceted sides of the aperture of the at least one cylindrical bore, wherein the disk is fastened to the second plate or arm and the disk has a thickness narrower than the gap,
wherein the second plate or arm slides in the slot and traverses the gap, wherein the teeth or faceted sides of the disk engage the teeth or faceted sides of the aperture while the first side of the second plate is slid towards the first side of the slot such that the second plate is at a fixed rotational position with respect to the first plate or arm, and
the disk is removed from the aperture while the first side of the second plate is slid away from the first side of the slot such that the second plate may pivot with respect to the first plate or arm.

3. A hinge or clamp assembly comprising:
a first plate or arm including a slot and outer cylindrical bores on opposite sides of the slot, wherein the outer cylindrical bores are coaxial, and wherein at least one of the outer cylindrical bores includes an aperture with teeth or faceted sides;
a second plate or arm seated in the slot of the first plate or arm, wherein a width of the second plate or arm is narrower than a width of the slot and a gap is between a first side of the second plate and a first side of the slot;
a first hinge pin extending from the first side of the second plate or arm and extending into one of the outer cylindrical bores and a second hinge pin extending from a second side of the second plate and into another one of the outer cylindrical bores, wherein the first and second hinge pins are aligned along a common axis and coaxial with the outer cylindrical bores, and the second plate or arm pivots relative to the first plate or arm about the first and second hinge pins, and
a disk fixed to the second plate or arm and coaxial to the common axis, the disk includes an outer circumferential surface having teeth or faceted sides configured to engage the teeth or faceted sides of the aperture of the at least one cylindrical bore, wherein the disk is fastened to the second plate or arm and the disk has a thickness narrower than the gap,
wherein the second plate or arm slides in the slot to traverse the gap, wherein the teeth or faceted sides of the disk engage the teeth or faceted sides of the aperture while the first side of the second plate is slid towards the first side of the slot such that the second plate is at a fixed rotational position with respect to the first plate or arm, and
the disk is removed from the aperture while first side of the second plate is slid away from the first side of the slot such that the second plate may pivot with respect to the first plate or arm.

4. The hinge or clamp assembly of claim 3 wherein the first and second hinge pins are at opposite ends of a common hinge shaft which extends through the second plate or arm.

5. A casing for an electronic device comprising:
a back wall including a slot and outer cylindrical bores on opposite sides of the slot, wherein the outer cylindrical bores are coaxial and at least one of the outer cylindrical bores includes an aperture with teeth or faceted sides;
a second plate or arm seated in the slot, wherein a width of the second plate or arm is narrower than a width of the slot and a gap is between a first side of the second plate and a first side of the slot;

a first hinge pin extending from the first side of the second plate or arm and extending into one of the outer cylindrical bores and a second hinge pin extending from a second side of the second plate and into another one of the outer cylindrical bores, wherein the first and second hinge pins are aligned along a common axis and coaxial with the outer cylindrical bores, and the second plate or arm pivots relative to the first plate or arm about the first and second hinge pins, and a disk fixed to the second plate or arm and coaxial to the common axis, the disk includes an outer circumferential surface having teeth or faceted sides configured to engage the teeth or faceted sides of the aperture of the at least one cylindrical bore, wherein the disk is fastened to the second plate or arm and the disk has a thickness narrower than the gap, wherein the second plate or arm slides in the slot to traverse the gap, wherein the teeth or faceted sides of the disk engage the teeth or faceted sides of the aperture while the first side of the second plate is slid towards the first side of the slot such that the second plate is at a fixed rotational position with respect to the first plate or arm, and the disk is removed from the aperture while first side of the second plate is slid away from the first side of the slot such that the second plate may pivot with respect to the first plate or arm.

6. The casing for an electronic device of claim 5 wherein the first and second hinge pins are at opposite ends of a common hinge shaft which extends through the second plate or arm.

* * * * *